(12) United States Patent
Nadathur et al.

(10) Patent No.: US 11,758,035 B2
(45) Date of Patent: Sep. 12, 2023

(54) USER INTERFACE FOR CONFIGURING EXTERNAL ACCESSORIES WITH ACCESSORY DEVICE MANAGEMENT APPLICATIONS

(71) Applicant: Apple Inc., Cupertino, CA (US)

(72) Inventors: Anush Nadathur, Cupertino, CA (US); Justin Wood, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/477,098

(22) Filed: Sep. 16, 2021

(65) Prior Publication Data

US 2022/0229671 A1 Jul. 21, 2022

Related U.S. Application Data

(60) Provisional application No. 63/138,783, filed on Jan. 18, 2021.

(51) Int. Cl.
| | |
|---|---|
| *H04M 1/72409* | (2021.01) |
| *G06F 3/04842* | (2022.01) |
| *H04M 1/72469* | (2021.01) |
| *H04M 1/72448* | (2021.01) |
| *H04L 12/28* | (2006.01) |

(52) U.S. Cl.
CPC .... *H04M 1/72409* (2021.01); *G06F 3/04842* (2013.01); *H04L 12/2809* (2013.01); *H04L 12/2816* (2013.01); *H04M 1/72448* (2021.01); *H04M 1/72469* (2021.01)

(58) Field of Classification Search
CPC ......... H04M 1/72409; H04M 1/72448; H04M 1/72469; G06F 3/04842; H04L 12/2809; H04L 12/2816
See application file for complete search history.

(56) References Cited

U.S. PATENT DOCUMENTS

| | | | |
|---|---|---|---|
| 10,216,351 B2 * | 2/2019 | Yang | G06F 3/04842 |
| 10,254,911 B2 * | 4/2019 | Yang | G06F 3/04842 |
| 11,079,894 B2 * | 8/2021 | Yang | G06F 3/0484 |

(Continued)

FOREIGN PATENT DOCUMENTS

| | | | | |
|---|---|---|---|---|
| WO | 2018/067528 A1 | 4/2018 | | |
| WO | WO-2018067528 A1 * | 4/2018 | | G06F 3/165 |

OTHER PUBLICATIONS

International Search Report and Written Opinion received for PCT Patent Application No. PCT/US2022/012817, dated Apr. 8, 2022, 22 pages.

(Continued)

*Primary Examiner* — Justin R. Blaufeld
(74) *Attorney, Agent, or Firm* — DLA Piper LLP (US)

(57) ABSTRACT

A computer system is used to initiate a process to configure an external accessory for use with at least a first device management application. The computer system displays a prompt that includes an option to initiate a process to configure the external accessory for use with at least a first device management application. While displaying the prompt, the computer system optionally receives a selection and/or an input corresponding to a selection of an option to initiate a process to configure the external accessory for use with at least a first device management application.

43 Claims, 25 Drawing Sheets

(56) References Cited

U.S. PATENT DOCUMENTS

| | | | | |
|---|---|---|---|---|
| 2007/0061495 | A1* | 3/2007 | Cummins | H04N 21/4424 |
| | | | | 710/62 |
| 2014/0159879 | A1* | 6/2014 | Rezvani | G06F 3/04842 |
| | | | | 340/12.22 |
| 2014/0173510 | A1* | 6/2014 | Kanno | G06F 3/04817 |
| | | | | 715/808 |
| 2016/0260414 | A1* | 9/2016 | Yang | G06F 3/0488 |
| 2016/0278143 | A1* | 9/2016 | Akhtar Masoom Akhtar | |
| | | | | H04W 4/80 |
| 2018/0147913 | A1* | 5/2018 | Bergin | B60H 1/00657 |
| 2018/0260453 | A1* | 9/2018 | Lim | G06F 16/248 |
| 2019/0119978 | A1* | 4/2019 | Hall | H04L 12/2818 |
| 2019/0342446 | A1* | 11/2019 | Coverstone | H04M 1/576 |
| 2019/0372862 | A1* | 12/2019 | Carrigan | G06F 3/044 |
| 2020/0127988 | A1* | 4/2020 | Bradley | G06F 3/165 |
| 2020/0382332 | A1 | 12/2020 | Carrigan et al. | |

OTHER PUBLICATIONS

Sengled, "Pairing your Pulse system to a Google Home assistant", Retrieved from the Internet: https://web.archive.org/web/20201123161527/https://support.sengled.com/hc/en-us/articles/360003716593-Pairing-your-Pulse-system-to-a-Google-Home-Assistant, Nov. 23, 2020, 10 pages.

* cited by examiner

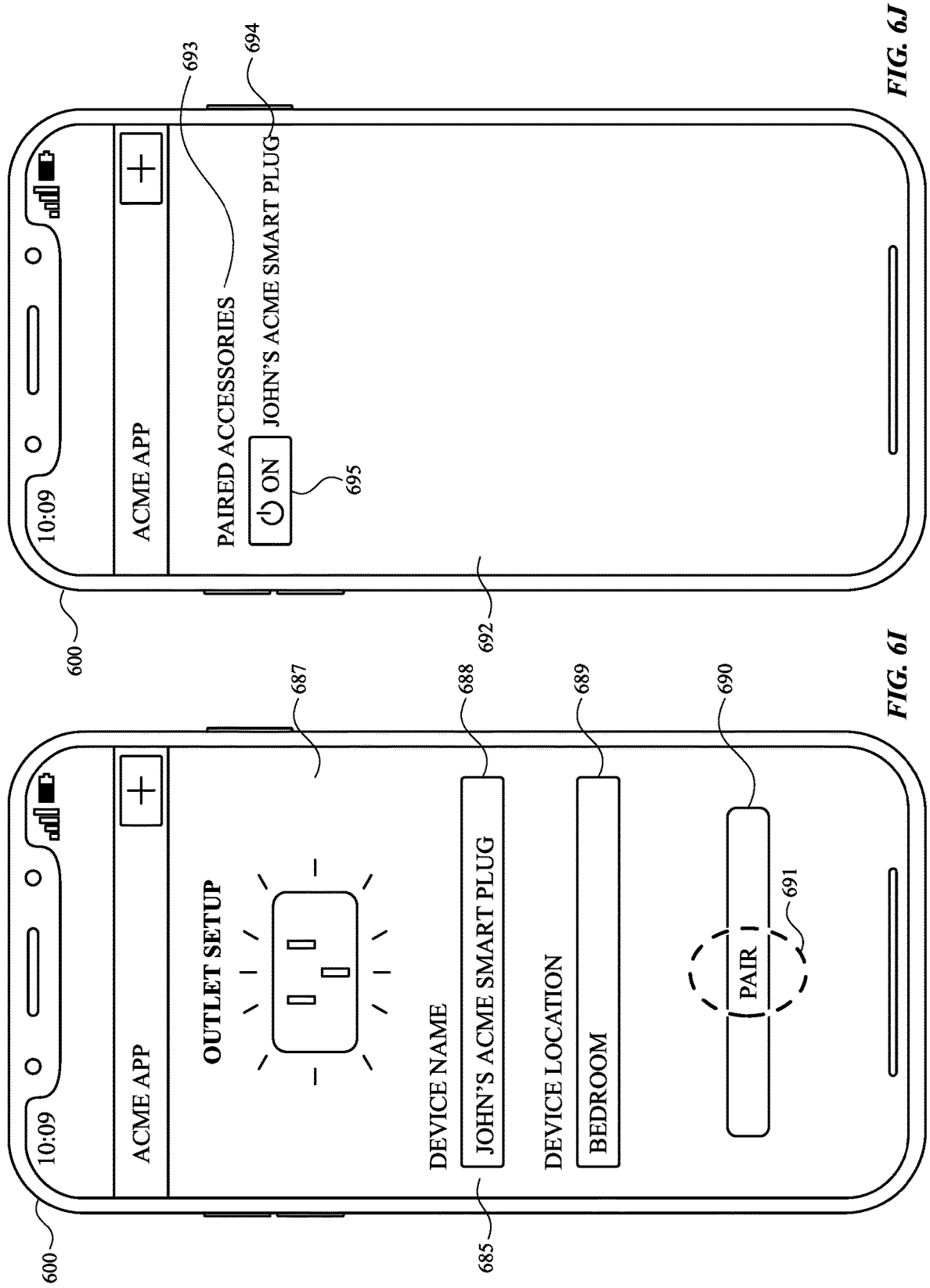

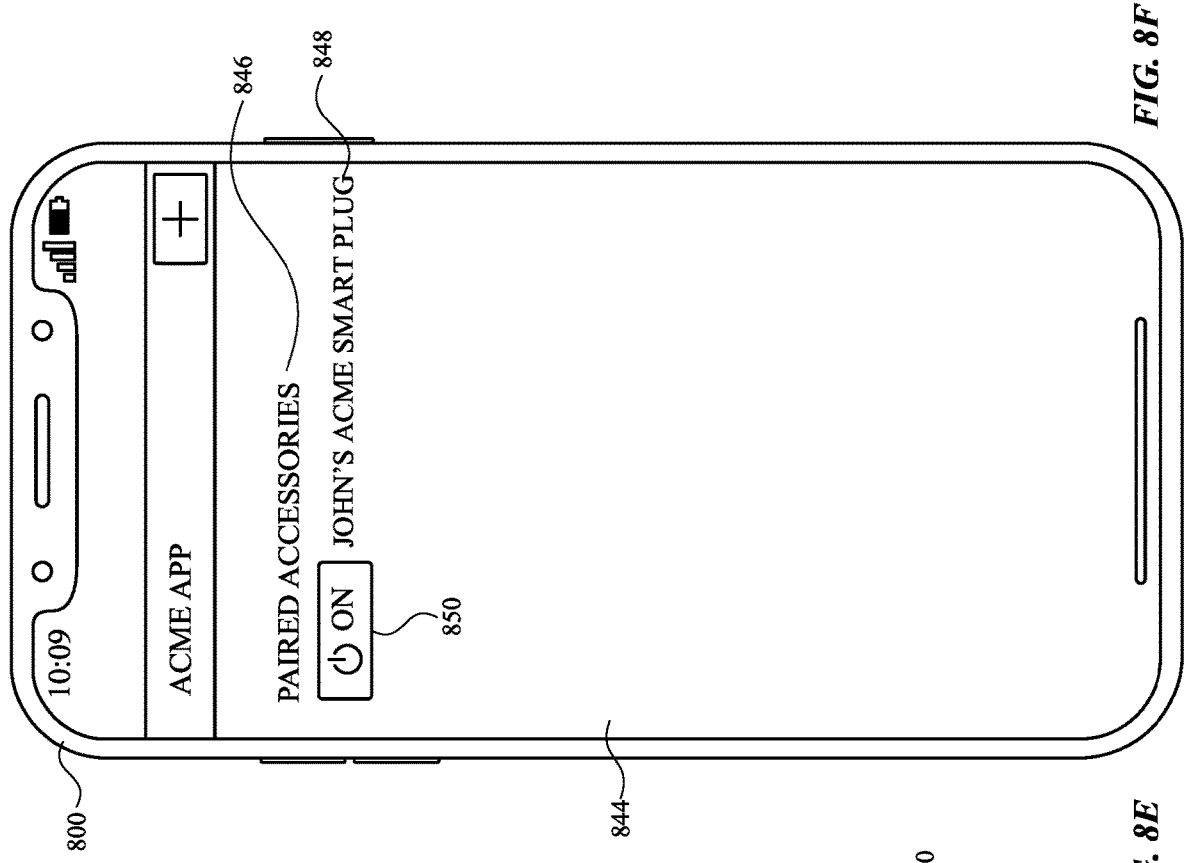

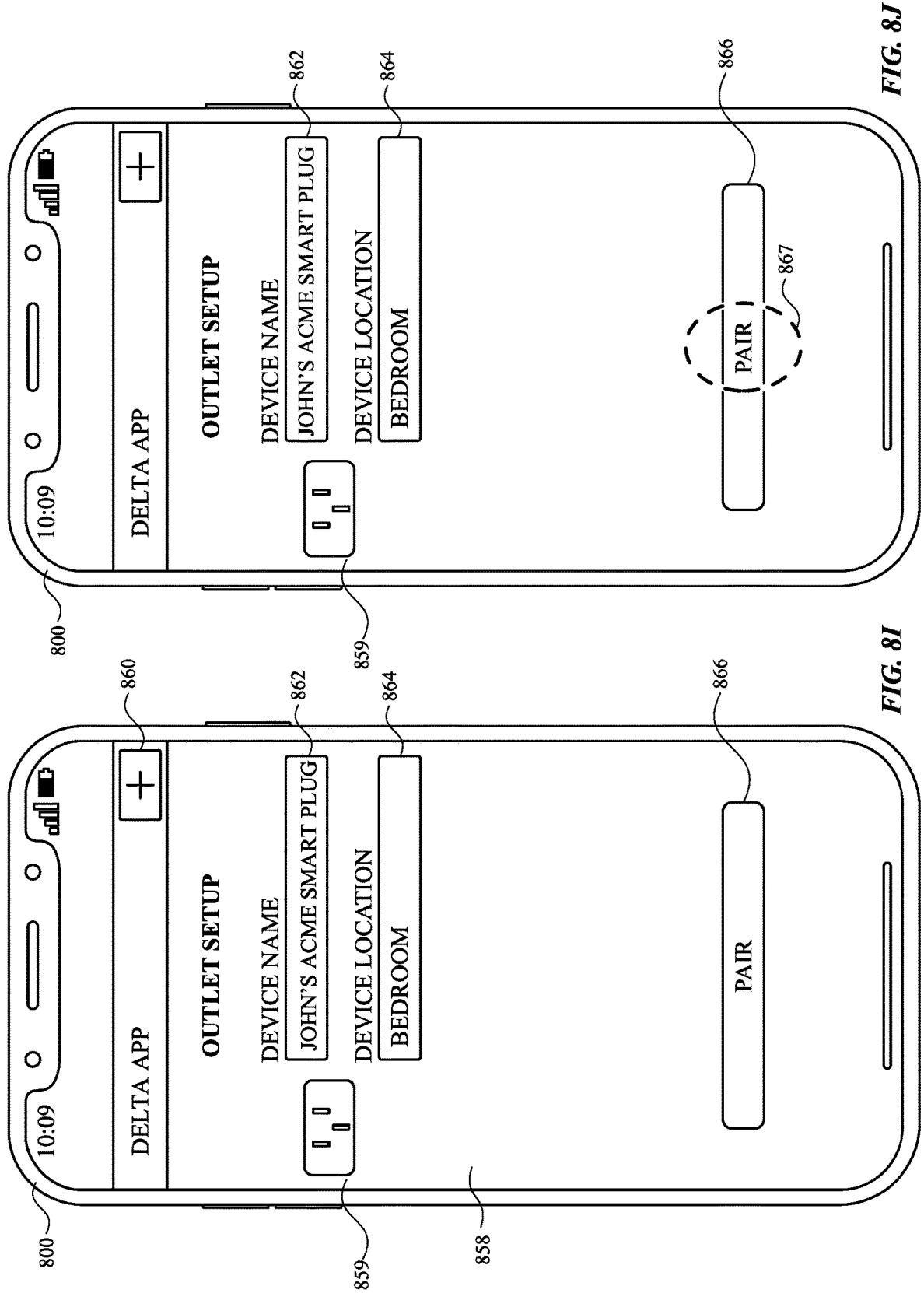

USER INTERFACE FOR CONFIGURING EXTERNAL ACCESSORIES WITH ACCESSORY DEVICE MANAGEMENT APPLICATIONS

CROSS-REFERENCE TO RELATED APPLICATIONS

This application claims priority to U.S. Patent Application Ser. No. 63/138,783, entitled "CONFIGURING ACCESSORIES", filed on Jan. 18, 2021, the content of which is hereby incorporated by reference in its entirety.

The present disclosure relates generally to computer user interfaces, and more specifically to techniques for configuring external accessories.

BACKGROUND

Computer systems can control external accessories, such as by controlling the external accessory using a manufacturer's application that is running on the computer system. Some users may prefer to control the external accessory using multiple applications to provide the user with added flexibility. For example, different applications may control different features of the external accessory.

BRIEF SUMMARY

Some techniques for configuring an external accessory for use with one or more device management applications using electronic devices, however, are generally cumbersome and inefficient. For example, some existing techniques use a complex and time-consuming user interface, which may include multiple key presses or keystrokes. In particular, the user may need to manually start a configuration process for each application that the user wants to use to control the external accessory. Existing techniques require more time than necessary, wasting user time and device energy. This latter consideration is particularly important in battery-operated devices.

Accordingly, the present technique provides electronic devices with faster, more efficient methods and interfaces for configuring an external device for use with a device management application. Such methods and interfaces optionally complement or replace other methods for configuring an external device for use with a device management application. Such methods and interfaces reduce the cognitive burden on a user and produce a more efficient human-machine interface. For battery-operated computing devices, such methods and interfaces conserve power and increase the time between battery charges. Such methods and interfaces may also reduce the number of user inputs required to configure an external accessory for use with one more device management applications.

In accordance with some embodiments, a method performed at a computer system that is in communication with a display generation component and one or more input devices is described. The method comprises: while displaying a user interface of a first device management application and after configuring the external accessory for use with the first device management application, displaying, via the display generation component, a prompt with an option to initiate a process to configure the external accessory for use with a second device management application that is different from the first device management application; while displaying the prompt, receiving, via the one or more input devices, selection of the option to initiate a process to configure the external accessory for use with a second device management application; and in response to receiving selection of the option to initiate a process to configure the external accessory for use with a second device management application, initiating a process to configure the external accessory for use with the second device management application.

In accordance with some embodiments, a non-transitory computer-readable storage medium storing one or more programs configured to be executed by one or more processors of a computer system that is in communication with a display generation component is described. The one or more programs include instructions for: while displaying a user interface of a first device management application and after configuring the external accessory for use with the first device management application, displaying, via the display generation component, a prompt with an option to initiate a process to configure the external accessory for use with a second device management application that is different from the first device management application; while displaying the prompt, receiving, via the one or more input devices, selection of the option to initiate a process to configure the external accessory for use with a second device management application; and in response to receiving selection of the option to initiate a process to configure the external accessory for use with a second device management application, initiating a process to configure the external accessory for use with the second device management application.

In accordance with some embodiments, a transitory computer-readable storage medium storing one or more programs configured to be executed by one or more processors of a computer system that is in communication with a display generation component is described. The one or more programs include instructions for: while displaying a user interface of a first device management application and after configuring the external accessory for use with the first device management application, displaying, via the display generation component, a prompt with an option to initiate a process to configure the external accessory for use with a second device management application that is different from the first device management application; while displaying the prompt, receiving, via the one or more input devices, selection of the option to initiate a process to configure the external accessory for use with a second device management application; and in response to receiving selection of the option to initiate a process to configure the external accessory for use with a second device management application, initiating a process to configure the external accessory for use with the second device management application.

In accordance with some embodiments, a computer system comprising a display generation component, one or more processors, and memory storing one or more programs configured to be executed by the one or more processors is described. The one or more programs including instructions for: while displaying a user interface of a first device management application and after configuring the external accessory for use with the first device management application, displaying, via the display generation component, a prompt with an option to initiate a process to configure the external accessory for use with a second device management application that is different from the first device management application; while displaying the prompt, receiving, via the one or more input devices, selection of the option to initiate a process to configure the external accessory for use with a second device management application; and in response to receiving selection of the option to initiate a process to configure the external accessory for use with a second device management application, initiating a process to configure the external accessory for use with the second device management application.

In accordance with some embodiments, a computer system comprises: a display generation component one or more input devices; means, while displaying a user interface of a first device management application and after configuring the external accessory for use with the first device management application, for displaying, via the display generation component, a prompt with an option to initiate a process to configure the external accessory for use with a second device management application that is different from the first device management application; means, while displaying the prompt, for receiving, via the one or more input devices, selection of the option to initiate a process to configure the external accessory for use with a second device management application; and means, responsive to receiving selection of the option to initiate a process to configure the external accessory for use with a second device management application, for initiating a process to configure the external accessory for use with the second device management application.

In accordance with some embodiments, a method performed at a computer system that is in communication with a display generation component and one or more input devices is described. The method comprises: receiving a request to configure an external accessory; subsequent to receiving the request to configure the external accessory, displaying, via the display generation component, a prompt that includes an option to initiate a process to configure the external accessory for use with a first device management application and an option to initiate a process to configure the external accessory for use with a second device management application that is different from the first device management application; while displaying the prompt, receiving, via the one or more input devices, an input; and in response to receiving the input: in accordance with a determination that the input corresponds to selection of the option to initiate a process to configure the external accessory for use with the first device management application, initiating the process to configure the external accessory for use with the first device management application; and in accordance with a determination that the input corresponds to selection of the option to initiate a process to configure the external accessory for use with the second device management application, initiating the process to configure the external accessory for use with the second device management application that is different from the first device management application.

In accordance with some embodiments, a non-transitory computer-readable storage medium storing one or more programs configured to be executed by one or more processors of a computer system that is in communication with a display generation component is described. The one or more programs include instructions for: receiving a request to configure an external accessory; subsequent to receiving the request to configure the external accessory, displaying, via the display generation component, a prompt that includes an option to initiate a process to configure the external accessory for use with a first device management application and an option to initiate a process to configure the external accessory for use with a second device management application that is different from the first device management application; while displaying the prompt, receiving, via the one or more input devices, an input; and in response to receiving the input: in accordance with a determination that the input corresponds to selection of the option to initiate a process to configure the external accessory for use with the first device management application, initiating the process to configure the external accessory for use with the first device management application; and in accordance with a determination that the input corresponds to selection of the option to initiate a process to configure the external accessory for use with the second device management application, initiating the process to configure the external accessory for use with the second device management application that is different from the first device management application.

In accordance with some embodiments, a transitory computer-readable storage medium storing one or more programs configured to be executed by one or more processors of a computer system that is in communication with a display generation component is described. The one or more programs include instructions for: receiving a request to configure an external accessory; subsequent to receiving the request to configure the external accessory, displaying, via the display generation component, a prompt that includes an option to initiate a process to configure the external accessory for use with a first device management application and an option to initiate a process to configure the external accessory for use with a second device management application that is different from the first device management application; while displaying the prompt, receiving, via the one or more input devices, an input; and in response to receiving the input: in accordance with a determination that the input corresponds to selection of the option to initiate a process to configure the external accessory for use with the first device management application, initiating the process to configure the external accessory for use with the first device management application; and in accordance with a determination that the input corresponds to selection of the option to initiate a process to configure the external accessory for use with the second device management application, initiating the process to configure the external accessory for use with the second device management application that is different from the first device management application.

In accordance with some embodiments, a computer system comprising a display generation component, one or more processors, and memory storing one or more programs configured to be executed by the one or more processors is described. The one or more programs including instructions for: receiving a request to configure an external accessory; subsequent to receiving the request to configure the external accessory, displaying, via the display generation component, a prompt that includes an option to initiate a process to configure the external accessory for use with a first device management application and an option to initiate a process to configure the external accessory for use with a second device management application that is different from the first device management application; while displaying the prompt, receiving, via the one or more input devices, an input; and in response to receiving the input: in accordance with a determination that the input corresponds to selection of the option to initiate a process to configure the external accessory for use with the first device management application, initiating the process to configure the external accessory for use with the first device management application; and in accordance with a determination that the input corresponds to selection of the option to initiate a process to configure the external accessory for use with the second device management application, initiating the process to configure the external accessory for use with the second device management application that is different from the first device management application.

In accordance with some embodiments, a computer system comprises: a display generation component; one or more input devices; means for receiving a request to configure an external accessory; means, subsequent to receiving the request to configure the external accessory, for displaying, via the display generation component, a prompt that includes an option to initiate a process to configure the external accessory for use with a first device management application and an option to initiate a process to configure the external accessory for use with a second device management application that is different from the first device management application; means, while displaying the prompt, for receiving, via the one or more input devices, an input; and means, responsive to receiving the input, for: in accordance with a determination that the input corresponds to selection of the option to initiate a process to configure the external accessory for use with the first device management application, initiating the process to configure the external accessory for use with the first device management application; and in accordance with a determination that the input corresponds to selection of the option to initiate a process to configure the external accessory for use with the second device management application, initiating the process to configure the external accessory for use with the second device management application that is different from the first device management application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for configuring an external accessory for use with a device management application, thereby increasing the effectiveness, efficiency, and user satisfaction with such devices. Such methods and interfaces may complement or replace other methods for configuring an external accessory for use with a device management application.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6L illustrate techniques for configuring an external accessory for use with a device management application in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for configuring an external accessory for use with a device management application. For example, there a need for user interfaces that enable external accessories to be quickly and conveniently configured for use with one or more device management applications. Such techniques can reduce the cognitive burden on a user who configures one or more external accessories for use with one or more device management applications, thereby enhancing productivity. Further, such techniques can reduce processor and battery power otherwise wasted on redundant user inputs.

Figure 6B:
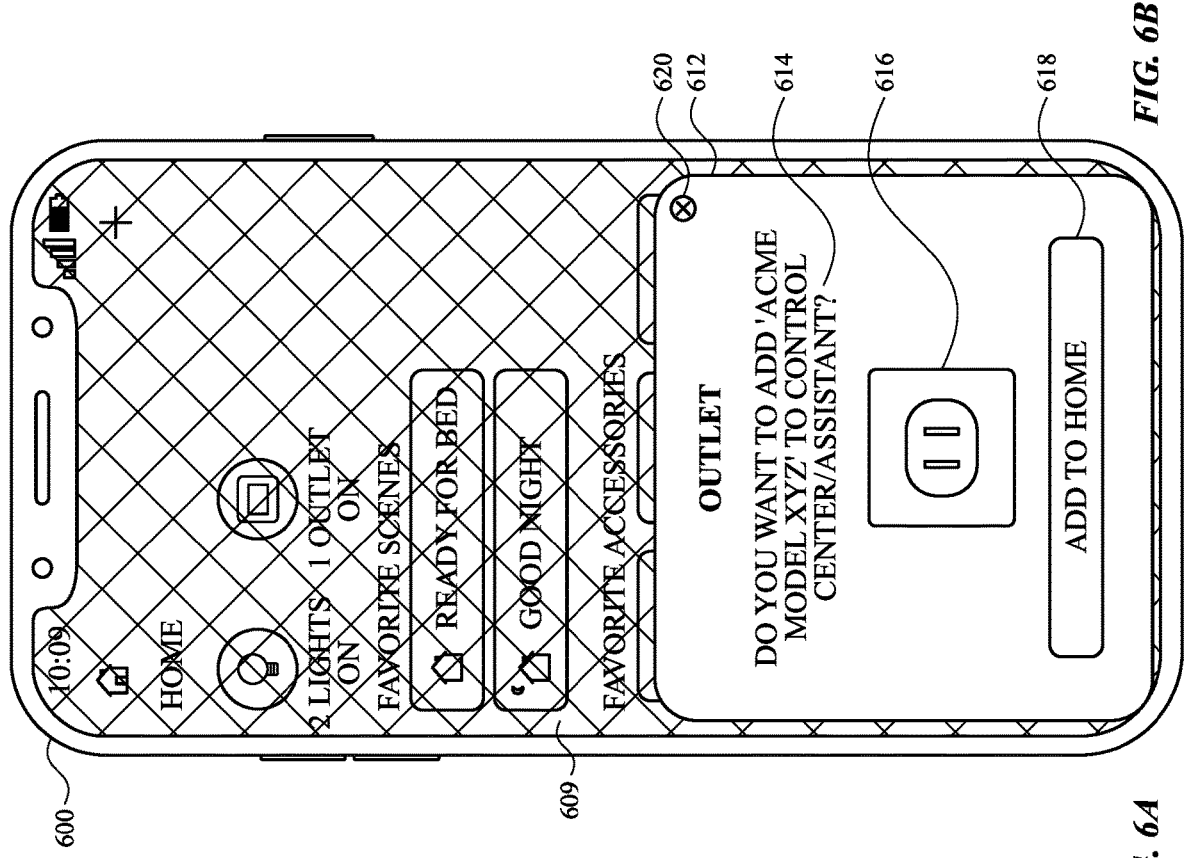
Figure 7:
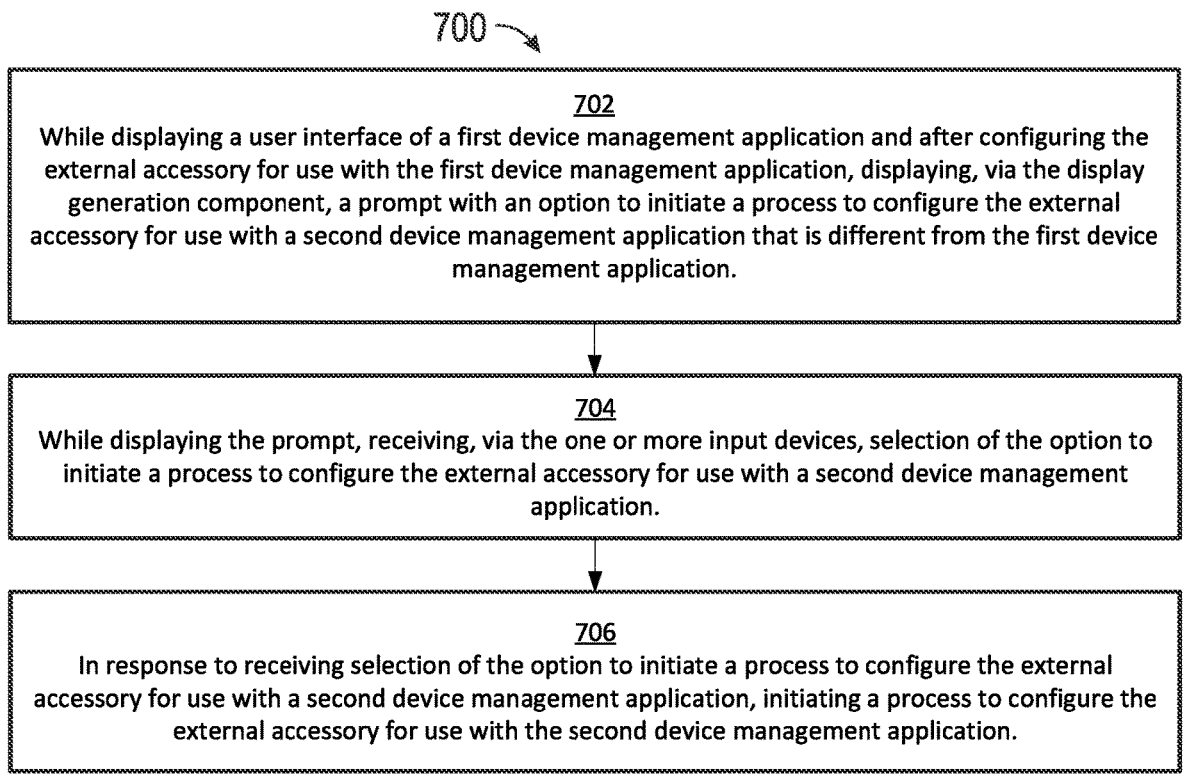
FIG. 7 is a flow diagram illustrating methods of configuring an external accessory for use with a device management application in accordance with some embodiments.
Figure 8A:
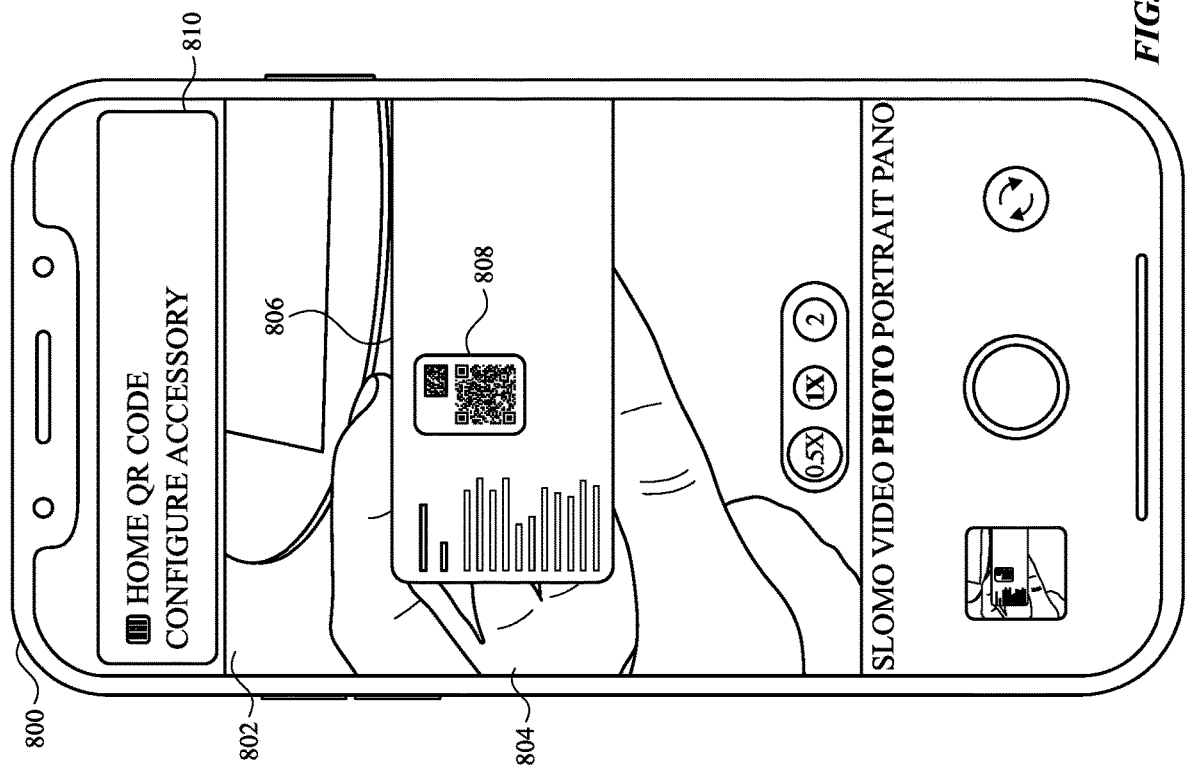
Figure 8R:
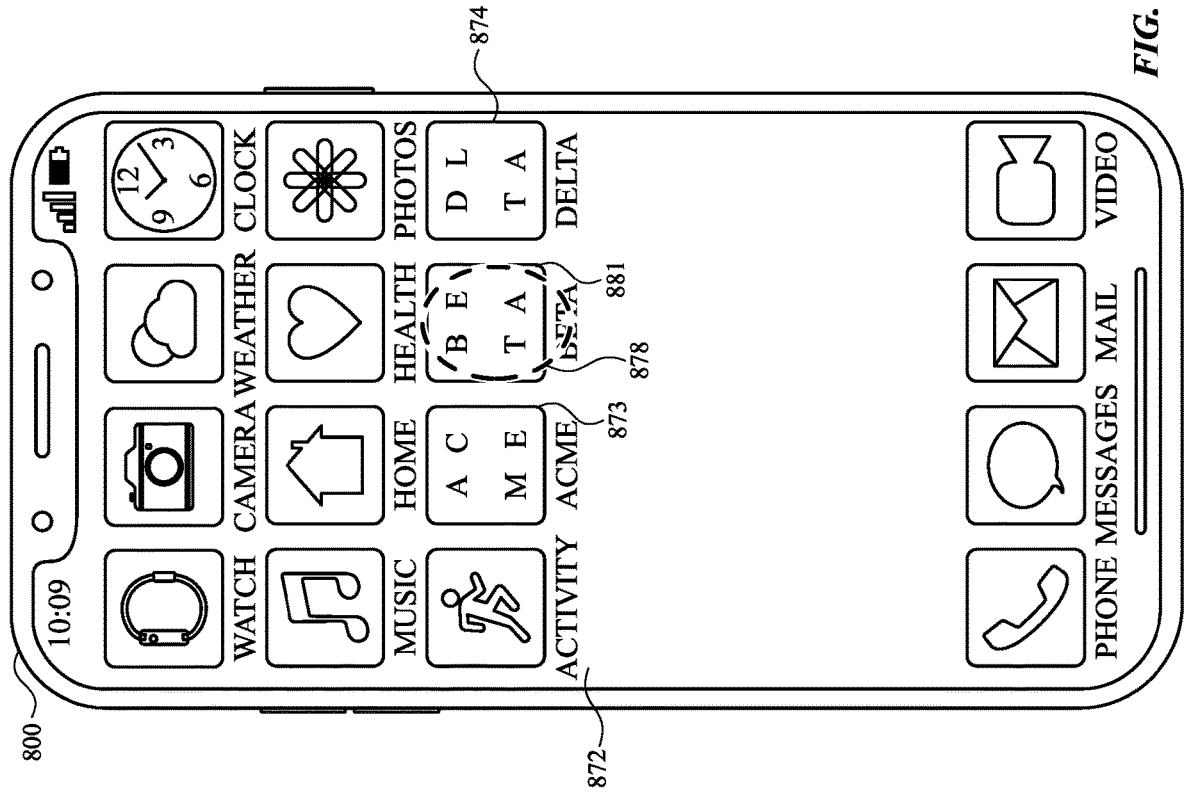
Figure 9:
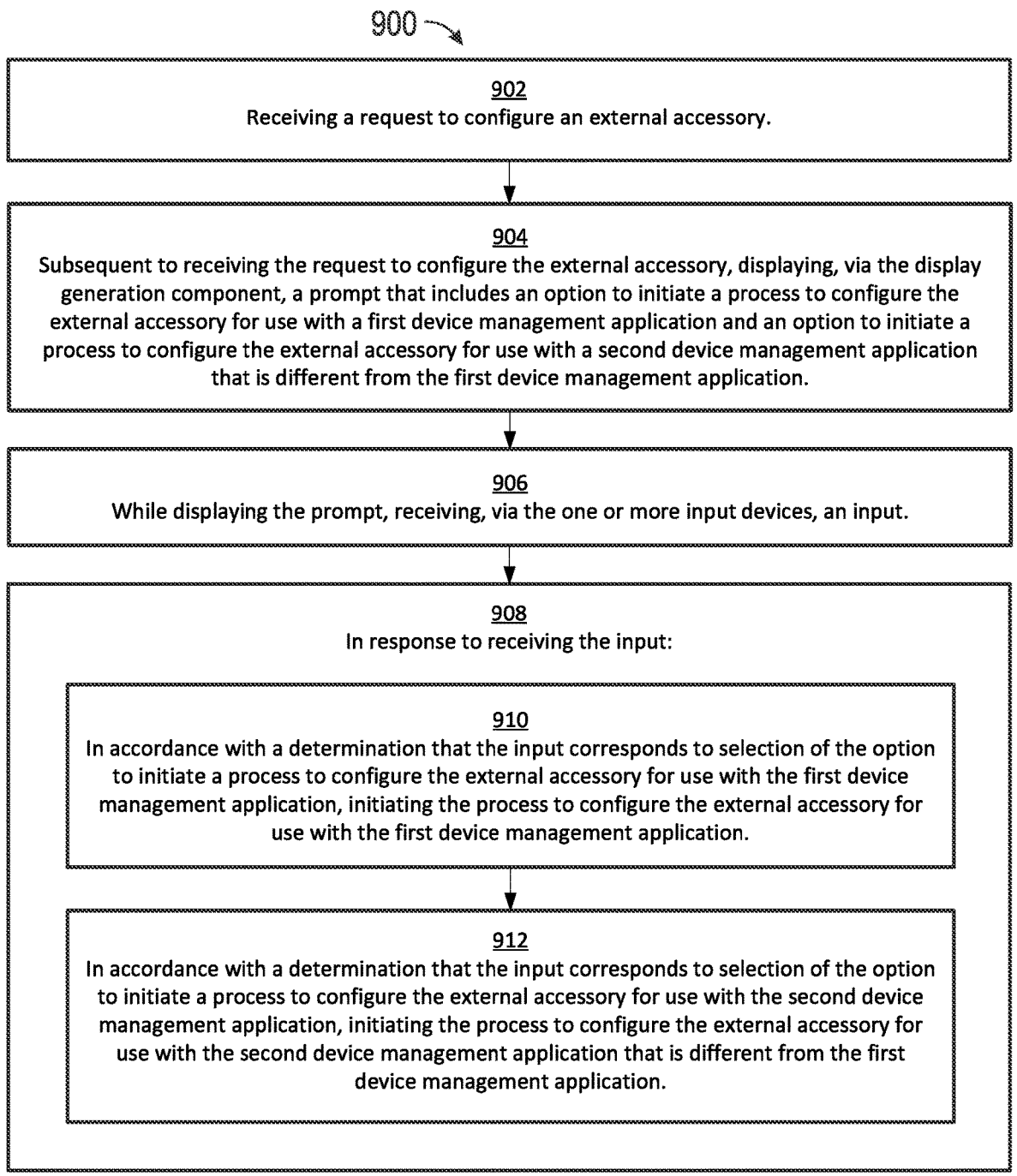
FIG. 9 is a flow diagram illustrating methods of displaying a prompt that includes multiple options for configuring an external accessory for use with multiple device management applications in accordance with some embodiments.

Below, FIGS. 1A-1B, 2, 3, 4A-4B, and 5A-5B provide a description of exemplary devices for performing the techniques for managing event notifications. FIGS. 6A-6L illustrate exemplary user interfaces for configuring an external accessory for use with a device management application. FIG. 7 is a flow diagram illustrating methods of configuring an external accessory for use with a device management application in accordance with some embodiments. The user interfaces in FIGS. 6A-6L are used to illustrate the processes described below, including the processes in FIG. 7. FIGS. 8A-8R illustrate exemplary user interfaces for displaying a prompt that includes multiple options to configure an external accessory for use with multiple device management applications. FIG. 9 is a flow diagram illustrating methods of displaying a prompt that includes multiple options to configure the external accessory for use with multiple management applications in accordance with some embodiments. The user interfaces in FIGS. 8A-8R are used to illustrate the processes described below, including the processes in FIG. 9.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
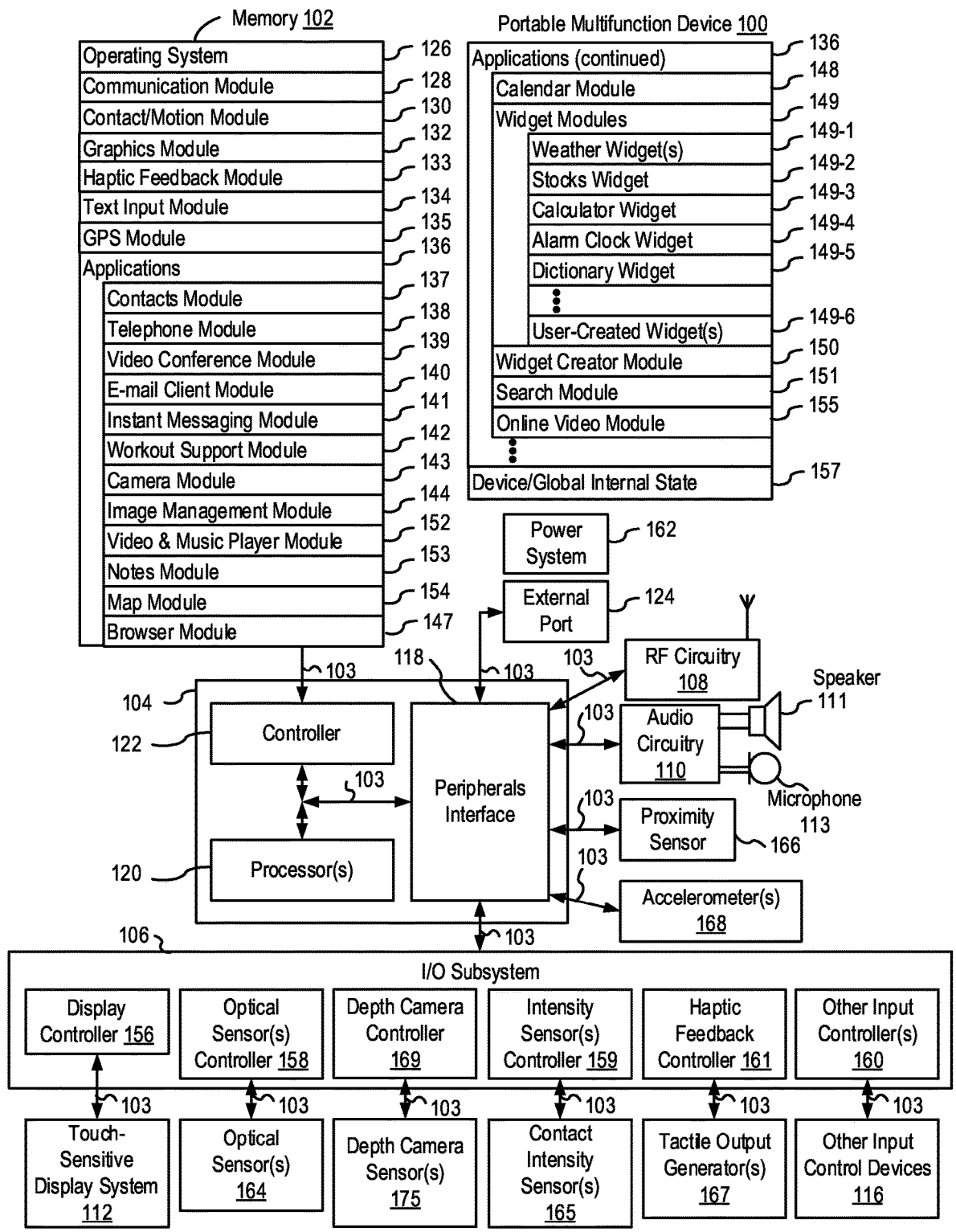
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser.

No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737 "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity. Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
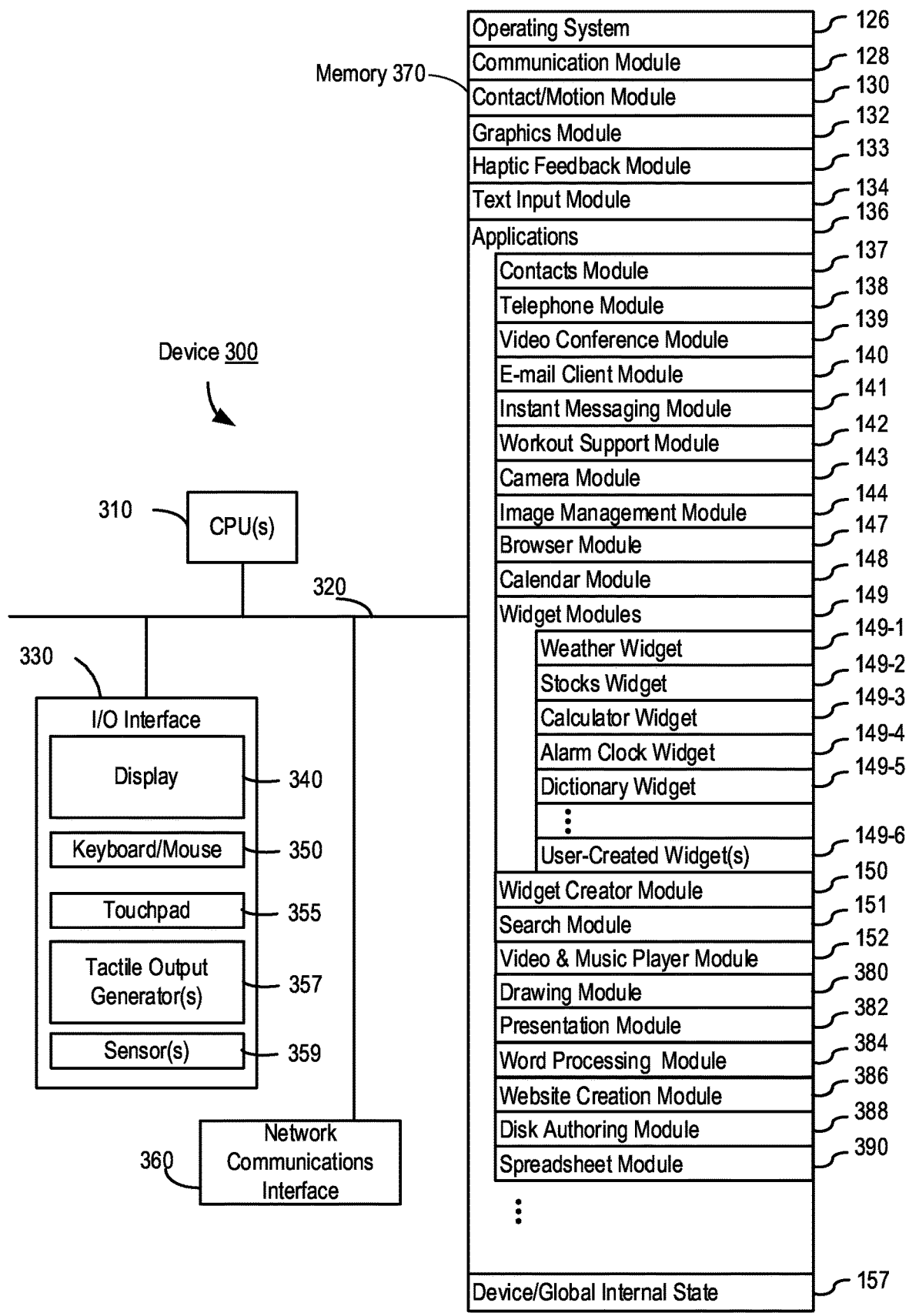
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting names) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album) and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving; directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
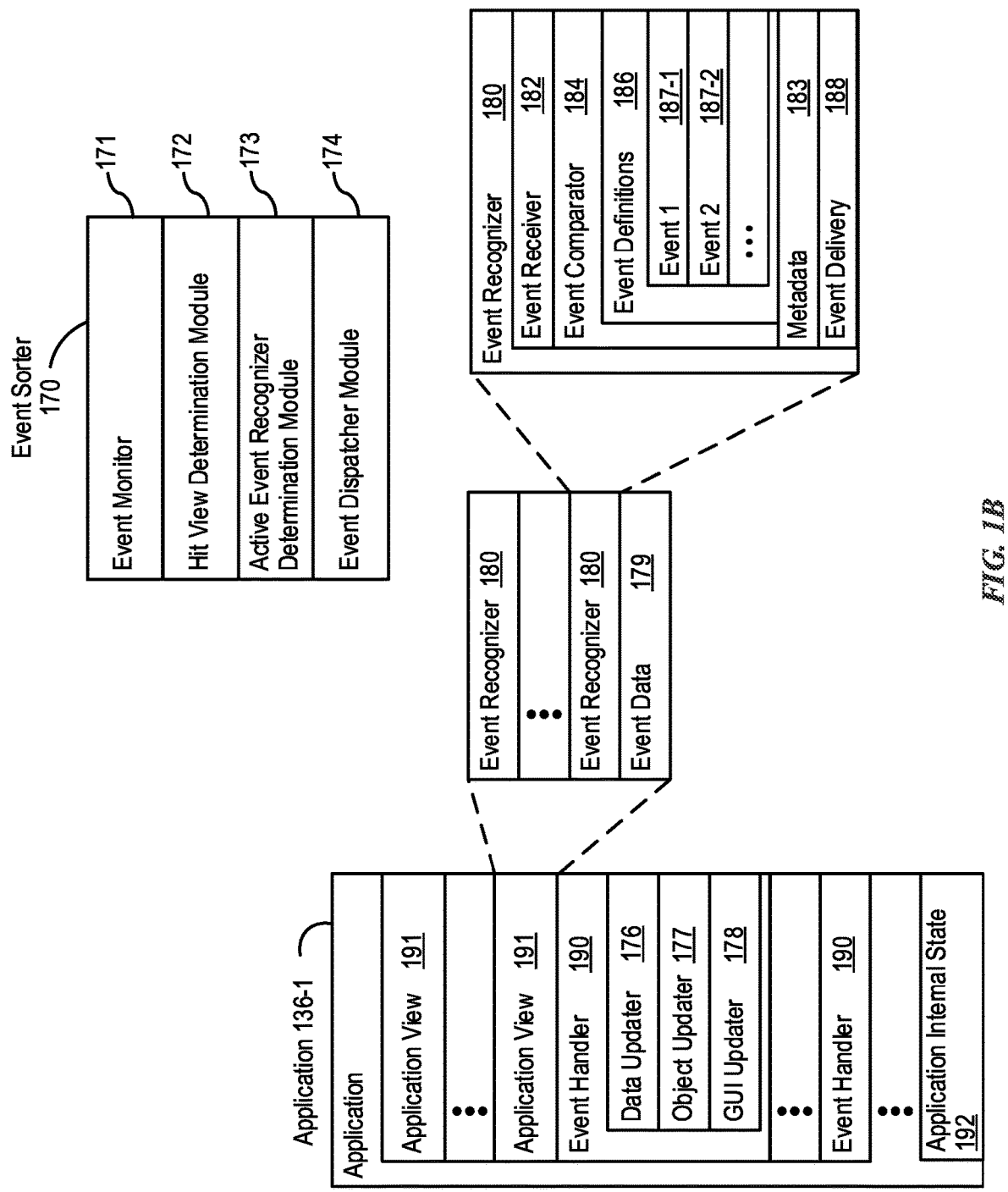
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object, GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
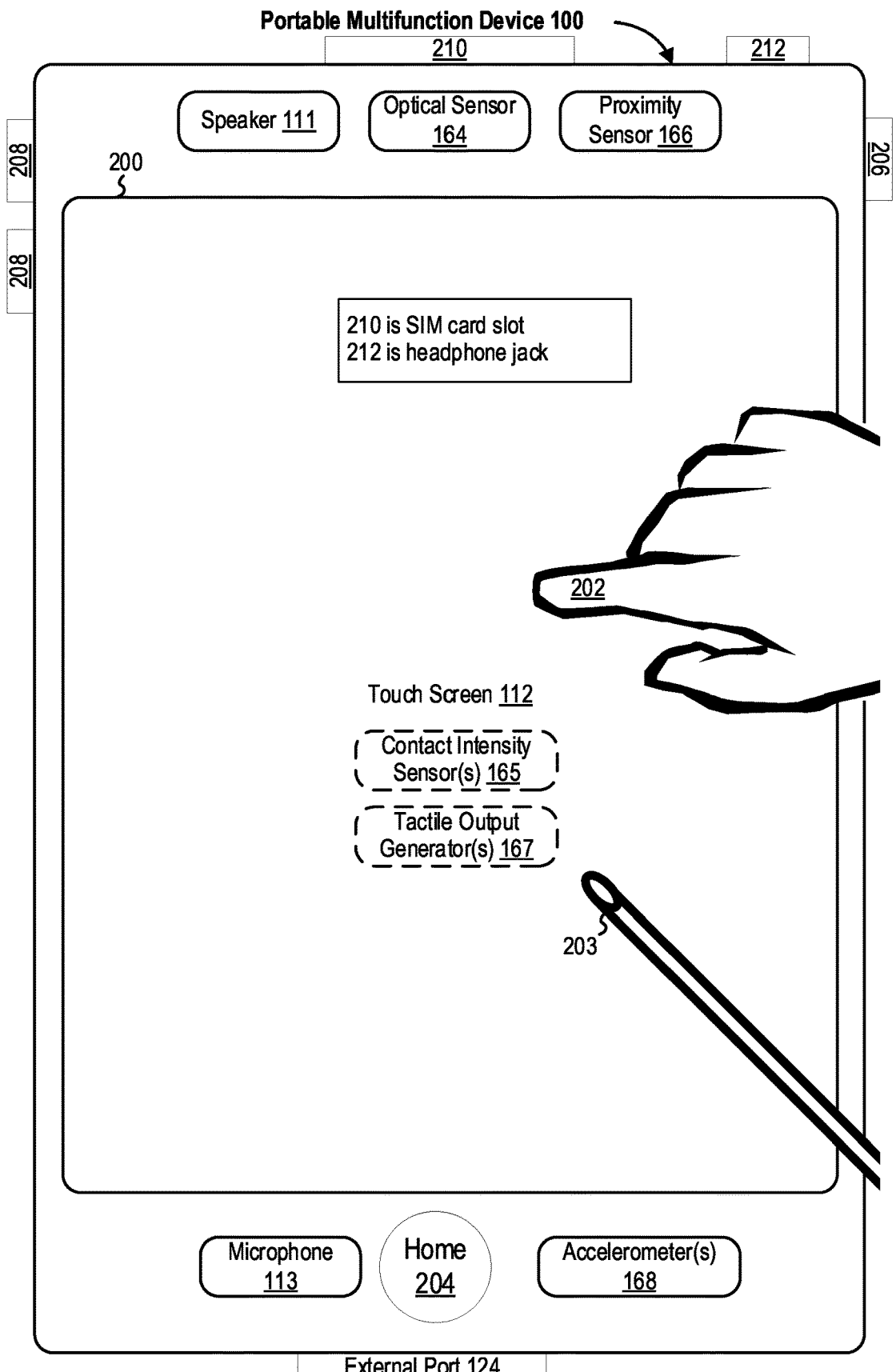
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
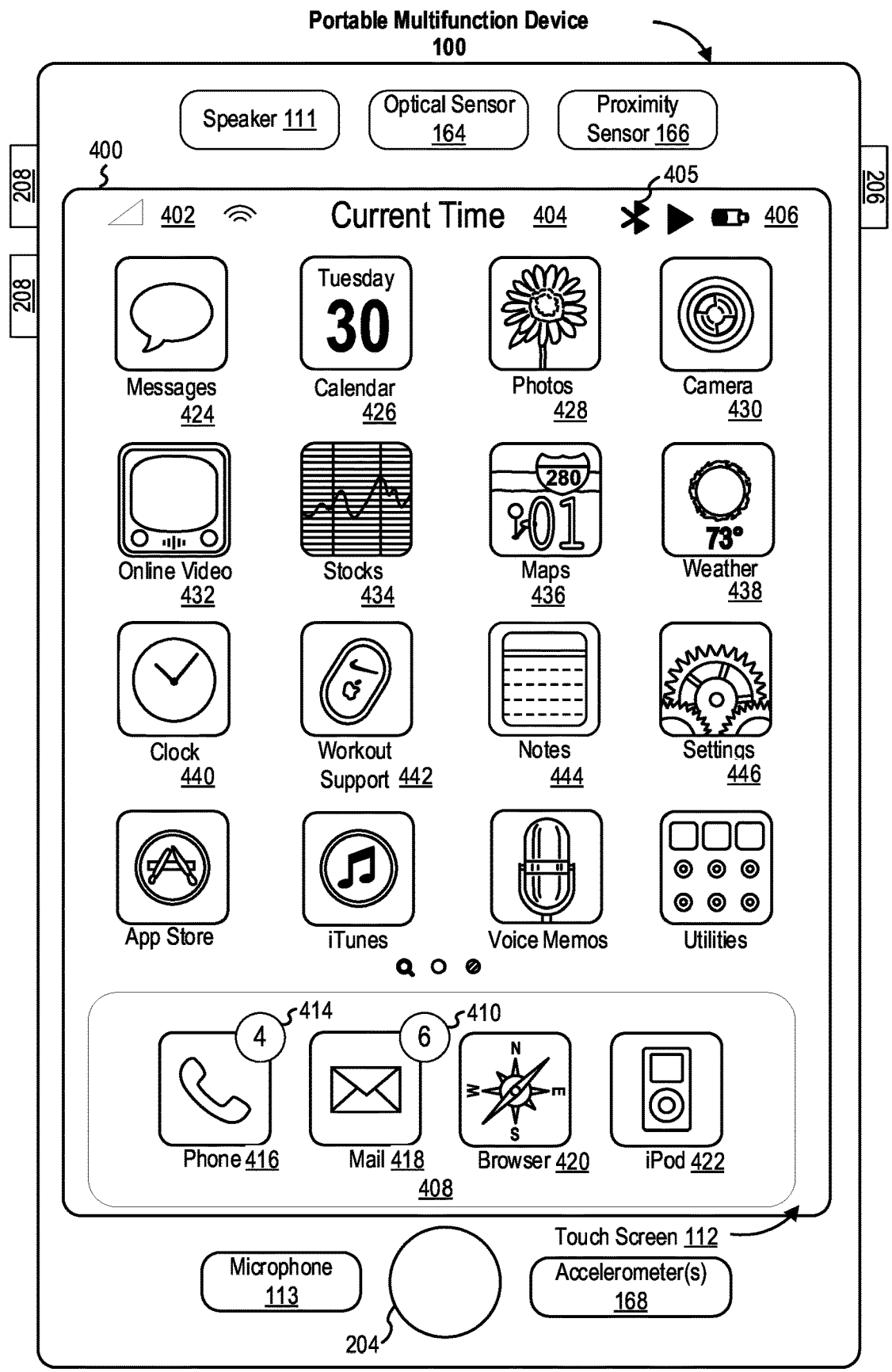
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
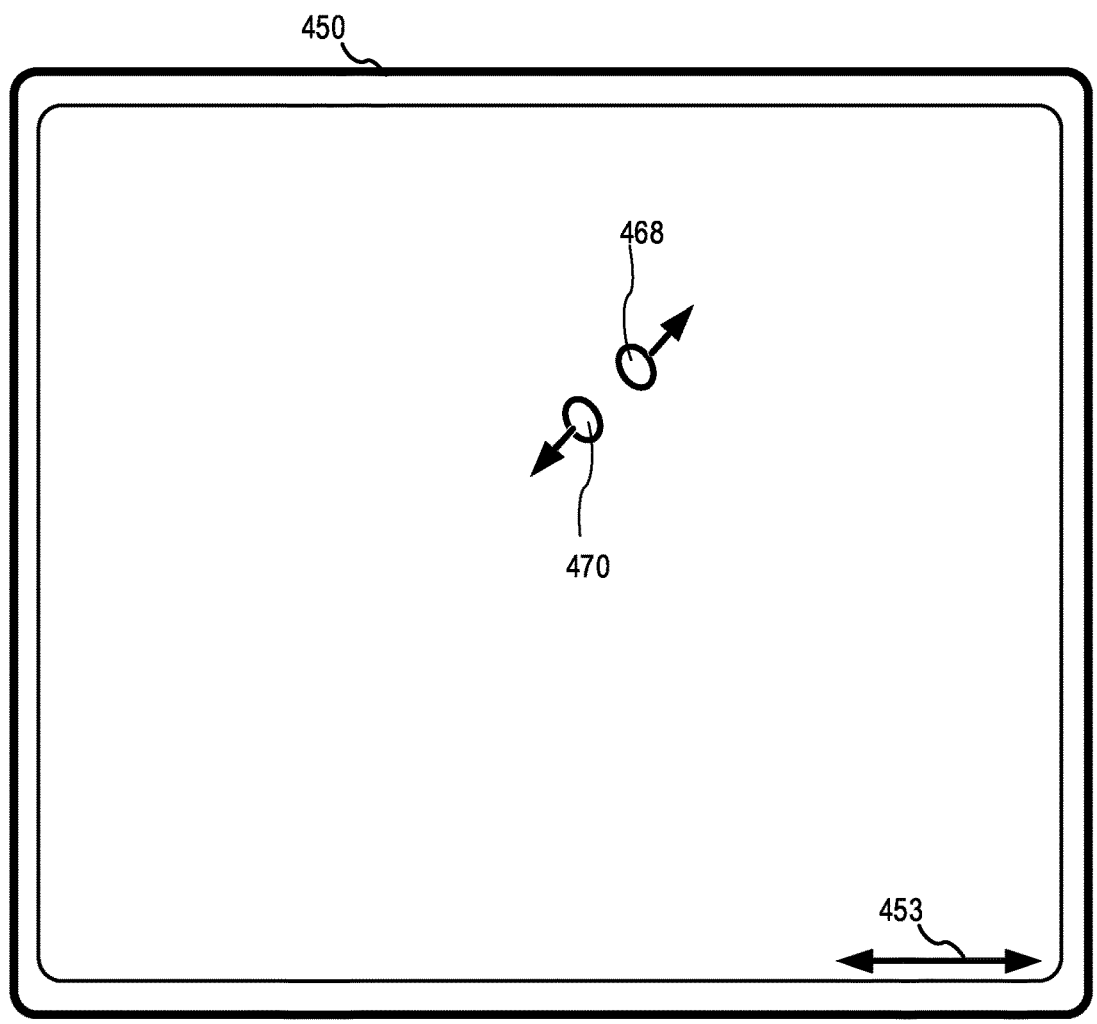
FIG. 4B illustrates an exemplary user interface for a multifunction device with a touch-sensitive surface that is separate from the display in accordance with some embodiments.
Figure 4B:
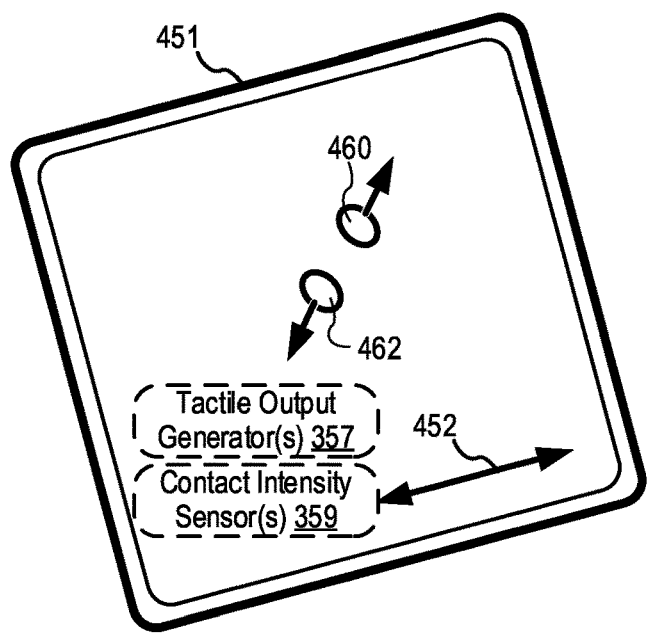

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
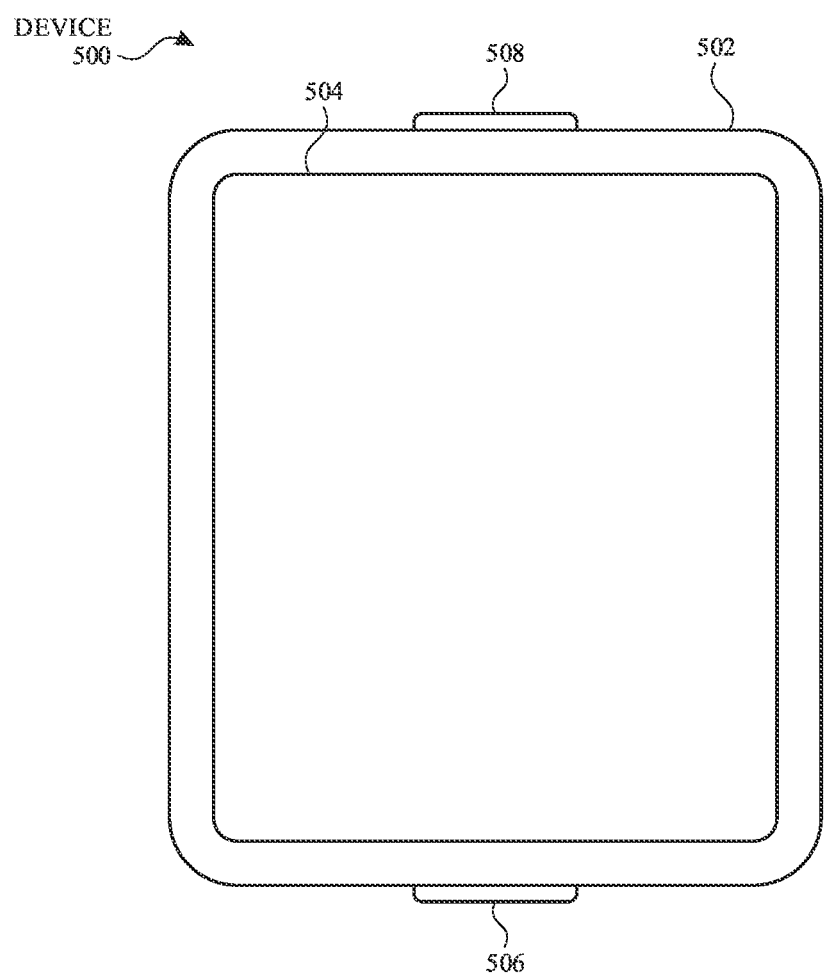
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504 device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No, WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
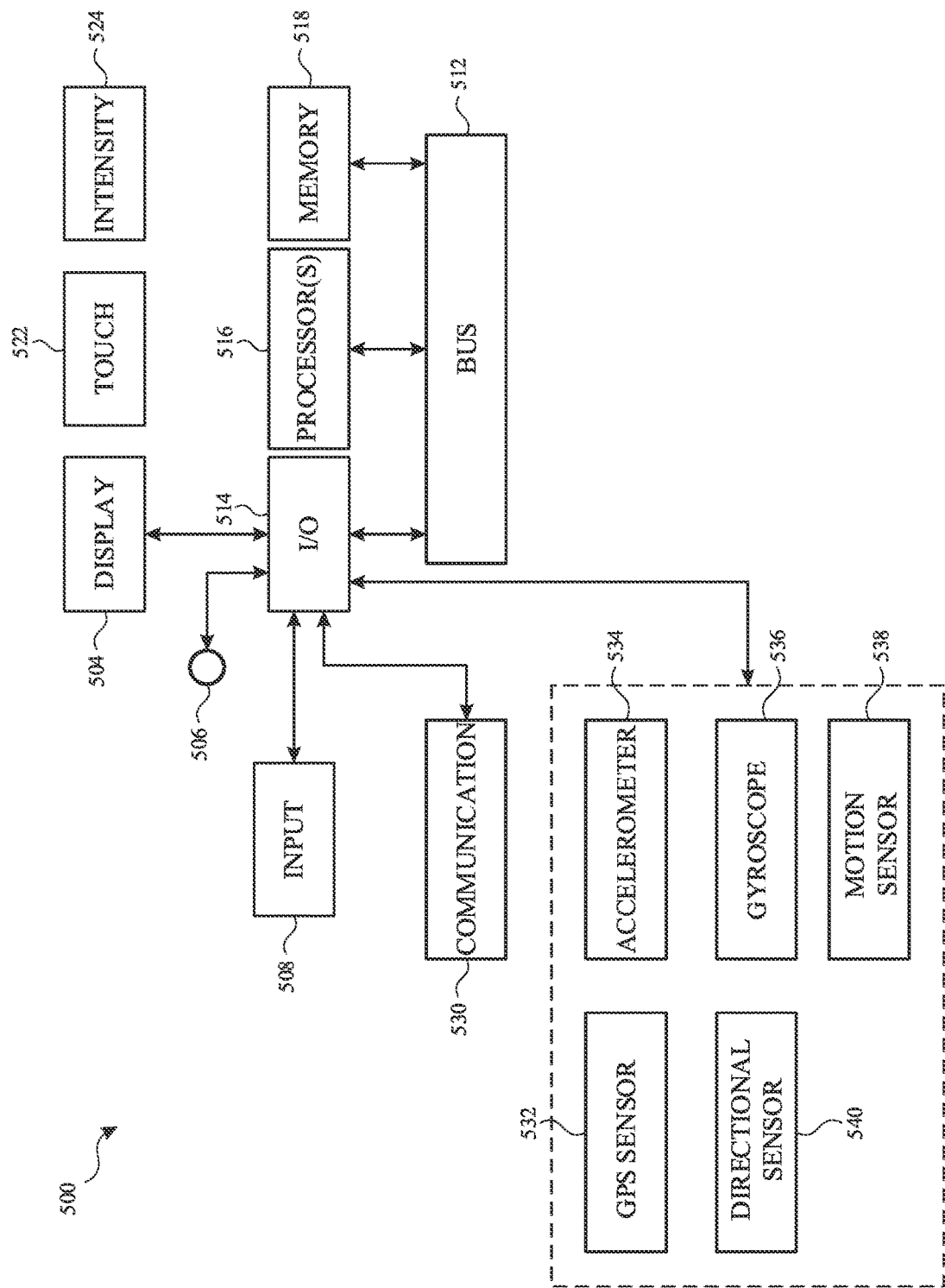
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, anchor a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6L illustrate exemplary user interfaces for configuring an external accessory (e.g., a smart outlet, a smart light bulb, a wireless router, a smart doorbell, a camera system, and/or a Wi-Fi enabled door lock) for use with a first device management application installed on a computer system (e.g., an electronic device, a smart device, such as a smartphone or a smartwatch, a mobile device, and/or a wearable device) and, after configuring the external accessory for use with the first device management application, displaying a prompt to configure the external accessory for use with one or more other device management applications.

The user interfaces in these figures are used to illustrate the processes described below, including the processes in FIG. 7.

FIGS. 6A-6F illustrate a method for configuring an external accessory for use with a first device management application (e.g., an application that is optionally used to manage (e.g., view a status and/or control) an external accessory (e.g., device), such as a system application, a first-party application, or a third-party application). In some embodiments, a first-party application is an application that is provided (e.g., created and/or sold) natively by a manufacturer and/or merchant of computer system 600. In some embodiments, a third-party application is an application that is provided (e.g., created and/or sold) by a manufacturer different from the manufacturer and/or merchant of computer system 600. In some embodiments, a third-party application is provided by the same manufacturer as smart outlet 606. Typically, a first-party application has a trust relationship with the operating system running on computer system 600, providing different capabilities (e.g., access to different APIs) than a third-party application. In the embodiment illustrated in FIGS. 6A-6L, the external accessory is a smart outlet (e.g., called "Acme Model XYZ") 606.

Figure 6A:
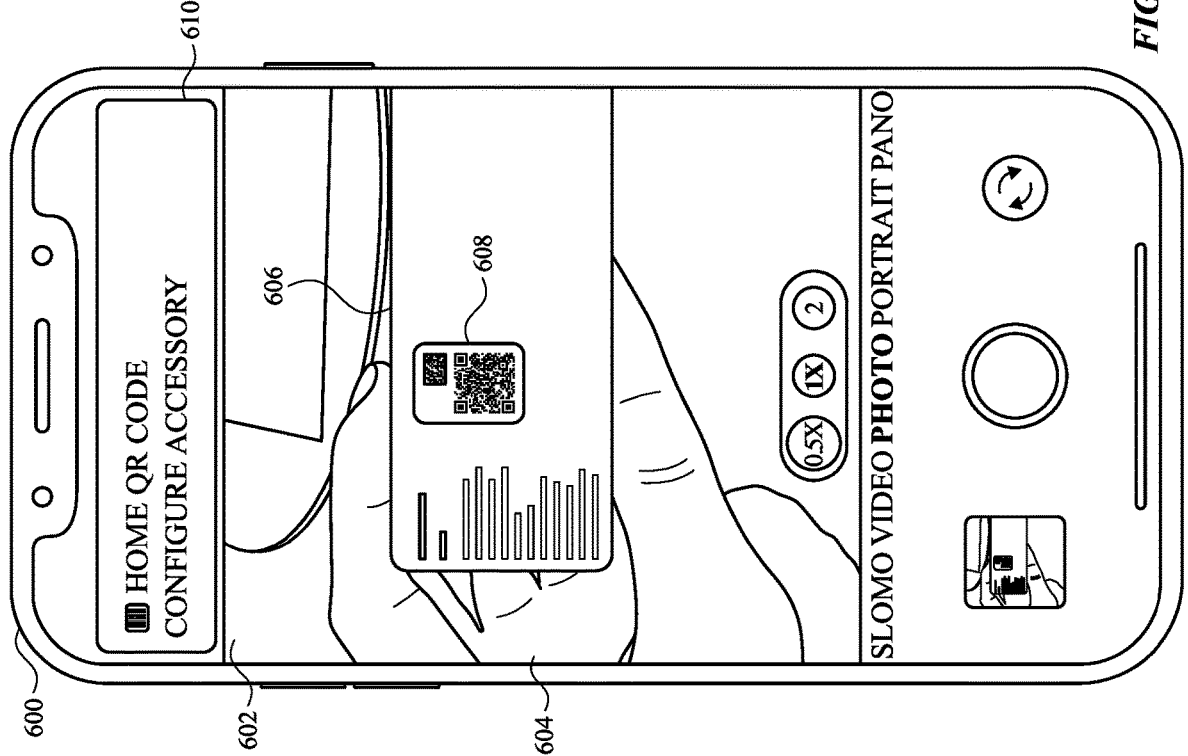

FIG. 6A illustrates computer system 600 (e.g., a smartphone) detecting (e.g., scanning) smart outlet 606, which is an external accessory. In FIG. 6A, computer system 600 detects (e.g., using system code) smart outlet 606 by detecting QR code 608, which is included on smart outlet 606, using a camera application of computer system 600. In particular, the user places QR code 608 within a field of view of a camera of computer system 600 while the field of view of the camera is displayed in the camera application. In some examples, computer system 600 must also receive user input (e.g., a tap) at a location within the field of view of the camera corresponding to QR code 608 before detecting smart outlet 606. It should be recognized that QR code 608 is merely an example of a type of code that is optionally detected via the camera application, and that other code and printed and displayed materials are optionally used for detecting smart outlet 606 via the camera application. In some embodiments, an external accessory is detected (e.g., using system code) using other means, such as by receiving an indication (e.g., a message) from a server (e.g., in response to a purchase of smart outlet 606), detecting smart outlet 606 using a sensor of computer system 600 (e.g., via an NFC tag, an ultra-wideband (UWB) radio signal, and/or by detecting smart outlet 606 using sensors that detect light-entitling diodes (LEDs), and receiving user input (e.g., through the use of a keyboard) of identification information for smart outlet 606.

In FIG. 6A, computer system 600 displays, via display 602, user interface 604. User interface 604 depicts a viewfinder of a camera (of computer system 600) showing an image of smart outlet 606 (e.g., user interface 604 is optionally a user interface of a camera application that is different from any device management application (first-party or third-party)). In some embodiments, user interface 604 includes one or more user interface elements (e.g., icons, affordances) that correspond to one or more affordances (e.g., buttons, selectable elements) related to controlling the camera application. In the embodiment illustrated in FIG. 6A, user interface 604 depicts smart outlet 606 with a QR code 608. In some embodiments, system code includes instructions of the operating system (e.g., excluding the pairing framework code) of the computer system. In some embodiments, the pairing framework code includes instructions (e.g., of the operating system) that parse information received from the external accessory and transmits information to the external accessory. In some embodiments, internal framework code includes instructions (e.g., called by the operating system) for managing (e.g., communicating) information among applications of the operating system as part of the pairing process (e.g., as part of the process to configure an external accessory for use with a device management application).

In FIG. 6A, in response to detecting QR code 608, computer system 600 overlays (e.g., using system code) notification 610 onto user interface 604 (e.g., notification 610 is optionally a user interface element of a device management application (a first-party or third-party device management application) different from the camera application). Notification 610 includes an indication ("configure accessory") that smart outlet 606 can be configured. Notification 610 includes text indicating that the smart outlet can be configured for use with a device management application (e.g., a system device management application, a first-party device management application (such as an application provided by the merchant of computer system 600), or a third-party device management application (such as an application provided by a merchant different from the merchant of computer system 600). Notification 610 is optionally selected (e.g., via a touch/tap input) to cause prompt 612 to be displayed, as illustrated in FIG. 6B.

In some embodiments, computer system 600 detects a tap input on notification 610 and, in response, displays the user interface as illustrated in FIG. 6B. FIG. 6B illustrates prompt 612 that is displayed (e.g., using system code) overlaying user interface 604 in response to notification 610 being selected. In some embodiments, computer system 600 initially detects (e.g., via NFC) smart outlet 606 while user interface 609 of a first device management application is displayed (e.g., without the process described with respect to FIG. 6A) and, in response, overlays prompt 612 on user interface 609 to indicate to the user that a smart outlet has been detected and is available to configure, as illustrated in FIG. 6B. Prompt 612 includes information related to configuring smart outlet 606 (e.g., text and/or an image representing the type of external accessory ("OUTLET") (e.g., 616), the make/model of the external accessory ("ACME MODEL XYZ"), and/or describing an option to add the external accessory to a device management application (e.g., 614)).

In some embodiments, computer system 600 (e.g., using system code) retrieves a setup payload (e.g., information that is optionally used to determine a setup code (e.g., information used by an accessory to validate a setup request, such as a hash of a pairing secret (e.g., plain text data)) and product data (e.g., manufacturer/make, product ID/model, or an identifier that is optionally used by another system to identify smart outlet 606) corresponding to smart outlet 606 (e.g., as part of detecting smart outlet 606 and/or using information received from smart outlet 606 as part of detecting smart outlet 606). In some embodiments, computer system 600 retrieves the setup payload by scanning QR code 608 using the camera application of computer system 600. In some embodiments, computer system 600 retrieves the setup payload by detecting information from an NFC tag corresponding to smart outlet 606. In some embodiments, computer system 600 retrieves the setup payload by detecting information via ultra-wideband (UWB) radio signal. In some embodiments, computer system 600 retrieves the setup payload using sensors that detect light-emitting diodes (LEDs). In some embodiments, prompt 612 is displayed using system code.

In some embodiments, computer system 600 (e.g., using pairing framework code) parses the setup payload to determine a setup code (e.g., information used by an accessory to validate a setup request, such as a hash of a pairing secret (e.g., plain text data)) and product data (e.g., manufacturer/make, product ID/model, or an identifier that is optionally used by another system to identify smart outlet 606). In some embodiments, computer system 600 (e.g., using system code) establishes a secure communication channel to smart outlet 606 using the setup code.

In some embodiments, computer system 600 (e.g., using pairing framework code) establishes a secure communication channel to smart outlet 606 using the setup code. In some embodiments, computer system 600 (e.g., using pairing framework code) provides and/or receives proof of authenticity to/from smart outlet 606 (e.g., using the secure channel).

In FIG. 6B, as described above, computer system 600 displays, via display 602, prompt 612 (e.g., using system code) for configuring smart outlet 606 for use with the first device management application. In some embodiments, prompt 612 only occupies a portion of a display of computer system 600, allowing at least a portion of user interface 609 of the first device management application to be concurrently displayed. In some embodiments, prompt 612 is displayed as an overlay over another user interface (e.g., user interface 604), rather than being overlaid on user interface 609. Prompt 612 includes text 614 asking whether smart outlet 606 should be configured for use with a particular application (e.g., called "control center/assistant", and/or a device management application). Text 614 identifies the type of accessory ("OUTLET"), the manufacturer/make of smart outlet 606 ("ACME"), and the model of smart outlet 606 ("XYZ"). In some embodiments, configuring smart outlet 606 for use with a respective device management application includes pairing smart outlet 606 with the respective device management application (e.g., such that smart outlet 606 accepts commands/instructions from the respective device management application to turn on or off power provided to electronics plugged into smart outlet 606). In FIG. 6B, prompt 612 includes image 616 representing smart outlet 606 (e.g., a glyph, an icon representing the type of external accessory, text indicating the type of external accessory), affordance 620 for dismissing (e.g., cancelling, exiting, ceasing to display) prompt 612, and affordance 618 for configuring smart outlet 606 for use with the first device management application.

Figure 6C:
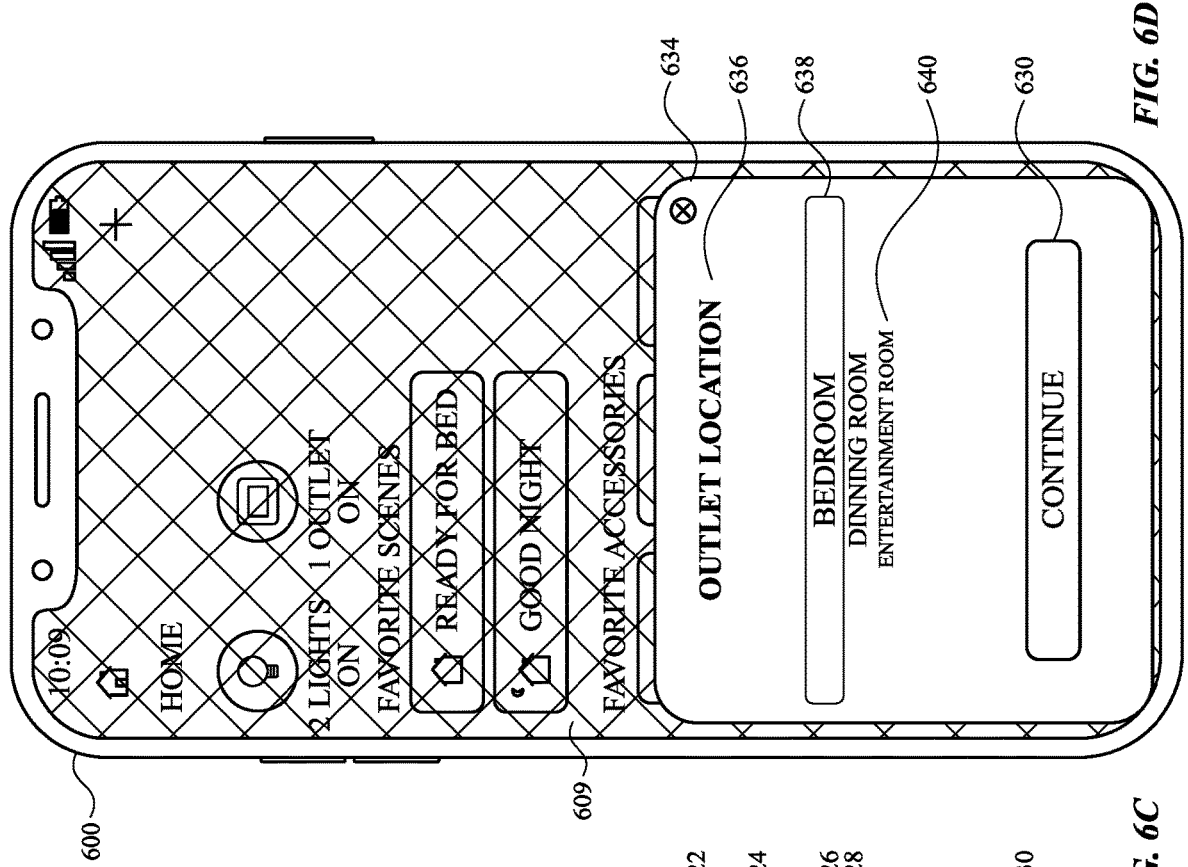

In FIG. 6C, in response to detecting a selection of (e.g., a tap input on) affordance 618, computer system 600 displays (e.g., using system code), via display 602, user interface 622 overlaid on user interface 609 of the first device management application. User interface 622 includes field 626 (e.g., a text entry field) for providing name 628 (e.g., "JOHN'S ACME SMART PLUG", external accessory configuration data) for smart outlet 606. User interface 622 includes indication 624 (e.g., text or instructions, such as "Use the name provided or enter a custom name.") that a name for smart outlet 606 is optionally provided by the user of computer system 600. In the example of FIG. 6C, the user has modified the text of name 628 to a user-specified name of "JOHN'S ACME SMART PLUG" by entering text via a soft keyboard of computer system 600. In some embodiments, name 628 has a default name that is displayed in field 626 (as the default) when user interface 622 is initially displayed. In some embodiments, the default name is based on information gathered (e.g., retrieved) from smart outlet 606. User interface includes affordance 630 for continuing to a next screen of the configuration process. User interface 622 includes affordance 632 for identifying other (e.g., additional, alternative) external accessories (e.g., other than smart outlet 606). User interface 622 occupies the same portion of the display as prompt 612 and maintains display of affordance 620. In response to detecting selection of (e.g., a tap input on) affordance 630 while displaying user interface 622 in FIG. 6C, computer system 600 displays user interface 634, as illustrated FIG. 6D.

Figure 6D:
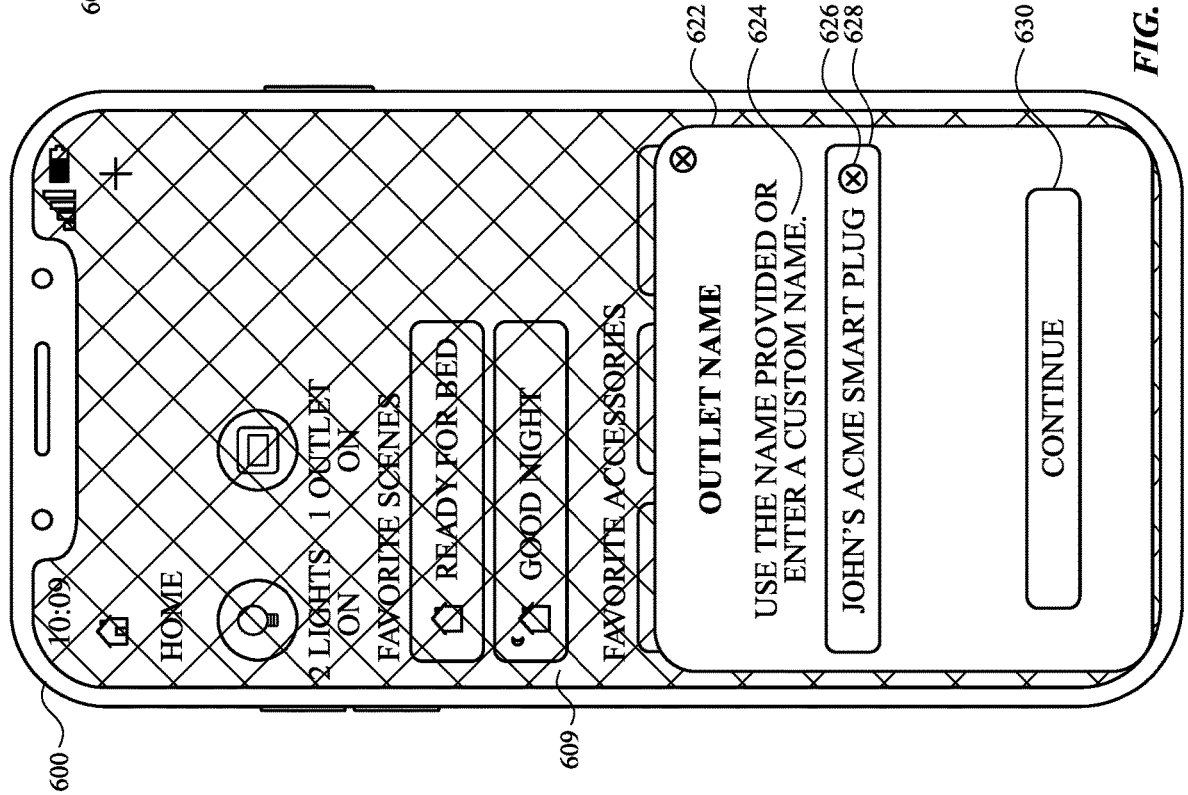

In FIG. 6D, computer system 600 displays, via display 602, user interface 634 for selecting a location or room (e.g., a location in a home, a bedroom, a dining room) with which smart outlet 606 will be associated, as part of configuring smart outlet 606 for use with the first device management application. User interface 634 includes indication 636 (e.g., "Outlet Location") that selection of a location/room for smart outlet 606 is to be provided by the user. User interface 634 includes scrollable options (e.g., a rotatable wheel of selectable rooms including, e.g., "Bedroom," "Dining Room") for the room with which smart outlet 606 will be associated. The currently selected room 638 is "Bedroom" by default (e.g., when user interface 634 is initially displayed). In FIG. 6D, a selectable room 640 ("Dining Room") option is displayed adjacent to the currently selected room 638 option. In some embodiments, a room option that is not currently selected as the room with which smart outlet 606 should be associated will be displayed with an indication that it is not currently selected (e.g., grayed out, semi-transparent, smaller font than the currently selected room). As illustrated in FIG. 6D, user interface 634 maintains display of affordance 630 and computer system 600 displays user interface 634 in the same portion of the display as in prompt 612 and 622. At FIG. 6D, computer system 600 detects selection of (e.g., a tap input on) affordance 630, and, in response user interface 644 is displayed, as illustrated in FIG. 6E.

In some embodiments, the user interfaces of FIG. 6C or FIG. 6D are optionally not displayed. In some embodiments, in response to detecting a selection of (e.g., a tap input on) affordance 618, computer system 600 displays (e.g., using system code), via display 602, user interface 644, as described below. In some embodiments, additional external accessory configuration data is optionally selected (e.g., inputted (e.g., via a soft keyboard)) on user interface 622 and/or user interface 634. In some embodiments, additional user interfaces displayed before or after one of user interfaces 622 or 634 include prompts (e.g., fields) for entering additional external accessory configuration data (e.g., a passcode to manage (e.g., control) the external accessory, default settings for the external accessory, scheduled hours of operation for the external accessory, options to manage (e.g., control) the external accessory with particular computer systems (e.g. devices)).

Figure 6E:
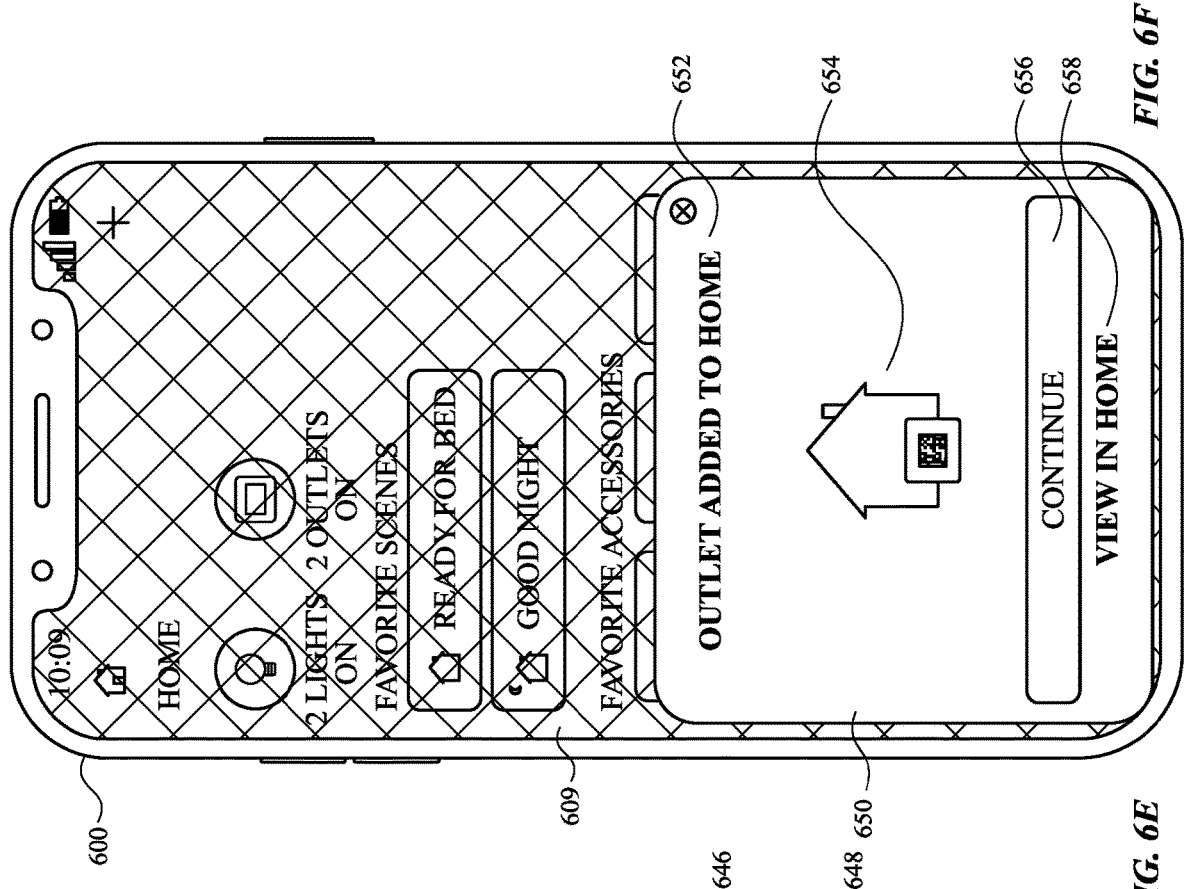

In FIG. 6E, computer system 600 displays, via display 602, user interface 644, which in some implementations includes an indication 646 that smart outlet 606 is connecting (e.g., being configured for use with the first device management application). User interface 644 includes loading icon 648 (e.g., a spinning wheel) to indicate that smart outlet 606 is in the process of being configured for use with the first device management application. Computer system 600 configures (pairs) (e.g., using pairing framework code) smart outlet 606 for use with the first device management application. In response to smart outlet 606 having been configured for use with the first device management application, user interface 650 is displayed, as illustrated in FIG. 6F.

Figure 6F:
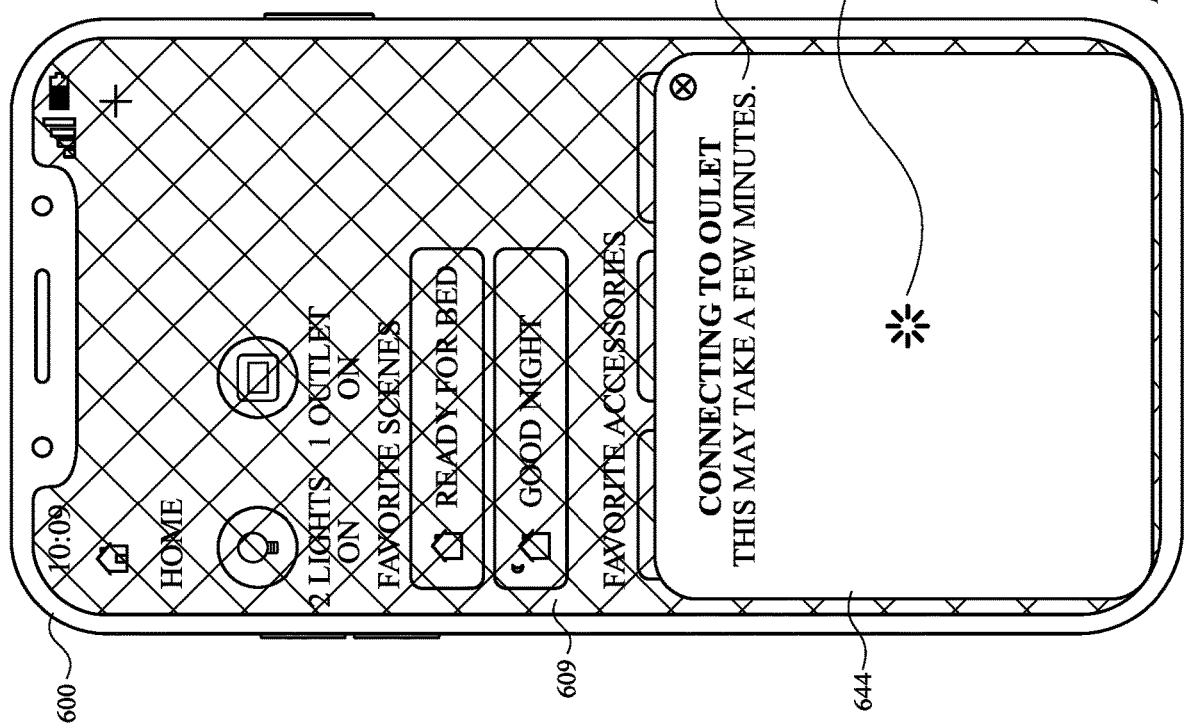

In FIG. 6F, user interface 650 includes indication 652 (e.g., confirmation text) that smart outlet 606 has been configured for use with the first device management application (e.g., "Outlet Added to Home"). User interface 650 includes icon 654, which represents the first device management application (e.g., a glyph or icon associated with the first device management application). In some embodiments, user interface 650 includes affordance 658 for viewing controls for (e.g., controlling, managing) smart outlet 606 in the first device management application. Selecting affordance 658 causes user interface 650 to be dismissed and for user interface 609 of the first device management application to be displayed (e.g., full screen and/or without any other programs overlaid on user interface 609). At FIG. 6D, computer system 600 detects selection of (e.g., a tap input on) affordance 656 and, in response, displays (e.g., using system code) user interface 660, as illustrated in FIG. 6G. As a result of completing configuring smart outlet 606 for use with the first device management application, first device management application is now operable to control smart outlet 606, such as by turning on or off power provided to electronics plugged into smart outlet 606. For example, the first device management application optionally receives a schedule from a user for days/times that the power of smart outlet 606 should be on and off, and the first device management application uses the schedule to instruct smart outlet 606 to be on and off, as specified in the user-provided schedule. For another example, first device management application receives user input to change the power (e.g., from on to off, from off to on) provided to electronics plugged into smart outlet 606 and, in response, first device management application instructs smart outlet 606 to change the power (e.g., from on to off, from off to on) provided to electronics plugged into smart outlet 606.

In some embodiments, the user interfaces of FIG. 6E or FIG. 6F are optionally not displayed. Instead, in response to completing configuring smart outlet 606 for use with the first device management application, computer system 600 transitions directly from the user interfaces of FIG. 6D or FIG. 6E to the user interfaces of FIG. 6G.

FIGS. 6G-6L illustrate exemplary user interfaces for configuring smart outlet 606 for use with a second device management application, and for controlling smart outlet 606 using the second device management application.

In FIG. 6G, computer system 600 displays (e.g., using system code), via display 602, prompt 660. In some embodiments, prompt 660 is displayed (e.g., initiated) by a first-party application. In some embodiments, prompt 660 is displayed (e.g., initiated) by a third-party application. Prompt 660 includes options for initiating (e.g., by displaying a user interface of a respective device management application) a process to configure smart outlet 606 for use with other applications (e.g., a second device management application (e.g., an application provided/written by the manufacturer of smart outlet 606, a first-party application provided/written by the manufacturer of computer system 600, and/or a third-party application provided/written by a manufacturer different from the manufacturer of smart outlet 606 and the manufacturer of computer system 600) that is different from the first device management application, a third device management application that is different from the first and second device management applications). Text 662 indicates that smart outlet 606 can be configured for use with additional applications. Prompt 660 includes affordance 664 for configuring smart outlet 606 for use with a second device management application. Prompt 660 also includes affordance 670 for configuring smart outlet 606 for use with a third device management application that is different from the first device management application and the second device management application. In some embodiments, prompt 660 includes affordances for initiating a process to configure smart outlet 606 for use with certain device management applications based on a determination that the certain device management applications are available (e.g., currently downloaded and/or installed) on computer system 600. In some embodiments, in accordance with a determination that additional device management applications are not available (e.g., not currently downloaded and/or installed on computer system 600), computer system 600 forgoes including affordances for initiating a process to configure smart outlet 606 for use with the additional device management applications in prompt 660. In some embodiments, prompt 660 includes an affordance for displaying one or more affordances for configuring smart outlet 606 for use with one or more additional device management applications that are not included in prompt 660 at least partially based on the determination that the additional device management applications are not available (e.g., not currently downloaded and/or installed) on computer system 600.

Figure 6H:
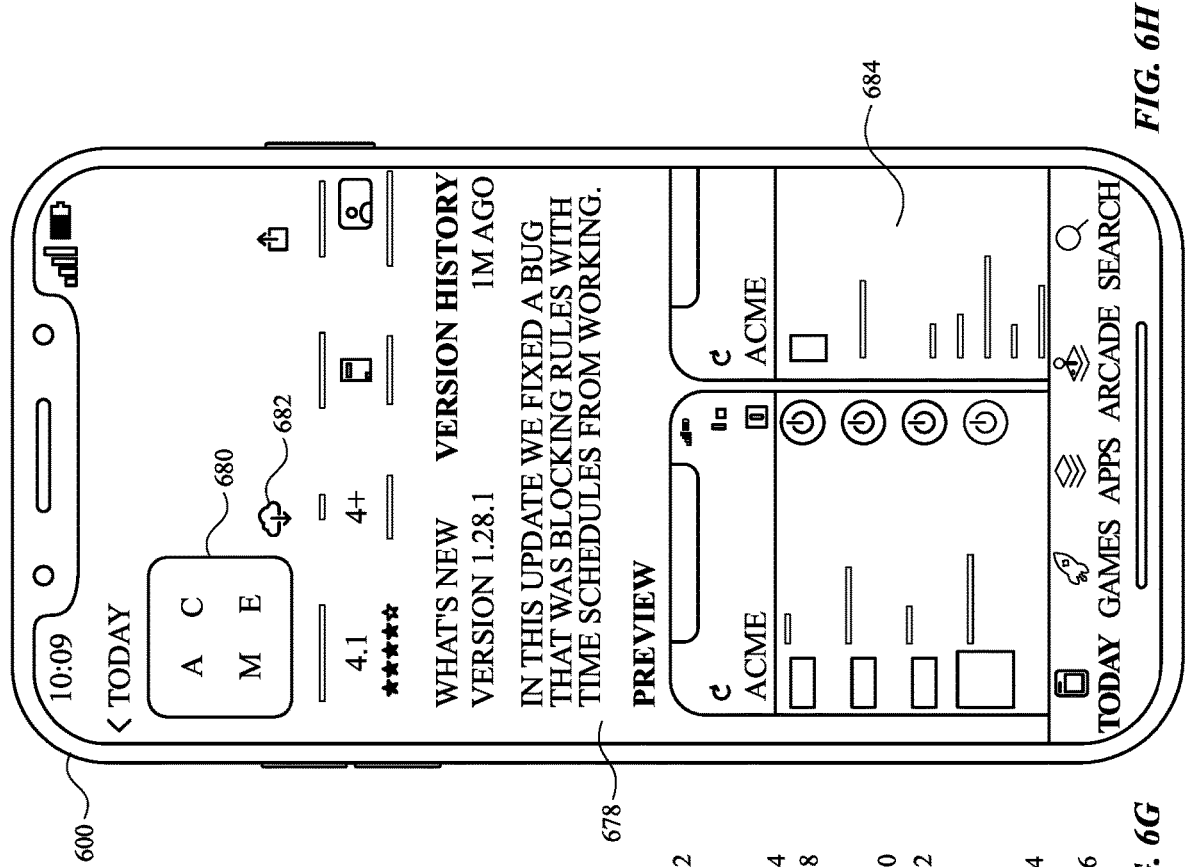
Figure 6G:
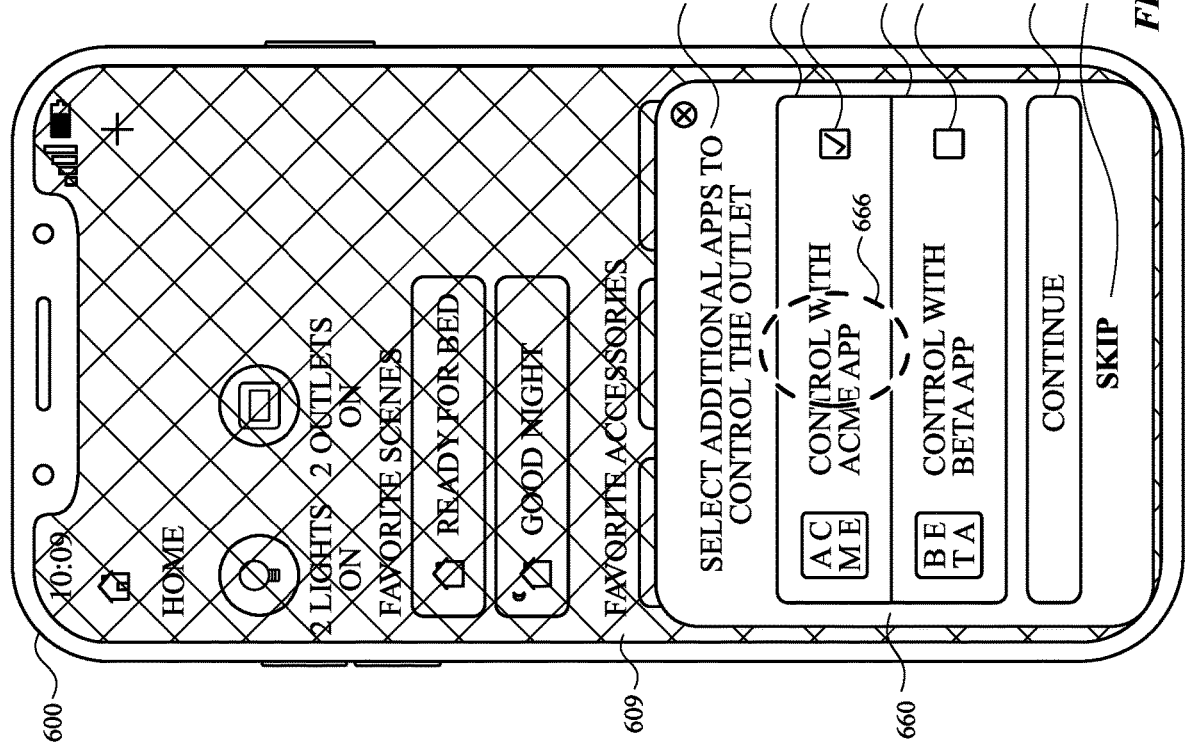

In some embodiments, input 666 (e.g., a tap) on affordance 664 initiates the process to configure smart outlet 606 for use with the second device management application, causing display of the user interfaces as shown in FIG. 6H. Thus, computer system 600 receives selection of (e.g., a tap input on) affordance 664 or affordance 670 and, in response, initiates a process for configuring smart outlet 606 for use with the respective device management application, including displaying user interfaces as described with respect to FIGS. 6J and/or 6I. In some embodiments, initiating the process for configuring smart outlet 606 for use with the respective device management application includes generating (e.g., using pairing framework code) and/or passing (e.g., using pairing framework code) a new setup code to smart outlet 606 (e.g., over the secure channel). In some embodiments, initiating the process for configuring smart outlet 606 for use with the respective device management application includes first device management application calling an application programming interface (API) provided by the operating system of computer system 600 to have the operating system of computer system 600 pass a pairing secret (e.g., included with the API call) (e.g., that corresponds to or is the same as the setup code; in some embodiments, the pairing secret is plain text data that is hashed to form the setup code) and information corresponding to smart outlet 606 (e.g., the name for smart outlet 606 and the room/location of smart outlet 606) to the respective device management application. In some embodiments, computer system 600 stores (e.g., using internal framework code, internal system framework code, and or the respective device management application) the pairing secret (e.g., that corresponds to or is the same as the setup code), the name for smart outlet 606, and the room/location of smart outlet 606 for use by the second device management application (e.g., shared memory or to transmit to the second device management application when the second device management application is launched and/or displayed).

In some embodiments, however, inputs on affordance 664 and affordance 670 cause the respective option to be selected (or deselected). In one implementation, when an affordance (e.g., 664 and/or 670) corresponding to a respective device management application is selected (e.g., in response to a tap input on the respective affordance), indication 668 (e.g., a checkmark, strikethrough line, and/or a green circle) is displayed on and/or next to the selected affordance(s). In some embodiments, a lack of indication 668 displayed on and/or next to an affordance indicates that the corresponding device management application has not been selected. In some embodiments, additional ways of showing selection and non-selection are optionally used. In response to computer system receiving selection of (e.g., an input on, a tap on) affordance 674, computer system 600 initiates the process to configure smart outlet 606 for use with device management applications of the selected affordances. At FIG. 6G, affordance 664 corresponding to the second device management application has been selected in response to input 666, as indicated by indication 668. In response to receiving selection of continue affordance 674, computer system 600 initiates the process for configuring smart outlet 606 for use with the second device management application, including displaying user interfaces as described with respect to FIGS. 6H and/or 6I.

Prompt 660 optionally includes skip affordance 676 for electing not to configure smart outlet 606 for use with any additional device management applications. When skipped, smart outlet 606 can still be added for use with other additional device management applications through a typical flow within those additional device management applications (e.g., via manually launching a device management application, selecting an option to configure an external device for use the device management application, and proceeding through a device-setup process provided by the device management application (In some embodiments, the setup process provided by the device management application includes a QR code based setup and/or manual entry of external accessory information)). In some embodiments, configuring smart outlet 606 for use with a respective device management application includes pairing smart outlet 606 with the respective device management application (e.g., such that smart outlet 606 accepts commands/instructions from the respective device management application).

In FIG. 6H, computer system 600 displays, via display 602, user interface 678 in response to receiving selection of the option (e.g., tap on 664 and/or tap on 674) to initiate a process to configure smart outlet 606 for use with the second device management application (and, in some embodiments, additional device management applications), and optionally, based on a determination that the second device management application is not available for display (and/or execution) on computer system 600 (e.g., when the second device management application is not currently downloaded). User interface 678 is a user interface for downloading the second device management application. In FIG. 6H, user interface 678 is a page of a store (e.g., a catalog) of applications that are optionally downloaded (e.g., using system code) onto computer system 600. User interface 678 includes representation 680 (e.g., a glyph, an icon corresponding to the device management application) of the second device management application and affordance 682 for downloading the second device management application. User interface 678 includes information (e.g. a text description, screenshots, images) representing the second device management application. As illustrated in FIG. 6H, computer system 600 receives selection of affordance 682 and, in response, downloads the second device management application. After downloading the second device management application (e.g., in response to additional user inputs), computer system 600 displays the user interface of FIG. 6I.

In some embodiments, computer system 600 forgoes displaying user interface 678 when the second device management application is already available (e.g., downloaded) on computer system 600. In response to input 666 on affordance 664, or in response to a selection of continue affordance 674 (e.g., in response to selection of the option to initiate a process to configure smart outlet 606 for use with a second device management application), computer system 600 displays, via display generation device 602, user interface 685, as shown in FIG. 6I.

In FIG. 6I, user interface 685 is a user interface of the second device management application. User interface 685 includes an indication 687 of smart outlet 606 (e.g., the external accessory currently being configured for use with the second device management application). User interface 685 optionally includes editable field 688 for selecting a name for smart outlet 606, and editable field 689 for selecting a room/location of smart outlet 606. In some embodiments, editable fields 688 and 689 are prepopulated (e.g., by default) with the name and/or room information obtained during the configuration of smart outlet 606 for use with the first device management application (e.g., name 628, room 638).

User interface 685 includes pair affordance 690 for configuring smart outlet 606 with the second device management application (e.g., ACME Application, provided by the manufacturer (ACME) of smart outlet 606). In some embodiments, receiving tap input 691 on affordance 690 causes smart outlet 606 to be configured for use with the second device management application. In response to completing configuring smart outlet 606 for use with the second device management application and/or in response to receiving input 691, computer system 600 displays, via display 602, user interface 692, which indicates that smart outlet 606 has been configured for use with the second device management application.

User interface 692 is a user interface of the second device management application (e.g., ACME Application) that is displayed after the configuration of smart outlet 606 for use with the second device management application has been completed. User interface 692 includes an indication 693 that smart outlet 606 has been configured for use (e.g., paired) with the second device management application. As a result of completing configuring smart outlet 606 for use with the second device management application, both the first device management application and the second device management application are now operable to control smart outlet 606, such as by turning on or off power provided to electronics plugged into smart outlet 606. For example, the second device management application optionally receives a schedule from a user for days/times that the power of smart outlet 606 should be on and off, and the second device management application uses the schedule to instruct smart outlet 606 to be on and off, as specified in the user-provided schedule. For another example, second device management application receives user input to change the power (e.g., from on to off, from off to on) provided to electronics plugged into smart outlet 606 and, in response, second device management application instructs smart outlet 606 to change the power (e.g., from on to off, from off to on) provided to electronics plugged into smart outlet 606.

User interface 692 includes affordance 695 for powering smart outlet 606 on or off (e.g., controlling smart outlet 606, toggling the power of electronics plugged into smart outlet 606). Affordance 695 indicates whether smart outlet 606 is "On" or "Off." User interface 692 includes name 694 of smart outlet 606 that was selected during the configuration of smart outlet 606 (e.g., "JOHN'S ACME SMART PLUG"). In some embodiments, affordance 695 is displayed adjacent to name 694.

Figure 6K:
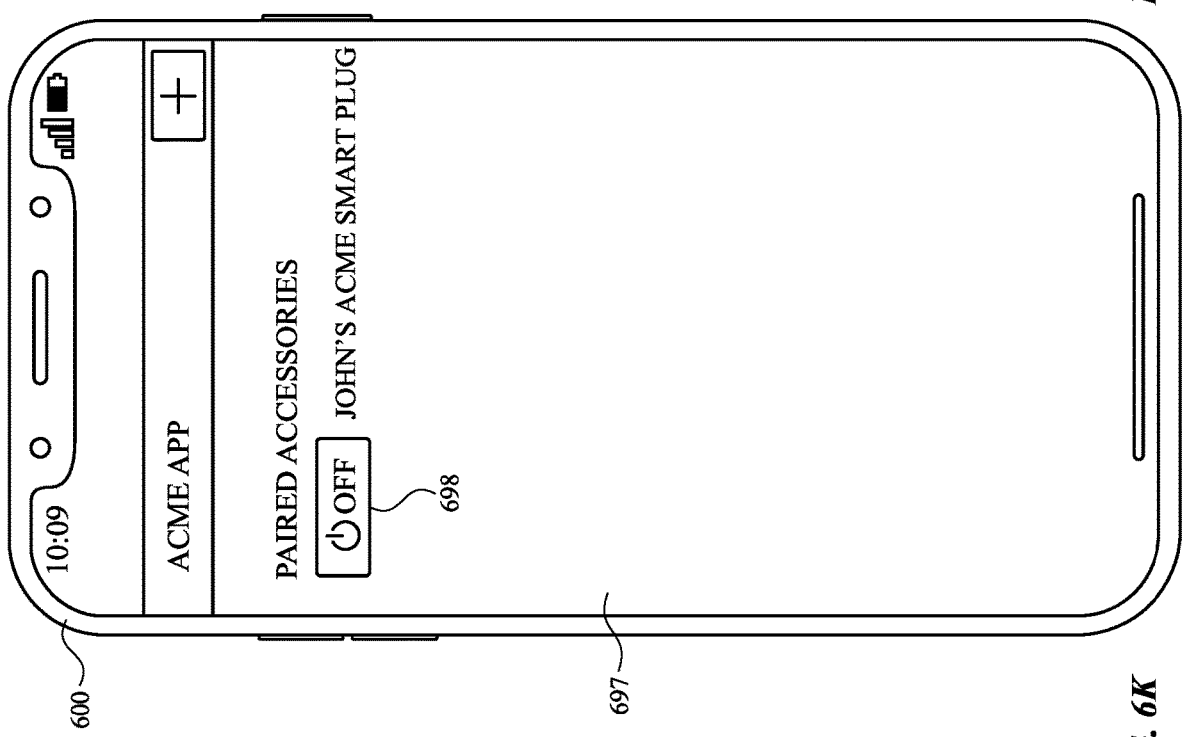

In FIG. 6K, computer system 600 receives user input 696 (e.g., a tap input) on affordance 694, requesting that smart outlet 606 should be turned off (e.g., toggled from "On" to "Off"). In response to input 696, computer system 600 transmits an instruction to smart outlet 606 to turn off power to electronics plugged into smart outlet 606 and displays, via display 602, user interface 697.

Figure 6L:
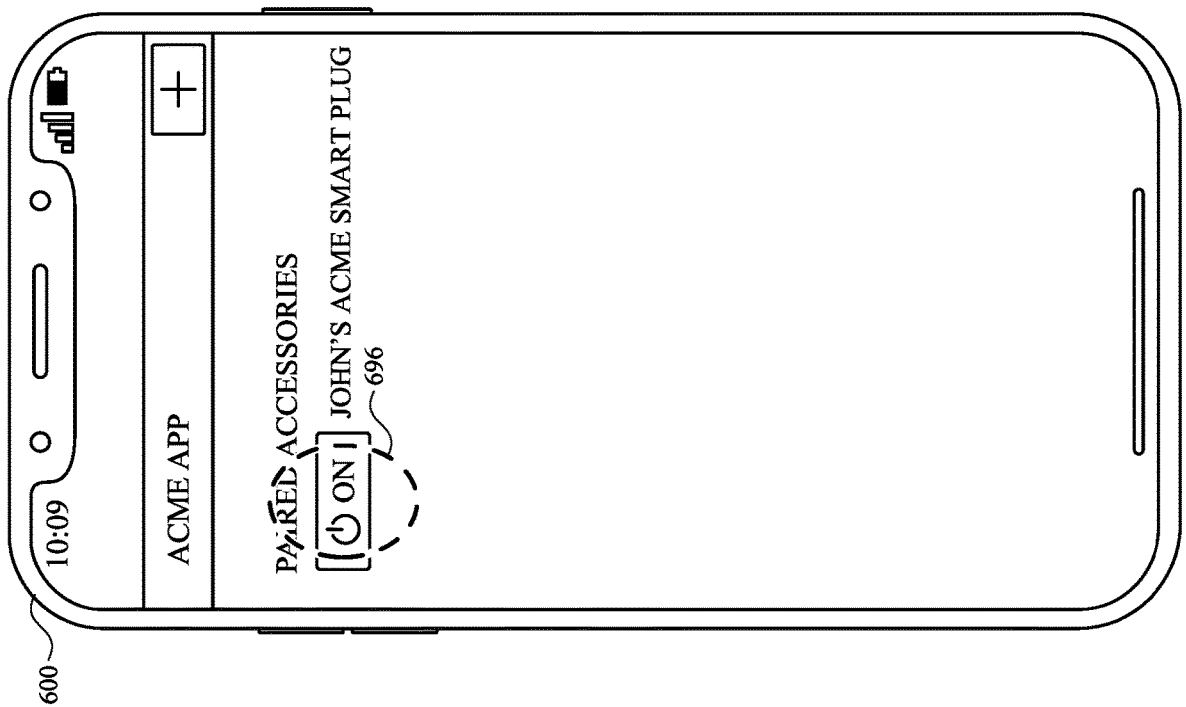

In user interface 692 of FIG. 6L the power state of smart outlet 606 has been toggled, and thus affordance 694 is replaced with affordance 698, which indicates that smart outlet 606 is now "Off."

In some embodiments, additional affordances for controlling additional features and/or additional paired external accessories are also displayed in user interface 692. In some embodiments, the features of smart outlet 606 that are optionally controlled via the first device management application and the second device management application are the same. In some embodiments, the features of smart outlet 606 that are optionally controlled via the first device management application and the second device management application are different and, optionally, overlap. In some embodiments, configuration for smart outlet 606 can be edited after initial setup using any device management application with which smart outlet 606 was configured for use (e.g., set up). In one embodiment, if information for smart outlet 606 is edited on one application, a prompt is optionally displayed to allow a user to propagate the edits to other applications in which the smart outlet can be controlled. In another embodiment, the edits may automatically propagate to other applications in which the smart outlet can be controlled. In some embodiments, computer system 600 can configure smart outlet 606 to not be configured for use with a (previously paired) device management application. For example, configuration information of smart outlet 606 can be deleted (e.g., removed) from any device management application with which smart outlet 606 is configured for use (e.g., set up). In some embodiments, configuration information for smart outlet 606 is optionally deleted from a device management application via a series of inputs (e.g., touch inputs) received by computer system 600. In some embodiments, if smart outlet 606 is deleted from a first device management application, a prompt is optionally displayed to allow a user to delete the configuration information for smart outlet 606 from another (e.g., a second) device management application with which smart outlet 606 has been configured for use. In some embodiment, if configuration information for smart outlet 606 is deleted from a first device management application, configuration information for smart outlet 606 is automatically deleted (e.g., without requiring further user input) from other (e.g., at least a second) device management application(s) with which smart outlet 606 has been configured for use.

FIG. 7 is a flow diagram illustrating a method for initiating a process to configure an external accessory for use with a device management application using a computer system in accordance with some embodiments. Method 700 is performed at a computer system (e.g., 100, 300, 500, 600, 800) with a display generation component and one or more input devices. Some operations in method 700 are, optionally, combined, the orders of some operations are, optionally, changed, and some operations are, optionally, omitted.

As described below, method 700 provides an intuitive way for initiating a process to configure an external accessory for use with a device management application. The method reduces the cognitive burden on a user for initiating a process to configure an external accessory for use with a device management application, thereby creating a more efficient human-machine interface. For battery-operated computing devices, enabling a user to initiate a process to configure an external accessory for use with a device management application faster and more efficiently conserves power and increases the time between battery charges.

At a computer system (e.g., 600) (e.g., an electronic device, a smart device, such as a smartphone or a smartwatch, a mobile device, and/or a wearable device) that is in communication with a display generation component (e.g., 602) and one or more input devices (e.g., an NFC radio, a touch-sensitive surface, a microphone, an infrared sensor, and/or a camera sensor): (In some embodiments, the computer system configures an external accessory for use with a first device management application (e.g., a device management application) (In some embodiments, during the configuration process, the computer system receives information for configuring the accessory and processing (e.g., parsing) the information using the first device management application.); and) while displaying a user interface (e.g. 609) of a first device management application and after configuring (e.g., in response to completing configuring) the external accessory (e.g., 606) for use with the first device management application, the computer system (e.g., 600) displays (702), via the display generation component, (e.g., concurrently with at least a portion of a user interface of the device management application) a prompt (e.g., 660) with an option (e.g., 664, 670, and/or 674) to initiate (e.g., by displaying a user interface of the second device management application) a process to configure the external accessory for use with a second device management application (e.g., not a system application, a third-party configuration application) that is different from the first device management application; In some embodiments, configuring the external accessory for use with a respective device management application includes pairing the external accessory with the respective device management application (e.g., such that the external accessory accepts commands/instructions from the respective device management application). In some embodiments, the second device management application configures the external accessory for use with the second device management application. In some embodiments, the second device management application is an aggregator application. In some embodiments, an aggregator application is an application that is optionally configured for use with external accessories from several different manufacturers.

In some embodiments, while displaying the prompt (e.g., 660), the computer system (e.g., 600) receives (704), via the one or more input devices, selection (e.g. 666 and/or tap on affordance 674) of (e.g., tap input on) the option to initiate a process to configure the external accessory for use with a second device management application; and In some embodiments, in response to receiving selection of the option to initiate a process to configure (and, optionally, configuring) the external accessory for use with a second device management application, the computer system (e.g., 600) initiates (706) a process to configure the external accessory for use with the second device management application. Displaying a prompt that includes an option to initiate a process to configure the external accessory for use with a second device management application after configuring the external accessory for use with the device management application provides visual feedback that the external accessory can also (e.g., additionally) be configured for use with the second device management application, and that the external accessory is not limited to being configured exclusively with the device management application with which it has already been configured for use. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently. Displaying the prompt also provides visual feedback allowing a user to quickly and efficiently configure the external accessory for use with the second device management application, and reduces the number of inputs required to configure the external accessory for use with the second device management application after having configured the external accessory for use with a device management application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to configuring the external accessory (e.g., 606) for use with the first device management application (and, optionally, while displaying a user interface of a first device management application), the computer system (e.g., 600) receives a request (e.g., as shown in FIGS. 6A and/or 6B) (e.g., information, such as a QR code or other bar code, detected using a camera sensor; and/or information detected via NFC) to configure the external accessory (e.g., a smart outlet, a smart light bulb, a wireless router, a smart doorbell, a camera system, a Wi-Fi enabled door lock, etc.). In some embodiments, configuring the external accessory for use with the first device management application uses information (e.g., a code, a pairing secret) received as part of the request. Receiving a request to configure an external accessory for use (e.g., with a respective application) enables the device to disambiguate which external device should be configured, such as from a plurality of nearby devices. Identifying the particular accessory to configure provides added security by helping to avoid unintentionally pairing a program of the computer system with an unintended external device/accessory, thereby making the computer system more secure.

In some embodiments, receiving the request to configure the external accessory (e.g., 606) includes retrieving pairing information (e.g., a setup payload, a pairing secret (e.g., a code)(such as used for security)), at the computer system (e.g., 600), via a bar code (e.g., 608) (e.g., a quick response (QR) code), a near field communication (NFC) tag, an ultra-wide band radio, or a plurality of light emitting diodes (LEDs) (or, optionally, manual entry using a keyboard) corresponding to (e.g., of) the external accessory. Retrieving pairing information corresponding to the external accessory via a bar code, a near field communication (NFC) tag, an ultra-wide band radio, or a plurality of light emitting diodes (LEDs) enables the device to disambiguate which external device should be configured, such as from a plurality of nearby devices. Identifying the particular accessory to configure provides added security by helping to avoid unintentionally pairing a program of the computer system with an unintended external device/accessory, thereby making the computer system more secure.

In some embodiments, the prompt (e.g., 660) is displayed (e.g., provided) by a first requesting application (e.g., an application that is part of the operating system of the computer system) different from the first device management application (e.g., an application other than the operating system). In some embodiments, displaying the prompt includes concurrently displaying the prompt (e.g., in a first area (e.g., the bottom half of the screen) of the display) with at least a portion of the user interface (e.g., 609) of the first device management application (e.g., displayed in a second area (e.g., the top half of the screen) of the display). Concurrently displaying the prompt with at least a portion of the first device management application provides the user with visual feedback about the context of the computer system—that the first device management application is being displayed and that a separate application is providing a prompt that is separate from the first device management application. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently. Additionally, providing the prompt separate from a user interface of the first device management application provides the user with feedback that the prompt is secure and provided by a trusted source (e.g., the OS, an application that is part of the OS).

In some embodiments, the computer system (e.g., 600) retrieves a set of product data (e.g., manufacturer of the external accessory, a name or other identifier of an application corresponding to the external accessory) associated with the external accessory (e.g., 606) (e.g., by looking up product data based on information parsed from the request, such as the detected QR code, NFC tag, UWB data, and/or LEDs)). In some embodiments, after retrieving the set of product data, the computer system (e.g., 600) determines, at least partially based on the set of product data, whether the second device management application (e.g., a third party app, a third party app clip) is available (e.g., to execute, and/or is steed on the computer system). In some embodiments, in accordance with (e.g., in response to) a determination that the second device management application is not available (e.g., that the second device management application is not currently downloaded and/or installed), the option to initiate the process to configure the external accessory (e.g., 606) for use with the second device management application is an option that includes initiating a process to download (e.g., as shown in FIG. 6H) the second device management application. In some embodiments, the process to download the second device management application includes displaying a second prompt (e.g., a page corresponding to the second device management application in an application store) including an option to obtain (e.g., download) the second device management application. In some embodiments, wherein, in accordance with a determination that the second device management application is available (e.g., that it has already been downloaded and/or installed), the option to initiate the process to configure the external accessory for use with the second device management application does not including initiating a process to download the second device management application. In some embodiments, to download the device management application, the computer system prompts the user for login info (e.g., to authorize downloading second device management application). In some embodiments, the second device management application is an application of the manufacturer of the external accessory. In some embodiments, the set of product data is retrieved from a database using information received in the request. The set of product data identifies a manufacturer and/or a model of the external accessory. The manufacturer and/or model of the external accessory is used to identify the relevant second device management application. Displaying a prompt including an option to obtain the second device management application in accordance with a determination that the second device management application is not available (e.g., is not currently downloaded and/or installed) provides visual feedback that the not yet available device management application is optionally made available (e.g., downloaded and installed) quickly and efficiently be obtained through a selection of the selectable user interface object. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently. Additionally, displaying a prompt including an option to obtain the second device management application in accordance with a determination that the second device management application is not available (e.g., is not currently downloaded and/or installed) enables the computer system to provide the user with the ability to download the relevant application without needing to navigate to a search interface and enter the name of the application, thereby reducing the number of inputs needed to download the application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) retrieves a set of product data (e.g., manufacturer of the external accessory, a name or other identifier of an application corresponding to the external accessory) associated with the external accessory (e.g., 606) (e.g., by looking up product data based on information parsed from the request, such as the detected QR code, NEC tag, UWB data, and/or LEDs). In some embodiments, after retrieving the set of product data, the computer system (e.g., 600) determines, at least partially based on the set of product data, whether the second device management application (e.g., a third party app, a third party app clip) is available (e.g., to execute and/or display) on the computer system (e.g., 600) (e.g., the second device management application is already downloaded (and/or installed) on the computer system). In some embodiments, in accordance with (e.g., in response to) a determination that the second device management application is available, the option to initiate the process to configure the external accessory for use with the second device management application is an option that includes displaying a user interface (e.g., 685) of the second device management application (e.g., by starting the application). In some embodiments, displaying a user interface of the second device management application includes displaying a second prompt (e.g., a user interface corresponding to the second device management application) including an option to configure the external accessory for use with the second device management application. In some embodiments, selection of the option to configure the external accessory for use with the second device management application opens (e.g., launches) the second device management application. Displaying a prompt including an option to display a user interface of the second device management application in accordance with a determination that the second device management application is available provides visual feedback that the second device management application is available (e.g., downloaded and installed), and that the process to configure the external accessory for use with the second device management application can proceed. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently. Additionally, displaying a prompt including an option to display the second device management application in accordance with a determination that the second device management application is available (e.g., has been downloaded and/or is installed) enables the computer system to provide the user with the ability to display the relevant application without needing to navigate to a search interface and enter the name of the application, thereby reducing the number of inputs needed to start the application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) retrieves a set of product data (e.g., manufacturer of the external accessory, a name or other identifier of an application corresponding to the external accessory, the names of applications suitable to be configured for use with the external accessory) associated with the external accessory (e.g., 606) (e.g., by looking up product data based on information parsed from the request, such as the detected QR code, NFC tag, UWB data, and/or LEDs). In some embodiments, after retrieving the set of product data, the computer system (e.g., 600) determines, at least partially based on the set of product data, one or more respective device management applications that are compatible to be configured for use with the external accessory (e.g., a third party app, a third party app clip, an application compatible to be configured for use with accessories of multiple manufacturers) (e.g., that are available on the computer system or that are not available on the computer system (e.g., but can be downloaded)). In some embodiments, display of the option, as part of the prompt (e.g., 660), to initiate a process to configure the external accessory for use with the second device management application is based on the second device management application being determined as compatible to be configured for use with the external accessory. In some embodiments, in accordance with a determination that an additional device management application is compatible to be configured for use with the external accessory, the computer system (e.g., 600) displays, as part of the prompt, an option (e.g., 670) to initiate a process to configure the external accessory for use with the additional device management application. In some embodiments, in accordance with a determination that an additional device management application is not compatible to be configured for use with the external accessory, the computer system (e.g., 600) forgoes displaying, as part of the prompt, an option to initiate a process to configure the external accessory for use with the additional device management application. In some embodiments, the additional device management application is from a provider creator, company, manufacturer) different from the provider (e.g., creator, company, manufacturer) of the external accessory and different from a provider of the first and the second device management applications. Displaying options to configure multiple compatible management applications avoids the need for the user to search for the compatible applications on the computer system, thereby reducing the number of inputs the user needs to provide to find the additional applications and reduces the number of inputs required to configure the external accessory for use with the additional device management application(s) after having configured the external accessory for use with the first device management application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to configuring the external accessory (e.g., 606) for use with the first device management application, the computer system (e.g., 600) identifies (e.g., receiving from a server or a secure element of the computer system, and/or generating) a code (e.g., a pairing secret, a numerical value, an alphanumerical value, and/or string of text). In some embodiments, after identifying the code (and, optionally, in response to receiving selection of (e.g., tap input on) the option to initiate a process to configure the external accessory for use with a second device management application), the computer system (e.g., 600) transmits the code to the external accessory and a second code (e.g., same as the code transmitted to the external accessory, a code that corresponds to (but is different from) the code transmitted to the external accessory) to the second device management application (e.g., a third party app, a third party app clip), wherein the second code is used in configuring the external accessory for use with the second device application. In some embodiments, configuring the external accessory for use with the second device management application involves transmitting the code to the external accessory and second code to the second device management application. In some embodiments, configuring the external accessory for use with the second device management application involves the second device management application transmitting the second code to the external accessory for authentication (e.g., comparison to the code previously received by the external accessory). Identifying a code and transmitting it to the external accessory and to the second device management application prevents the need for a code to be manually identified and/or verified by a user (thus mitigating the likelihood of human error in doing so) and enables the identified code to be securely transmitted to the appropriate recipients (e.g., the external accessory and the second device management application) without requiring the user to manually transmit the code to the appropriate recipients. The codes are optionally used to authenticate the device management application and/or the external accessory, thereby making the process more secure.

In some embodiments, initiating the process to configure the external accessory (e.g., 606) for use with the second device management application includes the first device management application transmitting at least a portion of a set of external accessory configuration data (e.g., 628 and/or 638) (e.g., a pairing secret (a code, such as used for security), a name for the external accessory, and/or a name for a room of the external accessory) to the second device management application. Iii some embodiments, the first set of external accessory configuration data includes a pairing secret (e.g., a code) that corresponds to (e.g., is the same as) a pairing value generated by the computer system and transmitted to the external accessory. In some embodiments, the first set of external accessory configuration data includes a name for the external accessory and/or a name of a room for the accessory, as received from a user (e.g., user input), during the configuration process of the third device management application. In some embodiments, the portion of the first set of external accessory configuration data is used when configuring the external accessory for use with the first device management application. In some embodiments, the configuration data is sent to a plurality of configuration applications (e.g., the multiple applications selected by a user). Transmitting at least a first portion of the set of external accessory configuration data from the first device management application to the second device management application prevents the need for the user to enter (or re-enter) external accessory configuration data included in the transmitted set of external accessory configuration data to a subsequent device management application, thereby reducing the number of inputs required, and enables the transmitted portion of the set of external accessory configuration data to be used to streamline subsequent configuration processes. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the prompt (e.g., 660), the computer system (e.g., 600) configures the external accessory (e.g., 606) for use with the first device management application, including receiving (e.g., via a keyboard input) user input (e.g., by the first device management application) of a name (e.g., 628) of the external accessory (and, optionally, a room (e.g., 638) associated with the external accessory). In some embodiments, after (e.g., in response to) receiving selection of the option to initiate a process to configure the external accessory for use with a second device management application, the computer system (e.g., 600) transmits (e.g., from the first device management application) the name of the external accessory (and, optionally, the room) to the second device management application. In some embodiments, while configuring external accessory for use with the second device management application, in accordance with a determination that the name of the external accessory has been received from the first device management application, the computer system (e.g., 600) forgoes displaying an entry field (e.g., a text entry field) for user entry of a name of the external accessory and, in accordance with a determination that the name of the external accessory has not been received from the first device management application, the computer system (e.g., 600) displays an entry field (e.g., a text entry field) for user entry of a name of the external accessory. In some embodiments, while configuring external accessory for use with the second device management application, an entry field is displayed regardless of whether the name of the external accessory has been received from the first device management application. In some embodiments while configuring external accessory for use with the second device management application, in accordance with a determination that the name of the external accessory has been received from the first device management application, the computer system displays the name of the external accessory; and in accordance with a determination that the name of the external accessory has not been received from the first device management application, the computer system forgoes displaying the name of the external accessory. Forgoing displaying an entry field for a user to enter a name of the external accessory in accordance with a determination that the name is available enables a faster and more efficient process to configure the external accessory for use with subsequent device management applications after having configured the external accessory for use with an initial device management applications, and reduces the number of inputs required to specify the name of the accessory. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, a prompt that includes an option to initiate a process to configure the external accessory for use with a first device management application and an option to initiate a process to configure the external accessory for use with a second device management application that is different from the first device management application, as described below, may be displayed after a third device management application has already been configured, as described above. For brevity, these details are not repeated below.

FIGS. 8A-8R illustrate exemplary user interfaces for configuring an external accessory (e.g., a smart outlet, a smart light bulb, a wireless router, a smart doorbell, a camera system, and/or a Wi-Fi enabled door lock) for use with at least one of a plurality of device management applications installed on a computer system (e.g., an electronic device, a smart device, such as a smartphone or a smartwatch, a mobile device, and/or a wearable device) via a prompt that includes options for configuring the external accessory for use with at least a first device management application and a second device management application. The user interfaces in these figures are used to illustrate the processes described below, including the processes in FIG. 9.

FIGS. 8A-8F illustrate a method for configuring an external accessory for use with a first device management application (e.g., a system application, a first-party application, and/or a third-party application that is optionally used to manage (e.g., view a status and/or control) an external accessory (e.g., device), such as a system application, a first-party application, or a third-party application. In the embodiment illustrated in FIGS. 8A-8R, the external accessory is a smart outlet e.g., called "Acme Model XYZ") 806.

FIG. 8A illustrates computer system 800 (e.g., a smartphone) detecting (e.g., scanning) smart outlet 806, which is an external accessory. In FIG. 8A, computer system 800 detects (e.g., using system code) smart outlet 806 by detecting QR code 808, which is displayed on smart outlet 806, using a camera application of computer system 800. In particular, the user places QR code 808 within a field of view of a camera of computer system 800 while the field of view of the camera is displayed in the camera application. In some examples, computer system 800 must also receive user input (e.g., a tap) at a location within the field of view of the camera corresponding to QR code 808 before detecting smart outlet 806. It should be recognized that QR code 808 is merely an example of a type of code that is optionally detected via the camera application, and that other code and printed and displayed materials are optionally used for detecting smart outlet 806 via the camera application. In some embodiments, an external accessory is detected (e.g., using system code) using other means, such as by receiving an indication (e.g., a message) from a server (e.g., in response to a purchase of smart outlet 806), detecting smart outlet 806 via an NFC tag, an ultra-wideband (UWB) radio signal, and/or by detecting smart outlet 806 using sensors that detect light-emitting diodes (LEDs), and receiving user input (e.g., through the use of a keyboard) of identification information for smart outlet 806.

In FIG. 8A, computer system 800 displays, via display 802, user interface 804. User interface 804 depicts a viewfinder of a camera (of computer system 800) showing an image of smart outlet 806 (e.g., user interface 804 is optionally a user interface of a camera application that is different from any device management application (first-party or third-party)). In some embodiments, user interface 804 includes one or more user interface elements (e.g., icons, affordances) that correspond to one or more affordances (e.g., buttons, selectable elements) related to controlling the camera application. In the embodiment illustrated in FIG. 8A, user interface 804 depicts smart outlet 806 with a QR code 808.

In FIG. 8A, in response to detecting QR code 808, computer system 800 overlays (e.g., using system code) notification 810 onto user interface 804 (e.g., notification 810 is optionally a user interface element of a device management application (first-party or third-party) different from the camera application). Notification 810 includes an indication ("configure accessory") that smart outlet 806 can be configured. Notification 810 includes text indicating that the smart outlet can be configured for use with a device management application (e.g., a system device management application, a first-party device management application (such as an application provided by the merchant of computer system 800), or a third-party device management application (such as an application provided by a merchant different from the merchant of computer system 800)). Notification 810 is optionally selected (e.g., via a touch/tap input) to cause prompt 812 to be displayed, as illustrated in FIG. 8B.

Figure 8B:
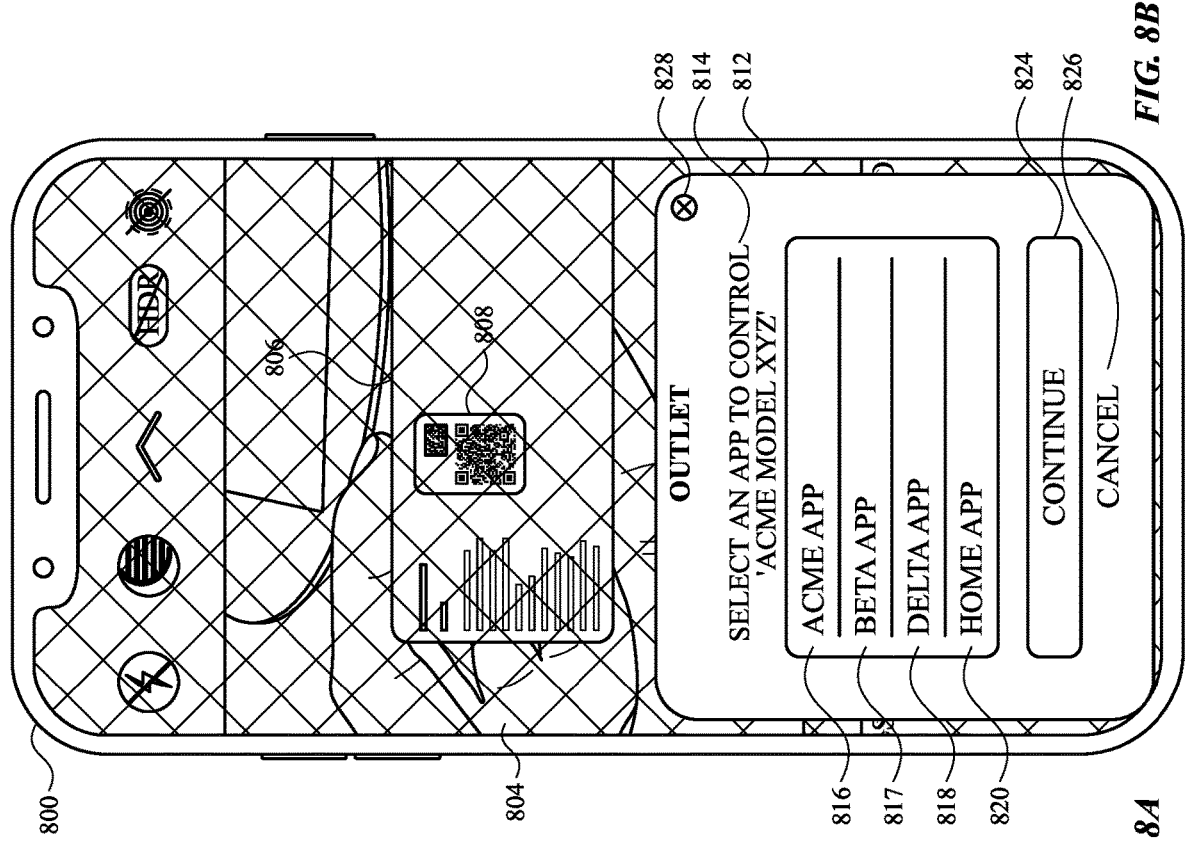
FIGS. 8A-8R illustrate techniques for displaying a prompt that includes multiple options for configuring an external accessory for use with a multiple device management applications in accordance with some embodiments.
Figure 8D:
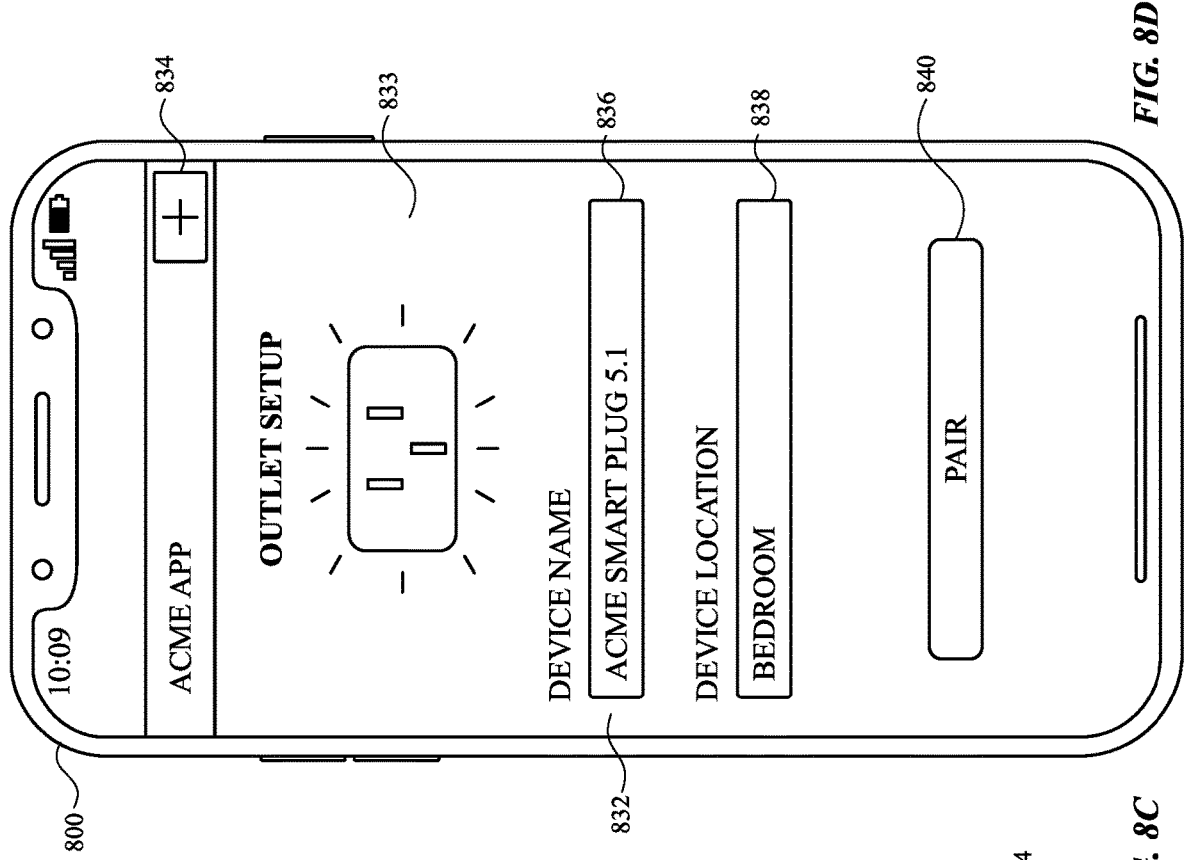

In some embodiments, computer system 800 detects a tap input on notification 810 and, in response, displays the user interface as illustrated in FIG. 8B. FIG. 8B illustrates prompt 812 that is displayed (e.g., using system code) overlaying user interface 804 in response to notification 810 being selected. In some embodiments, computer system 800 initially detects (e.g., via NFC) smart outlet 806 while user interface 804 is displayed (e.g., without the process described with respect to FIG. 8A) and, in response, overlays prompt 812 on user interface 804 to indicate to the user that smart outlet 806 has been detected and is available to configure, as illustrated in FIG. 8B. Prompt 812 includes information related to configuring smart outlet 806.

In some embodiments, computer system 800 (e.g., using system code) retrieves a setup payload corresponding to smart outlet 806 (e.g., as part of detecting smart outlet 806 and/or using information received from smart outlet 806 as part of detecting smart outlet 806). In some embodiments, computer system 800 retrieves the setup payload by scanning QR code 808 using the camera application of computer system 800. In some embodiments, computer system 800 retrieves the setup payload by detecting information from an NFC tag corresponding to smart outlet 806. In some embodiments, computer system 800 retrieves the setup payload by detecting information via ultra-wideband (UWB) radio signal. In some embodiments, computer system 800 retrieves the setup payload using sensors that detect light-emitting diodes (LEDs). In some embodiments, prompt 812 is displayed using system code.

In some embodiments, computer system 800 (e.g., using pairing framework code) parses the setup payload to determine a setup code (e.g., information used by an accessory to validate a setup request, such as a hash of a pairing secret (e.g., plain text data)) and product data (e.g., manufacturer/make, product ID/model, or an identifier that are optionally used by another system to identify smart outlet 806). In some embodiments, computer system 800 (e.g., using system code) establishes a secure communication channel to smart outlet 806 using the setup code.

In some embodiments, computer system 800 (e.g., using pairing framework code) establishes a secure communication channel to smart outlet 806 using the setup code. In some embodiments, computer system 800 (e.g., using pairing framework code) provides and/or receives proof of authenticity to/from smart outlet 806 (e.g., using the secure channel).

In FIG. 8B, as described above, computer system 800 displays, via display 802, prompt 812 (e.g., using system code) that includes affordances (e.g., 816, 817, 818, 820) for configuring smart outlet 806 for use with different device management applications. In some embodiments, prompt 812 only occupies a portion of a display of computer system 800, allowing at least a portion of user interface 804 to be concurrently displayed. In some embodiments, prompt 812 is displayed as an overlay over another user interface (e.g., user interface 872), rather than being overlaid on user interface 804. Prompt 812 includes text 814 including instructions to select an application to control smart outlet 806 with (e.g., so that the smart outlet 806 can be configured for use with the selected management application(s)). Text 814 identifies the type of accessory ("OUTLET"), the manufacturer/make of smart outlet 806 ("ACME"), and the model of smart outlet 806 ("XYZ"). In some embodiments, configuring smart outlet 806 for use with a respective device management application includes pairing smart outlet 806 with the respective device management application (e.g., such that smart outlet 806 accepts commands/instructions from the respective device management application to turn on or off power provided to electronics plugged into smart outlet 806). In FIG. 8B, prompt 812 includes affordance 828 for dismissing (e.g., cancelling, exiting, ceasing to display) prompt 812, and affordance 824 for continuing with the process of configuring smart outlet 806 for use with the selected device management application(s).

Figure 8C:
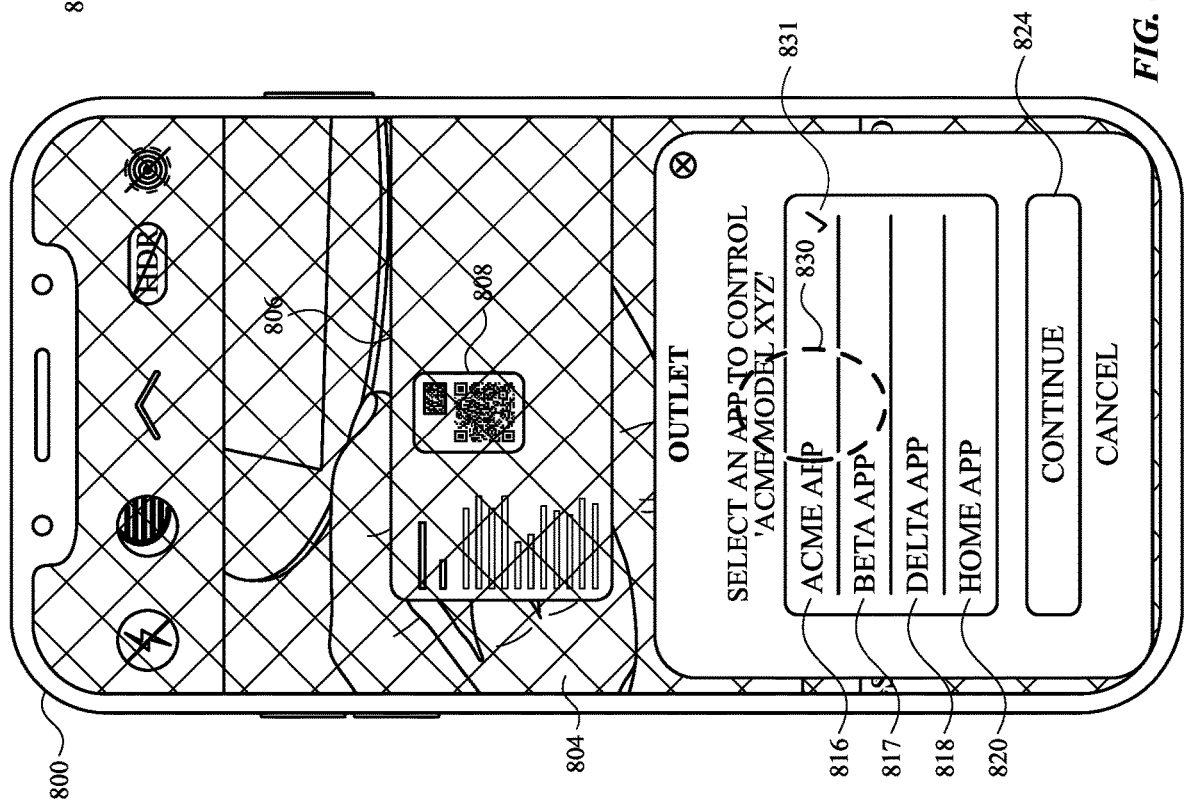
Figure 8H:
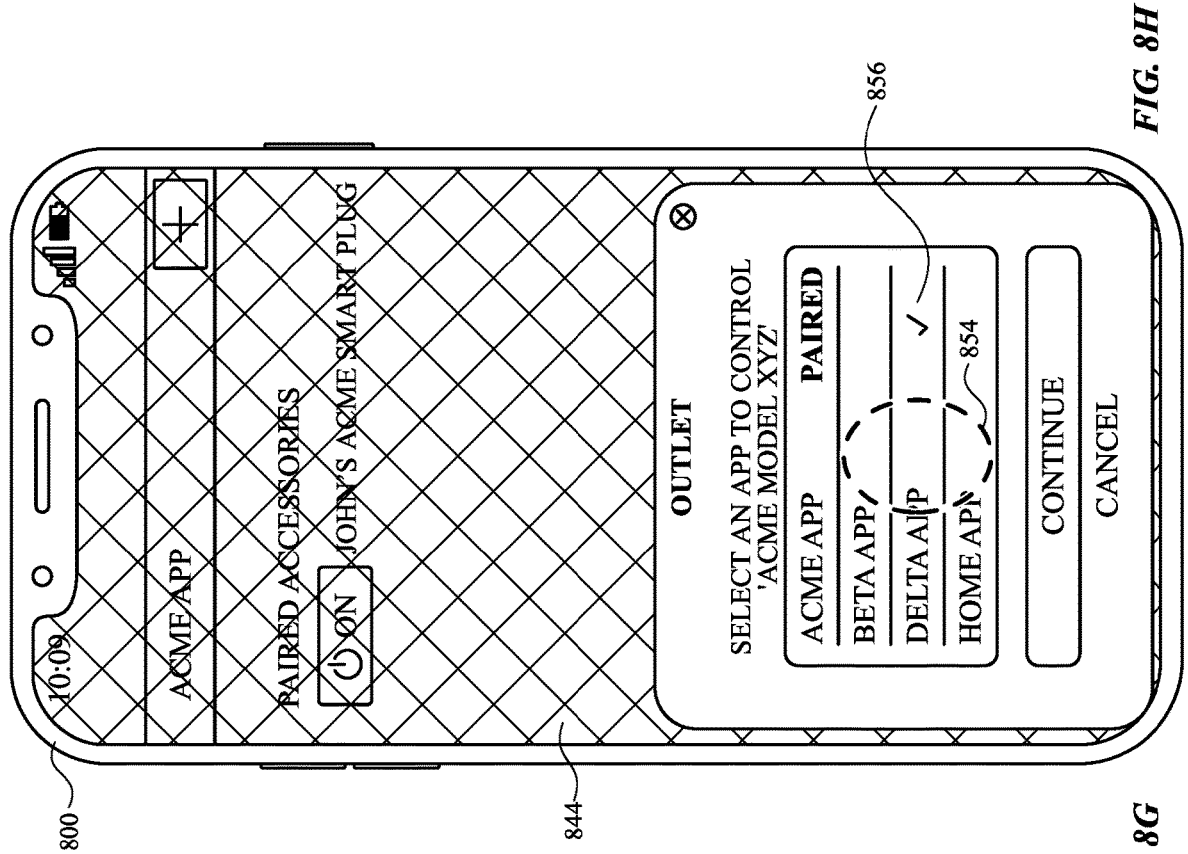

In FIG. 8C, computer system 800 receives user input 830 (e.g., a tap input) on affordance 816 to select the first device management application (e.g., ACME Application, provided by the manufacturer (ACME) of smart outlet 806).

In some embodiments, user input 830 on affordance 816 corresponds to a request for smart outlet 806 to be configured for use with the first device management application. Therefore, in response to receiving user input 830, computer system 800 displays user interface 832 of FIG. 8D.

In some embodiments, however, inputs (e.g., 830) on affordances (816, 817, 818, 820) cause the respective option (e.g., the respective corresponding device management application) to be selected (or deselected). In some embodiments, when an affordance (e.g., 816, 817, 818, 820) corresponding to a respective device management application is selected (e.g., in response to a tap input on the respective affordance), an indication (e.g., a checkmark, a strikethrough line, and/or a green circle) (e.g., 831, 856) is displayed on and/or next to the selected affordance(s). A lack of an indication (e.g., checkmark) displayed on and/or next to an affordance indicates that the corresponding device management application has not been selected. In some embodiments, additional ways of showing selection and non-selection are optionally used. In some embodiments, computer system 800 receives selection of one or more respective device management applications on user interface 812 and displays user interface 832 (of FIG. 8D) after (e.g., in response to) receiving an input on affordance 824. In some embodiments, selecting affordance 824 (e.g., via a tap input) corresponds to a request to configure smart outlet 806 for use with all of the device management applications that are selected at the time when affordance 824 is selected (e.g., all of (a single or multiple) device management applications corresponding to the affordances 816, 817, 818, and 820 with an indication (e.g.,) displayed next to them).

In some embodiments, after (e.g., in response to) receiving input 830 on affordance 816 and/or receiving an input on affordance 824, computer system 800 displays an intermediate user interface for downloading the first device management application (the ACME application) before displaying user interface 832 of FIG. 8D. In some embodiments, the intermediate user interface for downloading the first device management application is displayed based on a determination that the first device management application is not available (e.g., is not downloaded and/or is not installed) on computer system 800. In some embodiments, computer system 800 displays user interface 832 after (e.g., in response to) the first device management application becoming available (e.g., after the first device management application finishes downloading and/or installing).

In FIG. 8D, user interface 832 is a user interface of the first device management application (the ACME app). User interface 832 includes an indication 833 of smart outlet 806 (e.g., the external accessory currently being configured for use with the first device management application), and an affordance 840 for configuring smart outlet 806 for use with the first device management application (e.g. "Pair"). User interface 832 optionally includes editable field 836 for selecting a name for smart outlet 806, and editable field 838 for selecting a room/location of smart outlet 806.

In FIG. 8E, computer system 800 has received user input to change the name of smart outlet 806 from the default recommended name of "ACME SMART PLUG 5.1" to "JOHN'S ACME SMART PLUG." In FIG. 8D, after receiving user input for the name of smart outlet 806, computer system 800 receives user input 842 (e.g., a tap input) on affordance 840, corresponding to a request to configure (e.g. pair) smart outlet 806 for use with the first device management application (e.g., ACME Application, provided by the manufacturer (ACME) of smart outlet 806). In response to receiving tap input 842 on affordance 840, computer system 800 configures (pairs) (e.g., using pairing framework code) smart outlet 806 for use with the first device management application. In response to completing configuring smart outlet 806 for use with the first device management application and/or in response to receiving input 842, computer system 800 displays, via display 802, user interface 844, which indicates that smart outlet 806 has been configured for use with the first device management application.

In FIG. 8F, computer system displays user interface 844. User interface 844 is a user interface of the first device management application (e.g., ACME Application) that is displayed after the configuration of smart outlet 806 for use with the first device management application has been completed. User interface 844 includes an indication 846 that smart outlet 806 has been configured for use (e.g., paired) with the first device management application. As a result of completing configuring smart outlet 806 for use with the first device management application, the first device management application is now operable to control smart outlet 806, such as by turning on or off power provided to electronics plugged into smart outlet 806. For example, the first device management application optionally receives a schedule from a user for days/times that the power of smart outlet 806 should be on and off, and the first device management application uses the schedule to instruct smart outlet 806 to be on and off, as specified in the user-provided schedule. For another example, first device management application receives user input to change the power (e.g., from on to off, from off to on) provided to electronics plugged into smart outlet 806 and, in response, first device management application instructs smart outlet 806 to change the power (e.g., from on to off, from off to on) provided to electronics plugged into smart outlet 806.

User interface 844 includes affordance 850 for powering smart outlet 806 on or off (e.g., controlling smart outlet 806, toggling the power of electronics plugged into smart outlet 806). Affordance 850 indicates whether smart outlet 806 is "On" or "Off." User interface 844 includes name 848 of smart outlet 806 that was selected during the configuration of smart outlet 806 (e.g., "JOHN'S ACME SMART PLUG"). In some embodiments, affordance 850 is displayed adjacent to name 848.

Figure 8G:
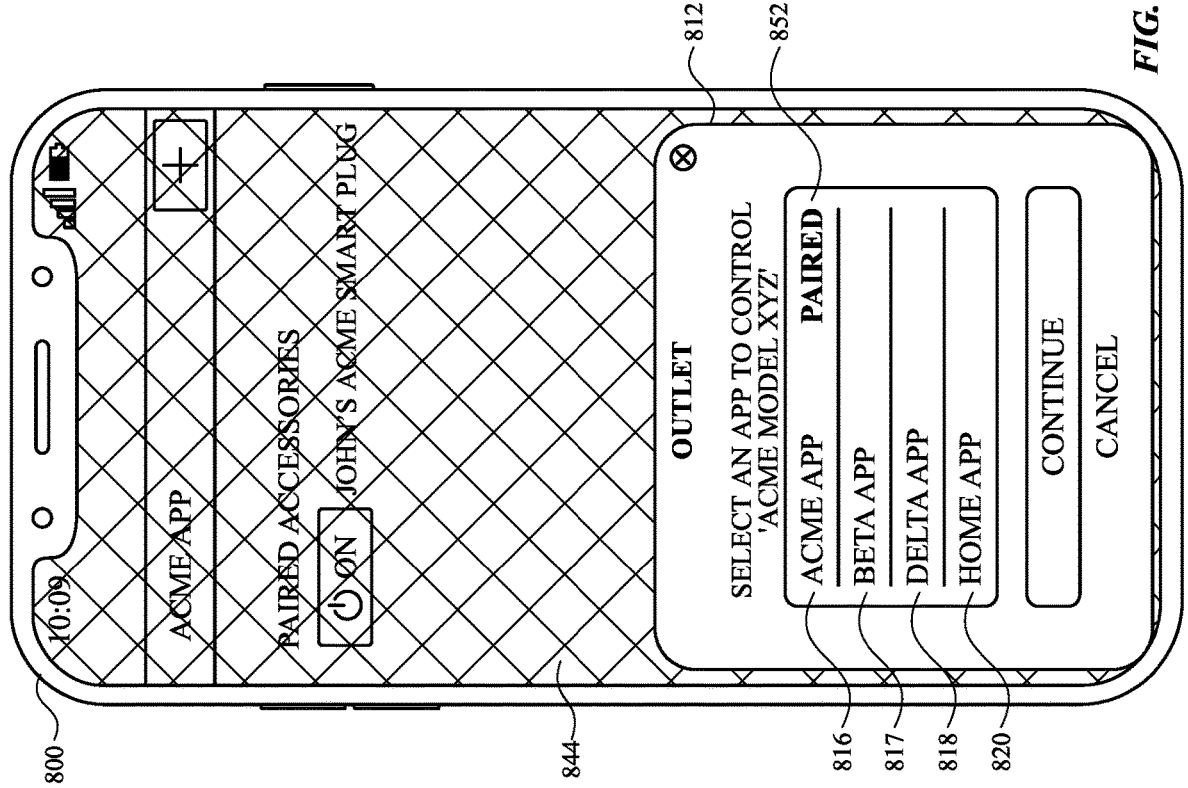

In some embodiments, after (e.g., in response to) completing configuring of smart outlet 806 for use with the first device management application, prompt 812 is displayed over user interface 844 to indicate that smart outlet 806 can be configured for use with at one additional device management application, as illustrated in FIG. 8G.

FIGS. 8G-8K illustrate a method for configuring an external accessory for use with a second device management application a system application, a first-party application, and/or a third-party application that can be used to control an external accessory (e.g., device)) after having completed configuring the external accessory for use with the first device management application.

In FIG. 8G, computer system 800 displays (e.g., using system code), via display 802, prompt 812 that includes affordances (e.g., 816, 817, 818, 820) for configuring smart outlet 806 for use with different device management applications. As described above, prompt 812 only occupies a portion of a display of computer system 800, allowing at least a portion of user interface 844 to be concurrently displayed. In FIG. 8G, prompt 812 includes an indication 852 associated with (e.g., on, next to) affordance 816 to indicate that smart outlet 806 is already configured for use with the first device management application (e.g., the device management application with which affordance 816 is associated (ACME application)). In some embodiments, computer system 800 forgoes including affordance 816 in prompt 812 when smart outlet 806 is already configured for use with smart outlet 806. In some embodiments, prompt 812 is displayed as an overlay over another user interface (e.g., user interface 872), rather than being overlaid on user interface 844. As described above, prompt 812 includes text 814 including instructions to select an application to control smart outlet 806 with (e.g., so that the smart outlet 806 can additionally be configured for use with the selected management application(s)).

In FIG. 8H, computer system 800 receives user input 854 (e.g., a tap input) on affordance 818, corresponding to a request for smart outlet 806 to be configured for use with the second device management application (e.g., DELTA Application, provided by a manufacturer different from the manufacturer (ACME) of smart outlet 806). In response to receiving user input 854, computer system 800 displays user interface 858 of FIG. 8I to initiate a process to configure smart outlet 806 for use with the second device management application.

In some embodiments, initiating the process for configuring smart outlet 806 for use with the second device management application includes generating (e.g., using pairing framework code) and/or passing (e.g., using pairing framework code) a new setup code to smart outlet 806 (e.g., over the secure channel). In some embodiments, initiating the process for configuring smart outlet 806 for use with the second device management application includes the first device management application calling an application programming interface (API) provided by the operating system of computer system 800 to have the operating system of computer system 800 pass a pairing secret e.g., included with the API call) (e.g., that corresponds to or is the same as the setup code; in some embodiments, the pairing secret is plain text data that is hashed to form the setup code) and information corresponding to smart outlet 806 (e.g., the name for smart outlet 806 and the room/location of smart outlet 806) to the respective device management application. In some embodiments, computer system 800 stores (e.g., using internal framework code, internal system framework code, and or the second device management application) the pairing secret (e.g., that corresponds to or is the same as the setup code), the name for smart outlet 606, and the room/location of smart outlet 606 for use by the second device management application (e.g., shared memory or to transmit to the second device management application when the second device management application is launched and/or displayed).

In FIG. 8I, user interface 858 is a user interface of the second device management application. User interface 858 includes an indication 859 of smart outlet 806 (e.g., the external accessory currently being configured for use with the second device management application) and an affordance 866 for configuring smart outlet 806 for use with the second device management application (e.g. "Pair"). User interface 858 optionally includes editable field 862 for selecting a name for smart outlet 806, and editable field 864 for selecting a room/location of smart outlet 806. In some embodiments, the name ("JOHN'S ACME SMART PLUG") (and, optionally, the device location) is transmitted from the first device management application to the second device management, thereby reducing (or eliminating) the need for the user to re-enter the user's preferred name (and, optionally, location) for smart outlet 806.

In FIG. 8I, computer system 800 receives user input 867 (e.g., a tap input) on affordance 866, corresponding to a request to configure (e.g. pair) smart outlet 806 for use with the second device management application (e.g., provided by the manufacturer (DELTA) different than the manufacturer (ACME) of smart outlet 806). In response to receiving tap input 867 on affordance 866, computer system 800 causes smart outlet 806 to be configured for use with the second device management application. In response to completing configuring smart outlet 806 for use with the second device management application and/or in response to receiving input 867, computer system 800 displays, via display 802, user interface 868 of FIG. 8K, which indicates (e.g., via indication 869) that smart outlet 806 has been configured for use (e.g., paired) with the second device management application.

User interface 868 is a user interface of the second device management application (e.g., DELTA Application) that is displayed after the configuration of smart outlet 806 for use with the second device management application has been completed. As a result of completing configuring smart outlet 806 for use with the second device management application, both the first device management application and the second device management application are now operable to control smart outlet 806, such as by turning on or off power provided to electronics plugged into smart outlet 806. For example, the second device management application optionally receives a schedule from a user for days/times that the power of smart outlet 806 should be on and off, and the second device management application uses the schedule to instruct smart outlet 806 to be on and off, as specified in the user-provided schedule. For another example, second device management application receives user input to change the power (e.g., from on to off, from off to on) provided to electronics plugged into smart outlet 806 and, in response, second device management application instructs smart outlet 806 to change the power (e.g., from on to off, from off to on) provided to electronics plugged into smart outlet 806.

User interface 868 includes affordance 871 for powering smart outlet 806 on or off (e.g., controlling smart outlet 806, toggling the power of electronics plugged into smart outlet 806). Affordance 871 indicates whether smart outlet 806 is "On" or "Off." User interface 868 includes name 870 of smart outlet 806 that was selected during the configuration of smart outlet 806 (e.g., "JOHN'S ACME SMART PLUG"). In some embodiments, affordance 871 is displayed adjacent to name 870.

FIGS. 8L-8R illustrate a method for opening device management applications (e.g., a first device management application, a third device management application) after having completed configuring the external accessory for use with at least the first device management application (e.g., going through the process of FIGS. 8A-8K), and controlling (e.g., sending instructions to) the external accessory using at least the first device management application.

Figure 8L:
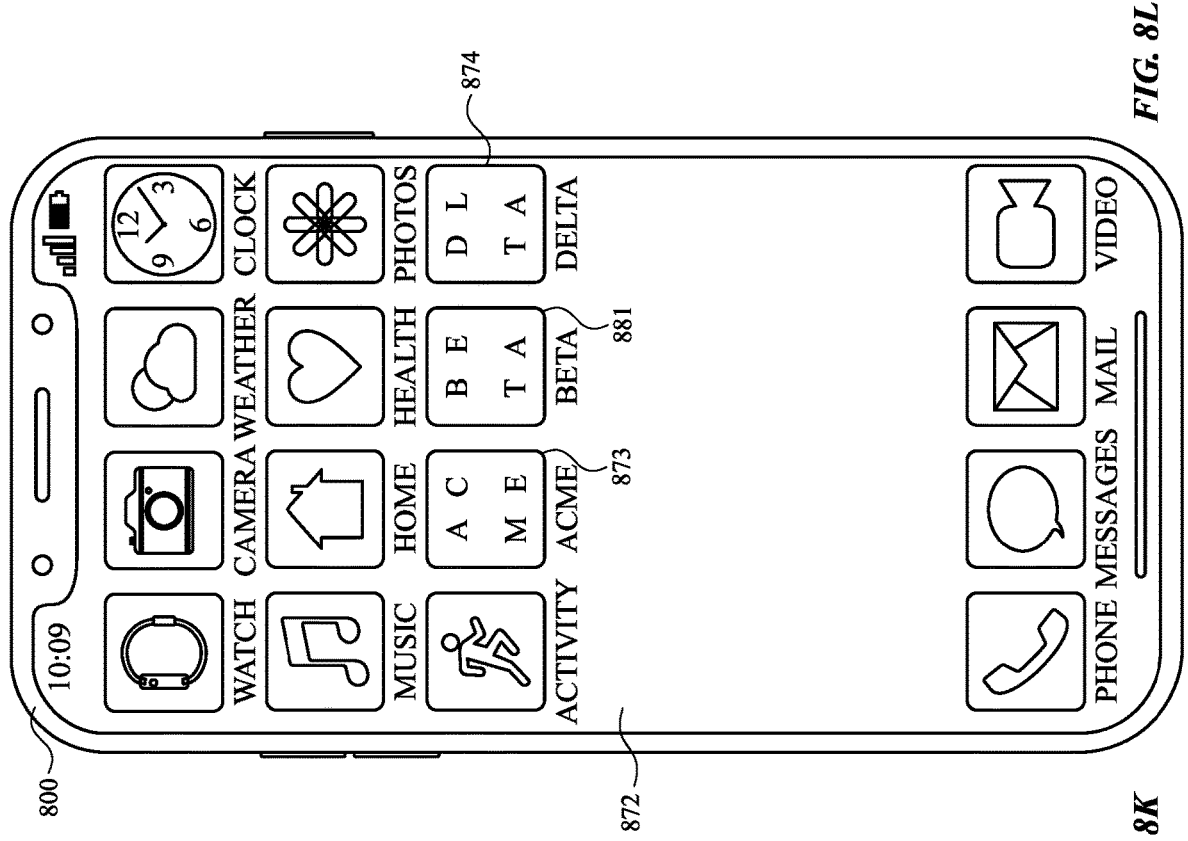
Figure 8K:
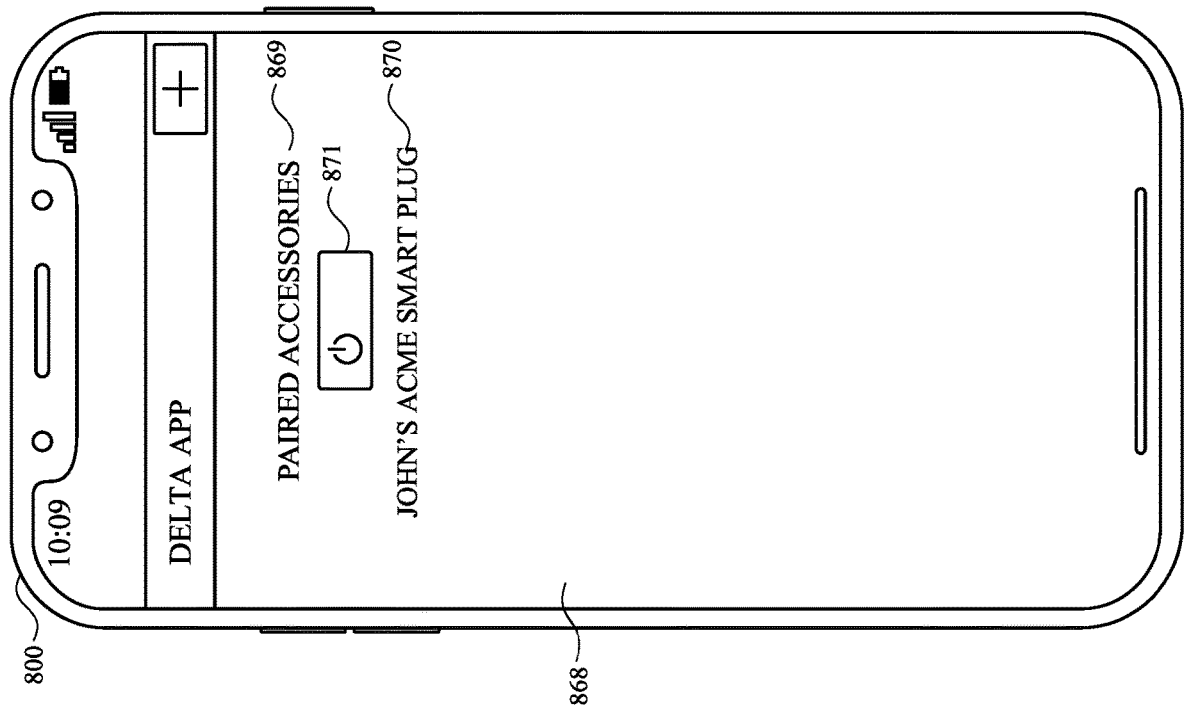

In FIG. 8L, computer system 800 displays user interface 872, which is a home screen user interface that includes affordances for opening (e.g., displaying, launching) applications that are available (e.g., downloaded and/or installed) on computer system 800. User interface 872 includes affordance 873 for opening the first device management application, affordance 874 for opening the second device management application, and affordance 881 for opening a third device management application. Smart outlet 806 has been configured for use with the first and second device management applications. Smart outlet 806 has not been configured for use with the third device management application.

Figures 8M, 8N:
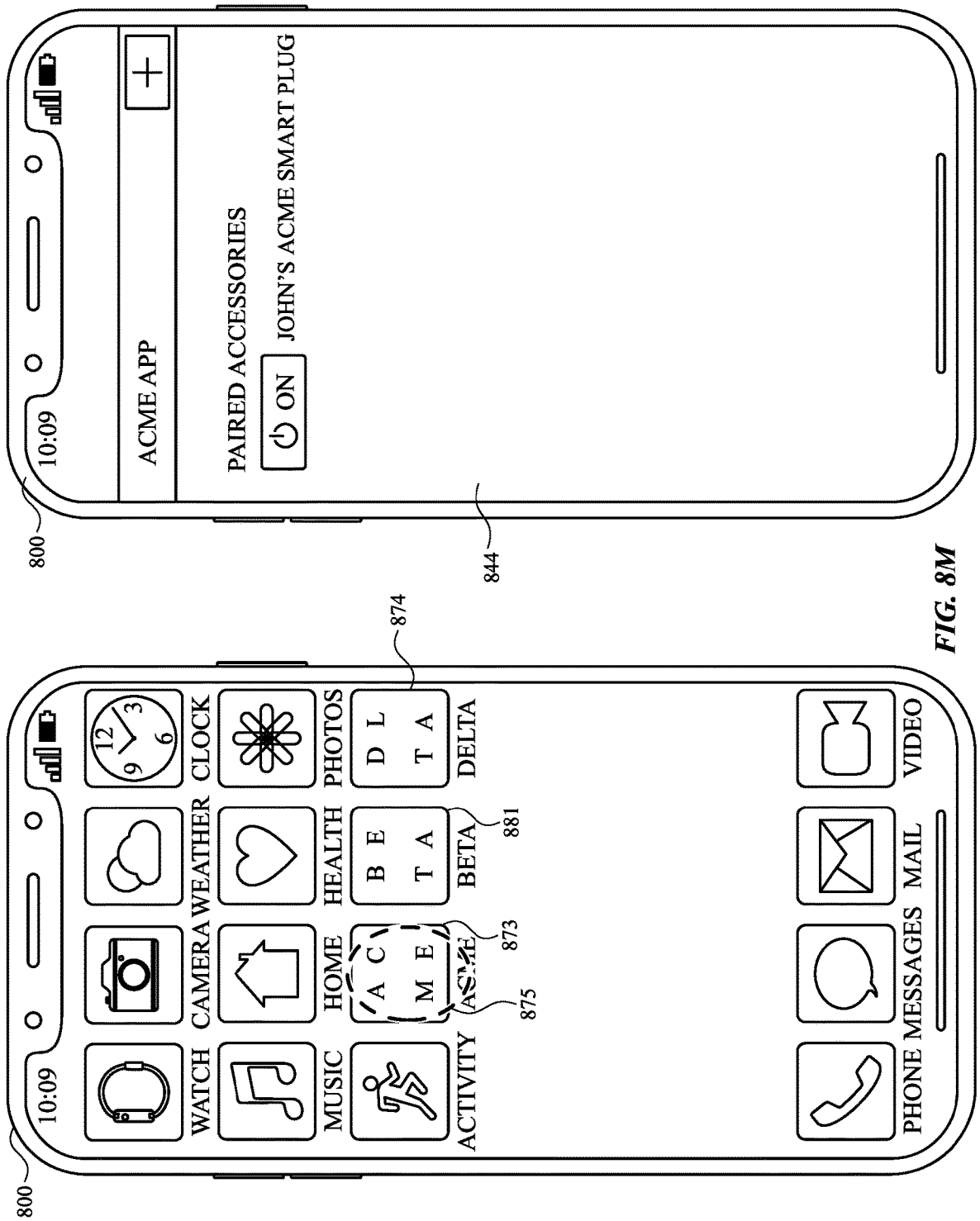

In FIG. 8M, computer system 800 receives user input 875 (e.g., a tap input) on affordance 873, corresponding to a request to open the first device management application (e.g., ACME Application, provided by the manufacturer (ACME) of smart outlet 806).

In FIG. 8N, after (e.g., in response to) detecting the input 875 on affordance 873, computer system 800 opens (e.g., displays, launches) the first device management application and displays user interface 844, as described above.

Figure 8O:
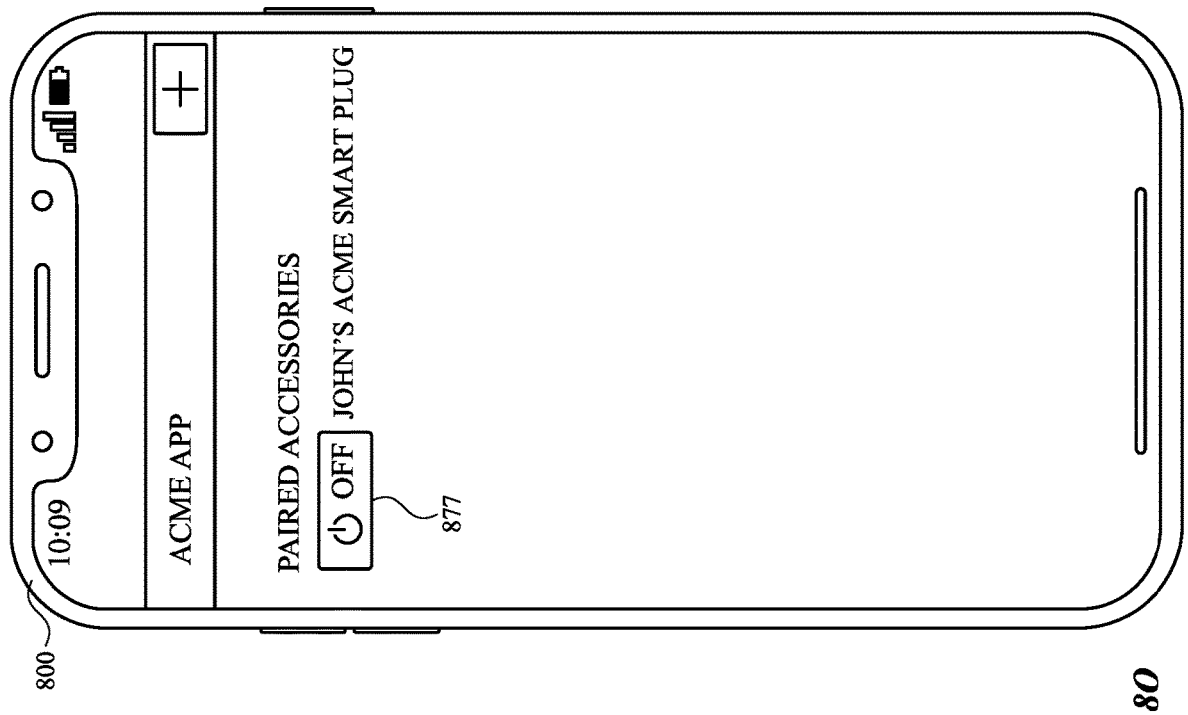
Figure 8P:
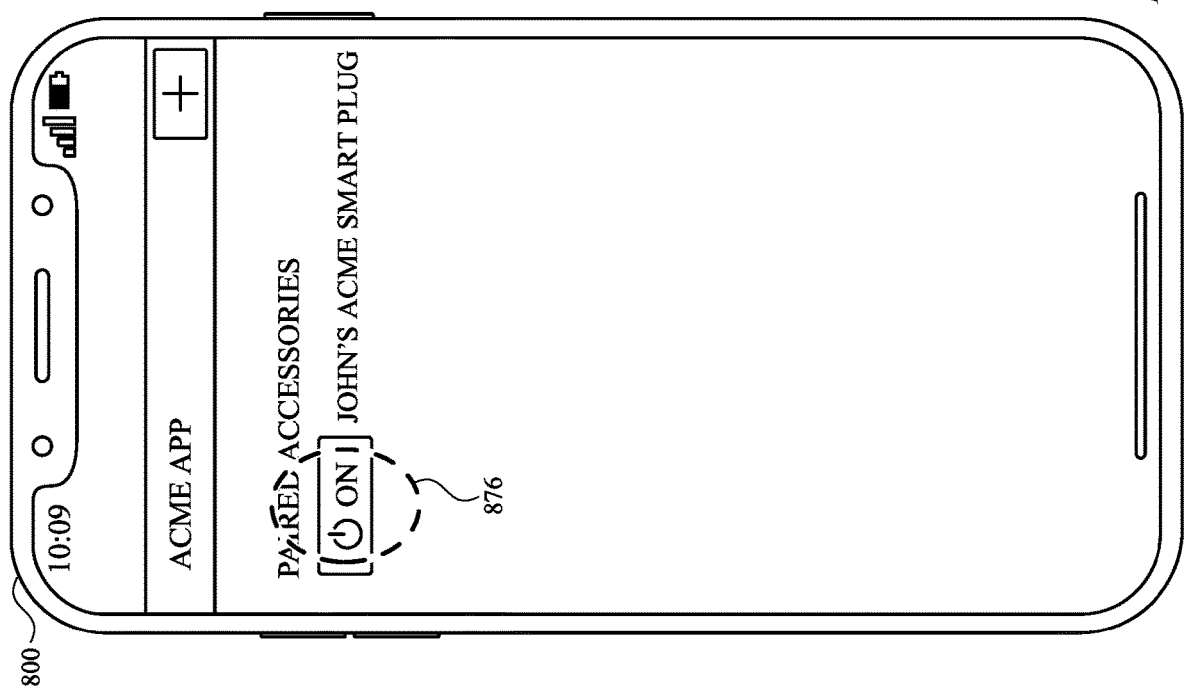

In FIG. 8O, computer system 800 receives user input 876 (e.g., a tap input) on affordance 850, corresponding to a request that smart outlet 806 should be turned off (e.g., toggled from "On" to "Off"). In response to input 876, computer system 800 transmits an instruction to smart outlet 806 to turn off power to electronics plugged into smart outlet 806 and displays, via display 802, user interface 844 with affordance 877 indicating that smart outlet 806 is currently turned off, as illustrated in FIG. 8P.

Figure 8Q:
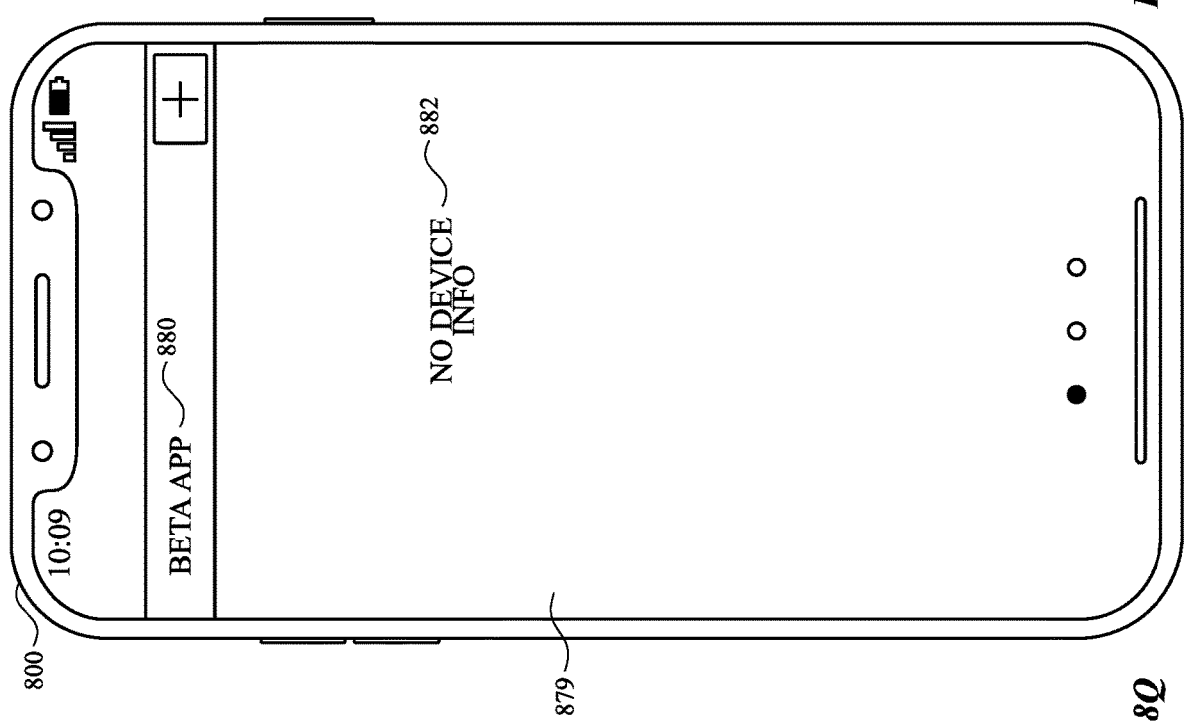

In FIG. 8Q, computer system 800 receives user input 878 (e.g., a tap input) on affordance 881 while displaying user interface 872. User input 878 corresponds to a request to open the third device management application (e.g., BETA Application). Notably, smart outlet 806 has not been configured for use with the third device management application when input 878 is received on affordance 881.

After (e.g., in response to) receiving the request to open the third device management application (e.g., BETA Application), computer system 800 displays user interface 879, which is a user interface of the third device management application. User interface includes an indication 880 of the third device management application, and an indication 882 that no device information (e.g., for smart outlet 806) is available. Thus, because smart outlet 806 has not been configured for use with the third device management application, the third device management application is not operable to control smart outlet 806 (e.g., cannot turn on or off power provided to electronics plugged into smart outlet 606).

In some embodiments, additional affordances for controlling additional features and/or paired external accessories are also displayed in user interface 879. In some embodiments, the features of smart outlet 806 that are optionally controlled via the first device management application and the second device management application are the same. In some embodiments, the features of smart outlet 806 that are optionally controlled via the first device management application and the second device management application are different and, optionally, overlap. In some embodiments, smart outlet 806 can subsequently be configured for use with the third device management application. In some embodiments, configuration for the smart outlet 806 can be edited after initial setup using any device management application with which the smart outlet was configured for use (e.g., set up). In one embodiment, if information for smart outlet 806 is edited on one application, a prompt is optionally displayed to allow a user to propagate the edits to other applications in which smart outlet 806 can be controlled. In another embodiment, the edits may automatically propagate to other applications in which the smart outlet can be controlled. In some embodiments, computer system 600 can configure smart outlet 606 to not be configured for use with a (previously paired) device management application. For example, configuration information of smart outlet 806 can be deleted (e.g., removed) from any device management application with which smart outlet 806 is configured for use (e.g., set up). In some embodiments, configuration information for smart outlet 806 is optionally deleted from a device management application via a series of inputs (e.g., touch inputs) received by computer system 800. In some embodiments, if smart outlet 806 is deleted from a first device management application, a prompt is optionally displayed to allow a user to delete the configuration information for smart outlet 806 from another (e.g., a second) device management application with which smart outlet 806 has been configured for use. In some embodiments, if configuration information for smart outlet 806 is deleted from a first device management application, configuration information for smart outlet 806 is automatically deleted (e.g., without requiring further user input) from other (e.g., at least a second) device management application(s) with which smart outlet 806 has been configured for use.

In some embodiments, FIG. 9 is a flow diagram illustrating a method for displaying a prompt that includes an option to initiate a process to configure the external accessory for use with a first device management application and an option to initiate a process to configure the external accessory for use with a second device management application that is different from the first device management application in accordance with some embodiments. Method 900 is performed at a computing device (e.g., 100, 300, 500, 600, 800) with a display generation component and one or more input devices. Some operations in method 900 are, optionally, combined, the orders of some operations are, optionally, changed, and some operations are, optionally, omitted.

As described below, method 900 provides an intuitive way for displaying a prompt that includes an option to initiate a process to configure the external accessory for use with a first device management application and an option to initiate a process to configure the external accessory for use with a second device management application that is different from the first device management application. The method reduces the cognitive burden on a user for displaying a prompt that includes an option to initiate a process to configure the external accessory for use with a first device management application and an option to initiate a process to configure the external accessory for use with a second device management application that is different from the first device management application, thereby creating a more efficient human-machine interface. For battery-operated computing devices, enabling a user to display a prompt that includes an option to initiate a process to configure the external accessory for use with a first device management application and an option to initiate a process to configure the external accessory for use with a second device management application that is different from the first device management application faster and more efficiently conserves power and increases the time between battery charges.

At a computer system (e.g., 800) (e.g., an electronic device, a smart device, such as a smartphone or a smartwatch, a mobile device, and/or a wearable device) that is in communication with a display generation component (e.g., 802) and one or more input devices (e.g., an NFC radio, a touch-sensitive surface, a microphone, an infrared sensor, and/or a camera sensor): the computer system (e.g., 800) receives (902) a request (e.g., as shown in FIGS. 8A and/or 8B) (e.g., information, such as a QR code or other bar code, detected using a camera sensor; and/or information detected via NFC) to configure an external accessory (e.g., 806) (e.g., a smart outlet, a smart light bulb, a wireless router, a smart doorbell, a camera system, a Wi-Fi enabled door lock, etc.).

In some embodiments, subsequent to (e.g., in response to) receiving the request to configure the external accessory, the computer system (e.g., 800) displays (904) (e.g., concurrently), via the display generation component, a prompt (e.g., 812) that includes an option (e.g., 816) to initiate a process to configure the external accessory for use with a first device management application (e.g., a home automation configuration application, a third-party configuration application, and/or a system accessory configuration application) and an option 818)) to initiate a process to configure the external accessory for use with a second device management application (e.g., a third-party accessory configuration application and/or a configuration application provided by the manufacturer of the accessory) that is different from the first device management application.

In some embodiments, while displaying the prompt, the computer system (e.g. 800) receives (906), via the one or more input devices, an input (e.g., 830) (e.g., a tap input).

In some embodiments, in response (908) to receiving the input, in accordance with a determination that the input corresponds to selection of the option to initiate a process to configure the external accessory for use with the first device management application, the computer system (e.g., 800) initiates (910) the process to configure the external accessory (e.g., 806) for use with the first device management application. In some embodiments, an indication that the first configuration application has been selected is displayed (e.g., an indication next to the selected application); In some embodiments, a second input at the same location causes the indication (e.g., checkmark) to be removed. In some embodiments, the process to configure the external accessory using the first configuration application includes downloading the first configuration application from an application store. In some embodiments, the first device management application is an aggregator application (e.g., Google Home, Amazon Alexa).

In some embodiments, in response (908) to receiving the input, in accordance with a determination that the input corresponds to selection of the option to initiate a process to configure the external accessory for use with the second device management application, the computer system (e.g., 800) initiates (912) the process to configure the external accessory (e.g., 806) for use with the second device management application that is different from the first device management application. In some embodiments, the second device management application is an aggregator application (e.g., Google Home, Amazon Alexa). Displaying a prompt that includes options to initiate a process to configure the external accessory for use with the device management application and a second device management application provides the user with visual feedback that the external accessory can be configured with multiple device management applications, and allows the user to quickly and efficiently configure the external accessory for use with a selected device management application, thereby reducing the number of inputs required to configure the application. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the prompt (e.g., 812) (and, optionally, after receiving the request to configure an external accessory), the computer system (e.g., 800) configures the external accessory (e.g., 806) for use with a third device management application that is different from the first device management application and the second device management application. In some embodiments, the third device management application is a system device management application (e.g., a native system accessory configuration application, a first-party device management application). In some embodiments, configuring the external accessory for use with a third device management application includes receiving user input of a name for the external accessory. Displaying a prompt that includes options to initiate a process to configure the external accessory for use with the device management application and a second device management application after the external accessory has already been configured for use with a third device management application provides visual improved visual feedback that the external accessory can be configured for use with multiple device management applications, and allows a user to quickly and efficiently configure the external accessory for a subsequent device management application after having already configured the external accessory for use with the third device management application. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, initiating the process to configure the external accessory for use with the first device management application includes transmitting at least a portion of the first set of external accessory configuration data (e.g., a pairing secret (e.g., a code)(such as used for security), a name for the external accessory, and/or a name for a room of the external accessory) to the first device management application. In some embodiments, initiating the process to configure the external accessory for use with the second device management application includes transmitting at least a portion of the first set of external accessory configuration data (e.g., 836 and/or 838) (e.g., a pairing secret (e.g., a code)(such as used for security), a name for the external accessory, and/or a name for a room of the external accessory) to the second device management application (e.g., from the third decide management application). In some embodiments, the first set of external accessory configuration data includes a pairing secret (e.g., a code) that corresponds to (e.g., is the same as) a pairing value generated by the computer system and transmitted to the external accessory. In some embodiments, the first set of external accessory configuration data includes a name for the external accessory and/or a name of a room for the accessory, as received from a user (e.g., via user input), during the configuration process of the third device management application. In some embodiments, the portion of the first set of external accessory configuration data is used when configuring the external accessory for use with the first device management application. In some embodiments, the configuration data is sent to a plurality of configuration applications (e.g., the multiple applications selected by a user). Transmitting at least the portion of the set of external accessory configuration data as part of the process for configuring the external accessory for use with the second device management application prevents the need for manually transmitting the external accessory configuration data, prevents the need to enter (or re-enter) external accessory configuration data included in the transmitted set of external accessory configuration data to a subsequent device management application, enables the transmitted portion of the set of external accessory configuration data to be used to streamline subsequent configuration processes, and makes the configuration process more secure.

In some embodiments, configuring the external accessory (e.g., 806) for use with the third device management application includes receiving a first set of external accessory configuration data (e.g., 836 and/or 838) (e.g., pairing secret (e.g., a code), accessory name, and/or accessory room). In some embodiments, after receiving the input (e.g., 830, 854) the computer system (e.g., 800) displays a prompt (e.g., 858) (e.g., as part of configuring the external accessory for use with a respective device management application) for user entry of a second set of external accessory configuration data (e.g., 862 and/or 864) (e.g., accessory name, and/or accessory room), wherein the prompt includes at least a portion of the first set of external accessory configuration data (e.g., pre-populated, the previous external accessory configuration data is automatically displayed (e.g., displayed as the default) as the entry). In some embodiments, the first set of external accessory configuration data and the second set of external accessory configuration data are different. In some embodiments, the first set of external accessory configuration data and the second set of external accessory configuration data are the same. Including at least a portion of the set of external accessory configuration data in a prompt for user entry of a second set of external accessory configuration data prevents a user from having to manually re-enter external accessory configuration that had already been provided when the external accessory was configured for use with a prior device management application, thereby reducing the number of inputs needed for configuration. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 800) configures the external accessory (e.g., 806) for use with a respective (e.g., first and/or second) device management application, including: transmitting a set of external accessory configuration data (e.g., 836 and/or 838) to the external accessory, the set of external accessory configuration data including a code (e.g., a pairing secret) (or, optionally, a name for the external accessory). In some embodiments, the code is used by the external accessory for authentication of a subsequent configuration/pairing with another device management application. In some embodiments, the name for the external accessory is received from a user (e.g., via keyboard input) of the computer system. In some embodiments, the set of external accessory configuration data transmitted to the external accessory includes a room name (e.g., received from the user) corresponding to the external accessory. In some embodiments, the set of external accessory configuration data transmitted to the external accessory includes a pairing secret (e.g., a code) (e.g., such as was received in the request (e.g., information, such as a QR code or other bar code, detected using a camera sensor; and/or information detected via NFC) to configure an external accessory). Transmitting a set of external accessory configuration data, including a code, to the external accessory allows relevant external accessory configuration data to be transmitted to the external accessory without a user manually sending the external accessory configuration data to the external accessory, and allows the external accessory to store the external accessory configuration data to streamline the process of configuring the external accessory for use with subsequent device management applications, thereby reducing the number of user inputs required for configuration. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, the code is optionally used for authentication of the external accessory and/or the device management application, making the configuration process more secure.

In some embodiments, the process to configure the external accessory (e.g., 806) for use with the first device management application includes displaying (e.g., in response to the input) a user interface (e.g., in an application store) including a selectable user interface object for obtaining (e.g., downloading) the first device management application (and, optionally, automatically installing the first device management application). In some embodiments, the process to configure the external accessory for use with the second device management application includes displaying a user interface including a selectable user interface object for downloading the second device management application. Displaying a user interface that includes a selectable user interface object for obtaining the first device management application provides the user with visual feedback that the device management application is not yet available (e.g., downloaded), and provides visual feedback that the device management application can quickly and efficiently be obtained through a selection of the selectable user interface object, thereby reducing the number of inputs required to identify and download the application. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the process to configure the external accessory (e.g., 806) for use with the first device management application includes displaying (e.g., in response to the input) a user interface (e.g., 832) (e.g., that includes one or more configuration options for the accessory, such as a name of the external accessory) of the first device management application. In some embodiments, the process to configure the external accessory for use with the second device management application includes displaying a user interface of the second device management application. Displaying a user interface of the device management application as part of the process to configure the external accessory for use with the device management application provides visual feedback to the user that the external accessory is being configured for use with the device management application rather than a second or third device management application. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, after (e.g., in response to) configuring the external accessory (e.g., 806) for use with the first device management application, the computer system (e.g., 800) displays (e.g., automatically) a prompt (e.g., 812 at FIG. 8G) that includes an option (e.g., 856) to initiate a process to configure the external accessory for use with a second device management application (e.g., a third-party accessory configuration application and/or a configuration application provided by the manufacturer of the accessory). Displaying a prompt that includes an option to initiate a process to configure the external accessory for use with a second device management application after configuring the external accessory for use with the first device management application provides visual feedback that the external accessory can also (e.g., additionally) be configured for use with the second device management application, and that the external accessory is not limited to being configured exclusively with the first device management application with which it has already been configured for use. Displaying the prompt also provides visual feedback allowing a user to quickly and efficiently configure the external accessory for use with the second device management application, and reduces the number of inputs required to configure the external accessory for use with the second device management application after having configured the external accessory for use with the first device management application. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently. Additionally, reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the input (e.g., tap on affordance 824 when both ACME app affordance 816 and DELTA app affordance 818 have check marks) corresponds to both selection of the option to initiate a process to configure the external accessory for use with the first device management application and the option to initiate a process to configure the external accessory for use with the second device management application (e.g., concurrently, successively) the computer system (e.g., 800) initiates the process to configure the external accessory for use with the first device management application. In some embodiments, in accordance with a determination that the input (e.g., tap on affordance 824 when both ACME app affordance 816 and DELTA app affordance 818 have check marks) corresponds to both selection of the option to initiate a process to configure the external accessory for use with the first device management application and the option to initiate a process to configure the external accessory for use with the second device management application (e.g., concurrently, successively) the computer system (e.g., 800) initiates the process to configure the external accessory for use with the second device management application. In some embodiments, when the input corresponds to selection of both first and second configuration options, the external accessory is configured using the first management application and the second device management application. In some embodiments, External accessory configuration data (e.g., pairing secret (e.g., a code), accessory name, accessory room) used for configuring the external accessory with the first device management application is transmitted to the second device management application. In some embodiments, External accessory configuration data (e.g., pairing secret (e.g., a code), accessory name, accessory room) used for configuring the external accessory with the first device management application is displayed as the default (e.g., automatically) when configuring the external accessory using the second device management application. In some embodiments, subsequent to configuring using the first device management application, determining (e.g., automatically) whether second device management application is available. Initiating the processes to configure the external accessory for use with both the first and the second device management application prevents a user from having to manually configure the external accessory for use with the second device management application after configuring the external accessory for use with the first device management application, thereby reducing the number of inputs needed to configure both applications. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the request to configure an external accessory is received while displaying a user interface (e.g., 804) of a requesting application (e.g., a camera, application). In some embodiments, displaying the prompt (e.g., 812) includes concurrently displaying the prompt (e.g., in a first area (e.g., the bottom half of the screen) of the display) with at least a portion of the user interface (e.g., 804) of the requesting application (e.g., displayed in a second area (e.g., the top half of the screen) of the display). Concurrently displaying the prompt with at least a portion of the user interface of the requesting application provides the user with visual feedback that the prompt is related to the concurrently displayed user interface of the requesting application (e.g., the camera), such as by indicating that the prompt was displayed based on (e.g., in response to) information that was detected (e.g., scanned) by the application to which the user interface corresponds and/or the requesting application. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

Note that details of the processes described above with respect to method 900 (e.g., FIG. 9 are also applicable in an analogous manner to the methods described above. For example, method 900 optionally includes one or more of the characteristics of the various methods described above with reference to method 700. For example, a prompt that includes an option to initiate a process to configure the external accessory for use with a first device management application and an option to initiate a process to configure the external accessory for use with a second device management application that is different from the first device management application, as described below, may be displayed after a third device management application has already been configured, as described above. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A computer system configured to communicate with a display generation component and one or more input devices, comprising:

one or more processors; and memory storing one or more programs configured to be executed by the one or more processors, the one or more programs including instructions for:

receiving a request to configure an external accessory;

subsequent to receiving the request to configure the external accessory, displaying, via the display generation component, a first prompt that includes an option to initiate a process to configure the external accessory to be controlled by a first device management application and an option to initiate a process to configure the external accessory to be controlled by a second device management application that is different from the first device management application;

while displaying the first prompt, receiving, via the one or more input devices, a first input corresponding to selection of the option to initiate a process to configure the external accessory to be controlled by the first device management application;

in response to receiving the first input corresponding to selection of the option to initiate a process to configure the external accessory to be controlled by the first device management application, initiating the process to configure the external accessory to be controlled by the first device management application, wherein the process to configure the external accessory to be controlled by the first device management application includes displaying a user interface for configuring the external accessory to be controlled by the first device management application that includes a user-interactive graphical user interface object for pairing the external accessory with the first device management application, and wherein pairing the external accessory with the first device management application causes the external accessory to accept commands, from the first device management application, that control a function of the external accessory;

after completing the process to configure the external accessory to be controlled by the first device management application and without completing the process to configure the external accessory to be controlled by the second device management application, receiving, via the one or more input devices, a second input corresponding to a request to open a respective device management application; and in response to receiving the second input corresponding to a request to open the respective device management application, displaying a user interface for the respective device management application, wherein:

in accordance with the respective device management application being the first device management application, the user interface for the respective device management application includes a user-interactive graphical user interface object for transmitting a command to the external accessory, and wherein the user-interactive graphical user interface object for transmitting the command to the external accessory is different from the option to initiate the process to configure the external accessory to be controlled by the first device management application and the user-interactive graphical user interface object for pairing the external accessory with the first device management application; and in accordance with the respective device management application being the second device management application, the user interface for the respective device management application does not include a user-interactive graphical user interface object for transmitting a command to the external accessory.

2. The computer system of claim 1, wherein the one or more programs further include instructions for:
prior to displaying the first prompt, configuring the external accessory to be controlled by a third device management application that is different from the first device management application and the second device management application.

3. The computer system of claim 2, wherein configuring the external accessory to be controlled by the third device management application includes receiving a first set of external accessory configuration data, wherein the one or more programs further include instructions for:
after receiving the first input, displaying a prompt for user entry of a second set of external accessory configuration data, wherein the prompt includes at least a portion of the first set of external accessory configuration data.

4. The computer system of claim 1, wherein initiating the process to configure the external accessory to be controlled by the first device management application includes transmitting at least a portion of a first set of external accessory configuration data to the first device management application.

5. The computer system of claim 1,
wherein the process to configure the external accessory to be controlled by the first device management application includes transmitting a set of external accessory configuration data to the external accessory, the set of external accessory configuration data including a code.

6. The computer system of claim 1, wherein the process to configure the external accessory to be controlled by the first device management application includes displaying a user interface including a selectable user interface object for obtaining the first device management application.

7. The computer system of claim 1, wherein the one or more programs further include instructions for:
after configuring the external accessory to be controlled by the first device management application, displaying a second prompt that includes an option to initiate a process to configure the external accessory to be controlled by the second device management application.

8. The computer system of claim 1, wherein the first prompt further includes an option to initiate a process to configure the external accessory to be controlled by a third device management application that is different from the first device management application and the second device management application, and wherein the one or more programs further include instructions for:
in accordance with a determination that the first input corresponds to both selection of the option to initiate a process to configure the external accessory to be controlled by the first device management application and the option to initiate a process to configure the external accessory to be controlled by the third device management application, initiating a process to configure the external accessory to be controlled by the first device management application and the third device management application.

9. The computer system of claim 1, wherein:
the request to configure the external accessory is received while displaying a user interface of a requesting application; and
displaying the first prompt includes concurrently displaying the first prompt with at least a portion of the user interface of the requesting application.

10. The computer system of claim 1, wherein, in accordance with the respective device management application being the first device management application, the user interface for the respective device management application includes an indication of the external accessory.

11. The computer system of claim 1, wherein, in accordance with the respective device management application being the first device management application, the user interface for the respective device management application includes an editable field for selecting a name or location for the external accessory.

12. The computer system of claim 1, wherein the process to configure the external accessory to be controlled by the first device management application includes, in accordance with a determination that the first device management application is not available on the computer system, displaying a user interface for downloading the first device management application.

13. The computer system of claim 1, wherein the one or more programs further include instructions for:
after completing the process to configure the external accessory to be controlled by the first device management application, displaying, via the display generation component, a second prompt that includes:
an indication that the external device is configured to be controlled by the first device management application, and the option to initiate the process to configure the external accessory to be controlled by the second device management application.

14. The computer system of claim 1, wherein the one or more programs further include instructions for:
after completing the process to configure the external accessory to be controlled by the first device management application, including pairing the external accessory with the first device management application, displaying, via the display generation component, a second prompt that includes:
an indication that the external device is paired with the first device management application, and
the option to initiate the process to configure the external accessory for use with the second device management application.

15. A non-transitory computer-readable storage medium storing one or more programs configured to be executed by one or more processors of a computer system that is in communication with a display generation component and one or more input devices, the one or more programs including instructions for:
receiving a request to configure an external accessory;
subsequent to receiving the request to configure the external accessory, displaying, via the display generation component, a first prompt that includes an option to initiate a process to configure the external accessory to be controlled by a first device management application and an option to initiate a process to configure the external accessory to be controlled by a second device management application that is different from the first device management application;
while displaying the first prompt, receiving, via the one or more input devices, a first input corresponding to selection of the option to initiate a process to configure the external accessory to be controlled by the first device management application;
in response to receiving the first input corresponding to selection of the option to initiate a process to configure the external accessory to be controlled by the first device management application, initiating the process to configure the external accessory to be controlled by the first device management application, wherein the process to configure the external accessory to be controlled by the first device management application includes displaying a user interface for configuring the external accessory to be controlled by the first device management application that includes a user-interactive graphical user interface object for pairing the external accessory with the first device management application, and wherein pairing the external accessory with the first device management application causes the external accessory to accept commands, from the first device management application, that control a function of the external accessory;
after completing the process to configure the external accessory to be controlled by the first device management application and without completing the process to configure the external accessory to be controlled by the second device management application, receiving, via the one or more input devices, a second input corresponding to a request to open a respective device management application; and
in response to receiving the second input corresponding to a request to open the respective device management application, displaying a user interface for the respective device management application, wherein:

in accordance with the respective device management application being the first device management application, the user interface for the respective device management application includes a user-interactive graphical user interface object for transmitting a command to the external accessory, and wherein the user-interactive graphical user interface object for transmitting the command to the external accessory is different from the option to initiate the process to configure the external accessory to be controlled by the first device management application and the user-interactive graphical user interface object for pairing the external accessory with the first device management application; and
in accordance with the respective device management application being the second device management application, the user interface for the respective device management application does not include a user-interactive graphical user interface object for transmitting a command to the external accessory.

16. The non-transitory computer-readable storage medium of claim 15, wherein the one or more programs further include instructions for:
prior to displaying the first prompt, configuring the external accessory to be controlled by a third device management application that is different from the first device management application and the second device management application.

17. The non-transitory computer-readable storage medium of claim 16, wherein configuring the external accessory to be controlled by the third device management application includes receiving a first set of external accessory configuration data, wherein the one or more programs further include instructions for:
after receiving the first input, displaying a prompt for user entry of a second set of external accessory configuration data, wherein the prompt includes at least a portion of the first set of external accessory configuration data.

18. The non-transitory computer-readable storage medium of claim 15, wherein
initiating the process to configure the external accessory to be controlled by the first device management application includes transmitting at least a portion of a first set of external accessory configuration data to the first device management application.

19. The non-transitory computer-readable storage medium of claim 15,
wherein the process to configure the external accessory to be controlled by the first device management application includes transmitting a set of external accessory configuration data to the external accessory, the set of external accessory configuration data including a code.

20. The non-transitory computer-readable storage medium of claim 15, wherein the process to configure the external accessory to be controlled by the first device management application includes displaying a user interface including a selectable user interface object for obtaining the first device management application.

21. The non-transitory computer-readable storage medium of claim 15, wherein the one or more programs further include instructions for:
after configuring the external accessory to be controlled by the first device management application, displaying a second prompt that includes an option to initiate a process to configure the external accessory to be controlled by the second device management application.

22. The non-transitory computer-readable storage medium of claim 15, wherein the first prompt further includes an option to initiate a process to configure the external accessory to be controlled by a third device management application that is different from the first device management application and the second device management application, and wherein the one or more programs further include instructions for:
    in accordance with a determination that the first input corresponds to both selection of the option to initiate a process to configure the external accessory to be controlled by the first device management application and the option to initiate a process to configure the external accessory to be controlled by the third device management application, initiating a process to configure the external accessory to be controlled by the first device management application and the third device management application.

23. The non-transitory computer-readable storage medium of claim 15, wherein:
    the request to configure the external accessory is received while displaying a user interface of a requesting application; and
    displaying the first prompt includes concurrently displaying the first prompt with at least a portion of the user interface of the requesting application.

24. The non-transitory computer-readable storage medium of claim 15, wherein, in accordance with the respective device management application being the first device management application, the user interface for the respective device management application includes an indication of the external accessory.

25. The non-transitory computer-readable storage medium of claim 15, wherein, in accordance with the respective device management application being the first device management application, the user interface for the respective device management application includes an editable field for selecting a name or location for the external accessory.

26. The non-transitory computer-readable storage medium of claim 15, wherein the process to configure the external accessory to be controlled by the first device management application includes, in accordance with a determination that the first device management application is not available on the computer system, displaying a user interface for downloading the first device management application.

27. The non-transitory computer-readable storage medium of claim 15, wherein the one or more programs further include instructions for:
    after completing the process to configure the external accessory to be controlled by the first device management application, displaying, via the display generation component, a second prompt that includes:
        an indication that the external device is configured to be controlled by the first device management application, and
        the option to initiate the process to configure the external accessory to be controlled by the second device management application.

28. The non-transitory computer-readable storage medium of claim 15, wherein the one or more programs further include instructions for:
    after completing the process to configure the external accessory to be controlled by the first device management application, including pairing the external accessory with the first device management application, displaying, via the display generation component, a second prompt that includes:
        an indication that the external device is paired with the first device management application, and
        the option to initiate the process to configure the external accessory for use with the second device management application.

29. A method comprising:
    at a computer system that is in communication with a display generation component and one or more input devices:
        receiving a request to configure an external accessory;
        subsequent to receiving the request to configure the external accessory, displaying, via the display generation component, a first prompt that includes an option to initiate a process to configure the external accessory to be controlled by a first device management application and an option to initiate a process to configure the external accessory to be controlled by a second device management application that is different from the first device management application;
        while displaying the first prompt, receiving, via the one or more input devices, a first input corresponding to selection of the option to initiate a process to configure the external accessory to be controlled by the first device management application;
        in response to receiving the first input corresponding to selection of the option to initiate a process to configure the external accessory to be controlled by the first device management application, initiating the process to configure the external accessory to be controlled by the first device management application, wherein the process to configure the external accessory to be controlled by the first device management application includes displaying a user interface for configuring the external accessory to be controlled by the first device management application that includes a user-interactive graphical user interface object for pairing the external accessory with the first device management application; and
        after completing the process to configure the external accessory to be controlled by the first device management application and without completing the process to configure the external accessory to be controlled by the second device management application:
            receiving, via the one or more input devices, a second input corresponding to a request to open the first device management application;
            in response to receiving the second input corresponding to a request to open the first device management application, displaying a user interface for the first device management application, wherein the user interface for the first device management application includes a user-interactive graphical user interface object for transmitting a command to the external accessory, and wherein the user-interactive graphical user interface object for transmitting the command to the external accessory is different from the option to initiate the process to configure the external accessory to be controlled by the first device management application and the user-interactive graphical user interface object for pairing the external accessory with the first device management application;

receiving, via the one or more input devices, a third input corresponding to a request to open the second device management application; and in response to receiving the third input corresponding to a request to open the second device management application, displaying a user interface for the second device management application, wherein the user interface for the second device management application does not include a user-interactive graphical user interface object for transmitting a command to the external accessory.

30. The method of claim 29, further comprising:
prior to displaying the first prompt, configuring the external accessory to be controlled by a third device management application that is different from the first device management application and the second device management application.

31. The method of claim 30, wherein configuring the external accessory to be controlled by the third device management application includes receiving a first set of external accessory configuration data, and wherein the method further comprises:
after receiving the first input, displaying a prompt for user entry of a second set of external accessory configuration data, wherein the prompt includes at least a portion of the first set of external accessory configuration data.

32. The method of claim 29, wherein initiating the process to configure the external accessory to be controlled by the first device management application includes transmitting at least a portion of a first set of external accessory configuration data to the first device management application.

33. The method of claim 29, wherein the process to configure the external accessory to be controlled by the first device management application includes transmitting a set of external accessory configuration data to the external accessory, the set of external accessory configuration data including a code.

34. The method of claim 29, wherein the process to configure the external accessory to be controlled by the first device management application includes displaying a user interface including a selectable user interface object for obtaining the first device management application.

35. The method of claim 29, further comprising:
after configuring the external accessory to be controlled by the first device management application, displaying a second prompt that includes an option to initiate a process to configure the external accessory to be controlled by the second device management application.

36. The method of claim 29, wherein the first prompt further includes an option to initiate a process to configure the external accessory to be controlled by a third device management application that is different from the first device management application and the second device management application, and wherein the method further comprises:
in accordance with a determination that the first input corresponds to both selection of the option to initiate a process to configure the external accessory to be controlled by the first device management application and the option to initiate a process to configure the external accessory to be controlled by the third device management application, initiating a process to configure the external accessory to be controlled by the first device management application and the third device management application.

37. The method of claim 29, wherein:
the request to configure the external accessory is received while displaying a user interface of a requesting application; and
displaying the first prompt includes concurrently displaying the first prompt with at least a portion of the user interface of the requesting application.

38. The method of claim 29, wherein the user interface for the first device management application includes an indication of the external accessory.

39. The method of claim 29, wherein the user interface for the first device management application includes an editable field for selecting a name or location for the external accessory.

40. The method of claim 29, wherein the process to configure the external accessory to be controlled by the first device management application includes, in accordance with a determination that the first device management application is not available on the computer system, displaying a user interface for downloading the first device management application.

41. The method of claim 29, further comprising:
after completing the process to configure the external accessory to be controlled by the first device management application, displaying, via the display generation component, a second prompt that includes:
an indication that the external device is configured to be controlled by the first device management application, and
the option to initiate the process to configure the external accessory to be controlled by the second device management application.

42. The method of claim 29, further comprising:
after completing the process to configure the external accessory to be controlled by the first device management application, including pairing the external accessory with the first device management application, displaying, via the display generation component, a second prompt that includes:
an indication that the external device is paired with the first device management application, and
the option to initiate the process to configure the external accessory for use with the second device management application.

43. The method of claim 29, wherein pairing the external accessory with the first device management application causes the external accessory to accept commands, from the first device management application, that control a function of the external accessory.

* * * * *

UNITED STATES PATENT AND TRADEMARK OFFICE
CERTIFICATE OF CORRECTION

| | | |
|---|---|---|
| PATENT NO. | : 11,758,035 B2 | Page 1 of 1 |
| APPLICATION NO. | : 17/477098 | |
| DATED | : September 12, 2023 | |
| INVENTOR(S) | : Anush Nadathur et al. | |

It is certified that error appears in the above-identified patent and that said Letters Patent is hereby corrected as shown below:

On the Title Page

Item (72), Inventors, delete "Anush Nadathur, Cupertino, CA (US); Justin Wood, Los Altos, CA (US)" and insert -- Anush Nadathur, Cupertino, CA (US); Nils Angquist, Los Altos Hills, CA (US); Pushpa Bathini, Los Gatos, CA (US); Christian A. Chares, Westminster, CO (US); Sagar Dhawan, San Diego, CA (US); Andreas I. Gal, Portola Valley, CA (US); Pankaj Garg, San Diego, CA (US); Anshul Jain, San Diego, CA (US); Naveen Kommareddi, Saratoga, CA (US); Vivien C. Nicolas, Paris (FR); Jeffrey Dustin Tanner, Walnut Creek, CA (US); Corey Keiko Wang, Palo Alto, CA (US); Justin Wood, Los Altos, CA (US); Boris Zbarsky, Needham, MA (US); Xiaoyue Zhang, Saratoga, CA (US) --, therefor.

Signed and Sealed this
Ninth Day of September, 2025

Coke Morgan Stewart
*Acting Director of the United States Patent and Trademark Office*